US012452574B2

(12) United States Patent
Xu et al.

(10) Patent No.: US 12,452,574 B2
(45) Date of Patent: Oct. 21, 2025

(54) EARPHONES

(71) Applicant: SHENZHEN SHOKZ CO., LTD., Guangdong (CN)

(72) Inventors: Jiang Xu, Shenzhen (CN); Zeying Zheng, Shenzhen (CN); Haofeng Zhang, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 181 days.

(21) Appl. No.: 18/507,001

(22) Filed: Nov. 10, 2023

(65) Prior Publication Data

US 2024/0147117 A1 May 2, 2024

Related U.S. Application Data

(63) Continuation of application No. PCT/CN2023/083549, filed on Mar. 24, 2023.

(30) Foreign Application Priority Data

Oct. 28, 2022 (CN) ......................... 202211336918.4
Dec. 1, 2022 (CN) ......................... 202223239628.6
(Continued)

(51) Int. Cl.
*H04R 1/10* (2006.01)

(52) U.S. Cl.
CPC ........... *H04R 1/105* (2013.01); *H04R 1/1016* (2013.01); *H04R 1/1066* (2013.01)

(58) Field of Classification Search
CPC .... H04R 1/105; H04R 1/1016; H04R 1/1066; H04R 1/025; H04R 1/10; H04R 7/06;
(Continued)

(56) References Cited

U.S. PATENT DOCUMENTS 7,050,598 B1 5/2006 Ham
10,674,244 B2 * 6/2020 Dominijanni ........ H04R 1/1008
(Continued)

FOREIGN PATENT DOCUMENTS

CN 209659534 U * 11/2019 ............... H04R 1/10
CN 212909891 U 4/2021
(Continued)

*Primary Examiner* — Angelica M McKinney
(74) *Attorney, Agent, or Firm* — METIS IP LLC

(57) ABSTRACT

The present disclosure provides an earphone, comprising a sound production component and an ear hook configured to place the sound production component near an ear canal but not blocking an ear canal opening. An inner contour of a projection of the ear hook on a user's sagittal plane includes a first curve having an extremum point in a first direction. The first direction is perpendicular to a long-axis direction of a projection of the sound production component. The extremum point is located behind a projection point of an upper vertex of the ear hook on the sagittal plane. The upper vertex is a highest point of an inner contour of the ear hook along the user's vertical-axis. A housing of the sound production component and a first portion of the ear hook clamp the user's auricle and provide a clamping force of 0.03 N-1 N to the auricle.

20 Claims, 25 Drawing Sheets

(30) Foreign Application Priority Data

Dec. 30, 2022 (WO) ................ PCT/CN2022/144339
Mar. 2, 2023 (WO) ................ PCT/CN2023/079400

(58) Field of Classification Search

CPC .......... H04R 7/18; H04R 9/025; H04R 1/345; H04R 1/1075; H04R 1/2826; H04R 7/127; H04R 9/02; H04R 9/045; H04R 9/06; H04R 1/1058; H04R 2201/10; H04R 2201/105; H04R 2307/023; H04R 1/1008; H04R 1/347

See application file for complete search history.

(56) References Cited

U.S. PATENT DOCUMENTS 11,974,084 B1 * 4/2024 Xu ........................ H04R 1/1066
2007/0009133 A1 1/2007 Gerkinsmeyer
2020/0196062 A1 6/2020 Zhang
2022/0014833 A1 * 1/2022 Lee ........................ H04R 1/105
2023/0130211 A1 4/2023 Li et al.
2024/0147130 A1 * 5/2024 Xu ........................... H04R 9/06

FOREIGN PATENT DOCUMENTS

| | | | | |
|---|---|---|---|---|
| CN | 113316054 A | * | 8/2021 | ............. H04R 1/347 |
| CN | 113573215 A | | 10/2021 | |
| CN | 214429681 U | | 10/2021 | |
| CN | 215682610 U | | 1/2022 | |
| CN | 114286228 A | | 4/2022 | |
| CN | 114286237 A | | 4/2022 | |
| CN | 217011123 U | | 7/2022 | |
| CN | 115175069 A | | 10/2022 | |
| CN | 115460496 A | | 12/2022 | |
| CN | 115550783 A | | 12/2022 | |
| CN | 218352706 U | | 1/2023 | |
| EP | 4181531 A1 | | 5/2023 | |
| JP | 2009060348 A | | 3/2009 | |

* cited by examiner

EARPHONES

CROSS-REFERENCE TO RELATED APPLICATIONS

This application is a continuation of International Patent Application No. PCT/CN2023/083549, filed on Mar. 24, 2023, which claims priority of Chinese Patent Application No. 202211336918.4 filed on Oct. 28, 2022, Chinese Patent Application No. 202223239628.6 filed on Dec. 1, 2022, International Patent Application No. PCT/CN2022/144339 filed on Dec. 30, 2022, and International Patent Application No. PCT/CN2023/079400 filed on Mar. 2, 2023, the entire contents of each of which are hereby incorporated by reference.

TECHNICAL FIELD

The present disclosure relates to the field of acoustic technology, and in particular, to earphones.

BACKGROUND

With the development of acoustic output technology, acoustic devices (e.g., headphones) have been widely used in people's daily lives, and can be used in conjunction with electronic devices such as cell phones and computers to provide users with an auditory feast. Acoustic devices can generally be classified into a head-mounted type, an ear-hook type, and an in-ear type according to the ways the users wear them.

Therefore, it is necessary to provide an earphone that can improve the wearing comfort of users and have good output performance.

SUMMARY

One of the embodiments of the present disclosure provides an earphone, comprising a sound production component and an ear hook. The sound production component may include a transducer and a housing accommodating the transducer. The ear hook may include a first portion and a second portion connected in sequence, in a wearing state, the first portion may be hung between an auricle and a head of a user, and the second portion may extend towards a side of the auricle away from the head and connects with the sound production component to place the sound production component at a position near an ear canal but not blocking an ear canal opening. An inner contour of a projection of the ear hook on a user's sagittal plane may include a first curve, the first curve may have an extremum point in a first direction, and the first direction may be perpendicular to a long-axis direction of a projection of the sound production component. The extremum point may be located behind a projection point of an upper vertex of the ear hook on the user's sagittal plane, and the upper vertex of the ear hook may be a highest point of an inner contour of the ear hook along a vertical-axis of the user in the wearing state. The housing and the first portion of the ear hook may clamp the auricle of the user and provide a clamping force of 0.03 N-1 N to the auricle of the user.

BRIEF DESCRIPTION OF THE DRAWINGS

The present disclosure will be further illustrated by way of exemplary embodiments, which will be described in detail with the accompanying drawings. These embodiments are non-limiting. In these embodiments, the same count indicates the same structure, wherein.

DETAILED DESCRIPTION

Figure 1:
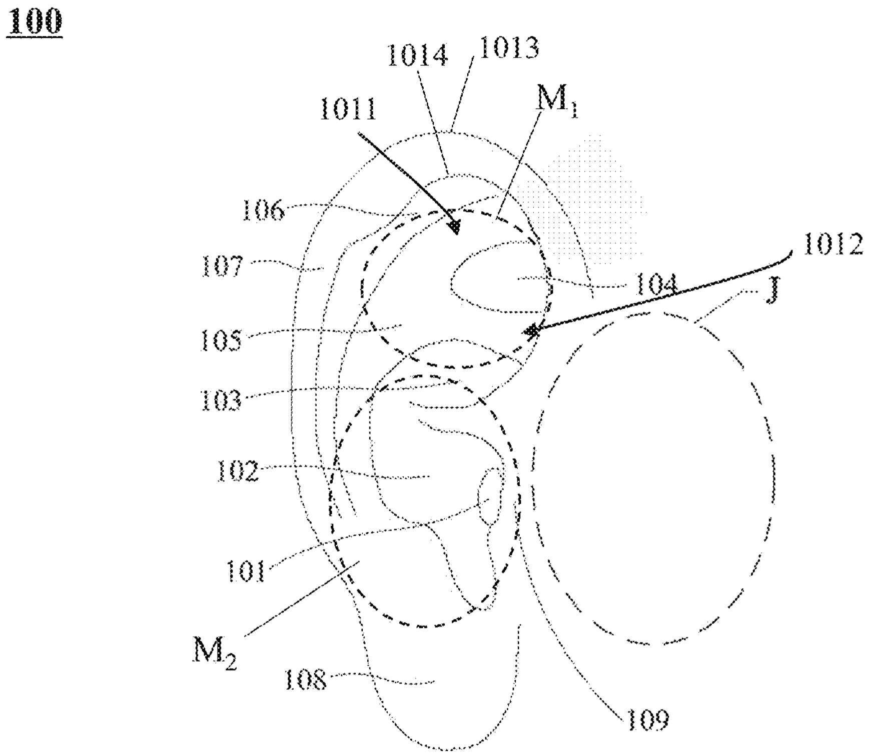
FIG. 1 is a schematic diagram illustrating an exemplary ear according to some embodiments of the present disclosure.

To more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that "system," "device," "unit" and/or "module" as used herein is a manner used to distinguish different components, elements, parts, sections, or assemblies at different levels. However, if other words serve the same purpose, the words may be replaced by other expressions.

As shown in the present disclosure and the claims, unless the context clearly suggests exceptional circumstances, the words "a," "an," and/or "the" do not specifically refer to the singular, but may also include the plural In general, the terms "comprise," "comprises," "comprising," "include," "includes," and/or "including," merely prompt to include operations and elements that have been clearly identified, and these operations and elements do not constitute an exclusive listing.

FIG. 1 is a schematic diagram illustrating an exemplary ear according to some embodiments of the present disclosure.

As shown in FIG. 1, an ear 100 may include an external ear canal 101, a cavum concha 102, a cymba concha 103, a triangular fossa 104, an antihelix 105, a scapha 106, a helix 107, an earlobe 108, a helix foot 109, an outer contour 1013, and an inner contour 1014. It should be noted that, for ease of description, in some embodiments of the present disclosure, a superior crus of antihelix 1011, an inferior crus of antihelix 1012, and the antihelix 105 are collectively referred to as an antihelix region. In some embodiments, one or more parts of the ear 100 may be used to support an acoustic device for stable wearing to achieve stable wearing of the acoustic device. In some embodiments, parts of the ear 100 such as the external ear canal 101, the cavum concha 102, the cymba concha 103, the triangular fossa 104, etc., have a certain depth and volume in the three-dimensional space, which may be used to meet wearing requirements of the acoustic device. For example, the acoustic device (e.g., an in-ear earphone) may be worn in the external ear canal 101. In some embodiments, the wearing of the acoustic device may be achieved with the aid of other parts of the ear 100 other than the external ear canal 101. For example, the wearing of the acoustic device may be achieved with the aid of the cymba concha 103, the triangular fossa 104, the antihelix 105, the scapha 106, the helix 107, or a combination thereof. In some embodiments, to improve the comfort and reliability of the acoustic device in wearing, parts such as a user's earlobe 108 may also be used. By utilizing parts of the ear 100 other than the external ear canal 101 for the wearing of the acoustic device and the transmission of sound, the user's external ear canal 101 may be "liberated." When the user wears the acoustic device (e.g., an earphone), the acoustic device does not block the external ear canal 101 of the user, and the user may receive both sounds from the acoustic device and sounds from the environment (e.g., horn sounds, car bells, surrounding voices, traffic commands, etc.), thereby reducing the probability of traffic accidents. In the present disclosure, the acoustic device that does not block the user's external ear canal 101 (or ear canal or ear canal opening) when worn by the user may be referred to as an earphone. In some embodiments, the acoustic device may be designed to adapt to the ear 100 according to the construction of the ear 100 to enable a sound production component of the acoustic device to be worn at various positions of the ear 100. For example, when the acoustic device is an earphone, the earphone may include a suspension structure (e.g., an ear hook) and a sound production component. The sound production component is physically connected to the suspension structure. The suspension structure may be matched to a shape of an auricle to place an entire or partial structure of the sound production component at a front side of the helix foot 109 (e.g., a region J enclosed by the dashed line in FIG. 1). As another example, when the user wears the earphone, the entire or partial structure of the sound production component may be in contact with an upper part of the external ear canal 101 (e.g., a location where one or more parts such as the helix foot 109, the cymba concha 103, the triangular fossa 104, the antihelix 105, the scapha 106, or the helix 107, etc., are located). As yet another example, when the user wears the earphone, the entire or partial structure of the sound production component may be located in a cavity (e.g., the region M1 enclosed by the dashed line in FIG. 1 containing at least the cymba concha 103 and the triangular fossa 104 and the region M2 containing at least the cavum concha 102) formed by one or more parts (e.g., the cavum concha 102, the cymba concha 103, the triangular fossa 104, etc.) of the ear 100.

Different users may have individual differences, resulting in different shapes, dimensions, etc., of the ear 100. For ease of description and understanding, unless otherwise specified, the present disclosure primarily uses an ear model with a "standard" shape and dimension as a reference and further describes the wearing manners of the acoustic device in different embodiments on the ear model. For example, a simulator (e.g., GRAS 45BC KEMAR) containing the head and (left and right) ears produced based on standards of ANSI: S3.36, S3.25, and IEC: 60318-7, may be used as a reference for wearing the acoustic device to present a scenario in which most users wear the acoustic device normally. Merely by way of example, the reference ear may have the following relevant features: a projection of an auricle on a sagittal plane in a vertical-axis direction may be in a range of 49.5 mm-74.3 mm, and a projection of the auricle on the sagittal plane in a sagittal-axis direction may be in a range of 36.6 mm-55 mm. Thus, in the present disclosure, the descriptions such as "worn by the user," "in the wearing state," and "in the wearing state" may refer to the acoustic device described in the present disclosure being worn on the ear of the aforementioned simulator. Of course, considering that different users have individual differences, the structure, shape, dimension, thickness, etc., of one or more parts of the ear 100 may be somewhat different. In order to meet the needs of different users, the acoustic device may be designed differently, and these differential designs may be manifested as feature parameters of one or more parts of the acoustic device (e.g., a sound production component, an ear hook, etc., in the following descriptions) having different ranges of values, thus adapting to different ears. In addition, it should be noted that the "non-wearing state" is not limited to a state in which the earphone is not worn on the ear 100 of the user, but also includes a state in which the earphone is not deformed by an external force; and the "wearing state" is not limited to a state in which the earphone is worn on the ear 100 of the user, and a state in which the suspension structure (e.g., the ear hook) and the sound production component are arranged to a certain distance.

It should be noted that in the fields of medicine, anatomy, or the like, three basic sections including a sagittal plane, a coronal plane, and a horizontal plane of the human body may be defined, respectively, and three basic axes including a sagittal-axis, a coronal axis, and a vertical-axis may also be defined. As used herein, the sagittal plane may refer to a section perpendicular to the ground along a front and rear direction of the body, which divides the human body into left and right parts. The coronal plane may refer to a section perpendicular to the ground along a left and right direction of the body, which divides the human body into front and rear parts. The horizontal plane may refer to a section parallel to the ground along an up-and-down direction of the body, which divides the human body into upper and lower parts. Correspondingly, the sagittal-axis may refer to an axis along the front-and-rear direction of the body and perpendicular to the coronal plane. The coronal axis may refer to an axis along the left-and-right direction of the body and perpendicular to the sagittal plane. The vertical-axis may refer to an axis along the up-and-down direction of the body and perpendicular to the horizontal plane. Further, the "front side of the ear" as described in the present disclosure is a concept relative to the "rear side of the ear," wherein the "front side of the ear" refers to a side of the ear 100 facing a facial region of the human body in a direction along the sagittal-axis of the human body, and the "rear side of the ear" refers to a side of the ear 100 away from the facial region of the human body along the sagittal-axis direction. In this case, observing the ear 100 of the above simulator in a direction along the coronal axis of the human body, a schematic diagram illustrating the front side of the ear as shown in FIG. 1 is obtained.

The description of the ear 100 above is provided for illustrative purposes and is not intended to limit the scope of the present disclosure. Those skilled in the art may make various changes and modifications based on the description of the present disclosure. For example, certain structures of the acoustic device may shield a portion or all of the external ear canal 101. These changes and modifications are still within the scope of protection of the present disclosure.

Figure 2:
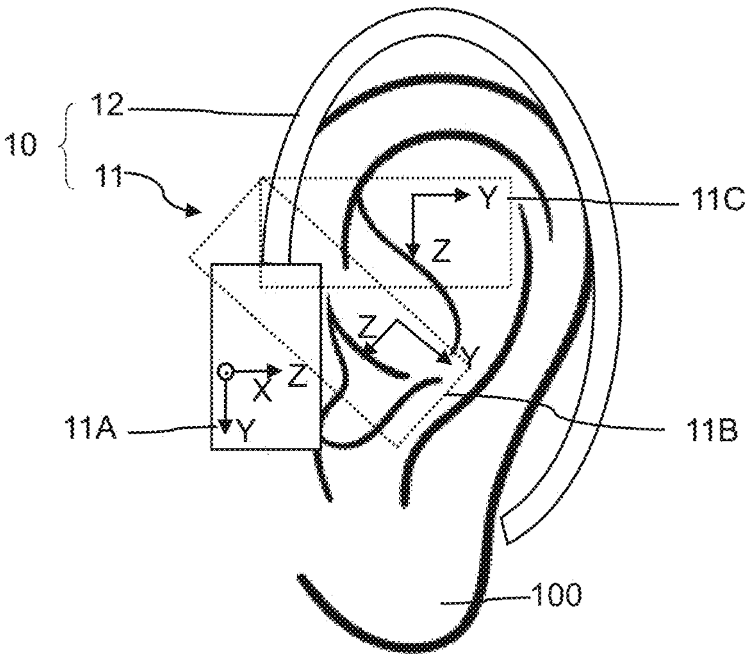
FIG. 2 is a diagram illustrating an exemplary structure of an earphone according to some embodiments of the present disclosure.

FIG. 2 is a diagram illustrating an exemplary structure of an earphone according to some embodiments of the present disclosure. As shown in FIG. 2, the earphone 10 may include a sound production component 11 and a suspension structure 12. In some embodiments, the earphone 10 may enable the sound production component 11 to be worn on the body of a user (e.g., the head, neck, or upper torso of a human body) via the suspension structure 12. In some embodiments, the suspension structure 12 may be an ear hook 12. The sound production component 11 may be connected to one end of the ear hook 12. The ear hook 12 may be set in a shape that adapts to the ear 100 of the user. For example, the ear hook 12 may be a curved structure. In some embodiments, the suspension structure 12 may also be a clamping structure adapted to fit the ear of the user so that the suspension structure 12 may be clamped at the ear of the user. In some embodiments, the ear hook 12 may include a first portion and a second portion. The first portion may be positioned between an auricle and the head of the user, and the second portion may be extended towards a side of the auricle away from the head of the user and connect with the sound production component 11 to place the sound production component 11 at a position near an ear canal but not blocking an ear canal opening. Thus, the ear 100 of the user is kept open, and the user may be able to hear the sound output from the earphone 10 while obtaining the sound of the external environment. For example, the earphone 10 may be arranged around or partially around the ear 100 of the user and may propagate a sound through an air conduction or bone conduction manner. In some embodiments, the ear hook 12 may be composed of a metal wire and a wrapping layer, so that the earphone 10 may be better fixed on the user's body while ensuring comfort, and preventing falling during use.

In some embodiments, the sound production component 11 may include a transducer and a housing accommodating the transducer. The transducer may generate sound by converting an electrical signal into a corresponding mechanical vibration. In some embodiments, the housing may be worn on the user's body and carry the transducer. In some embodiments, the housing may be a closed housing structure with a hollow interior, and the transducer is located inside the housing. In some embodiments, the earphone 10 may be combined with products such as glasses, a headset, a head-mounted display device, an AR/VR headset, etc. In such cases, the sound production component 11 may be placed near the ear 100 of the user in a hanging or clamping manner. In some embodiments, a suspension structure (e.g., a hook) may be provided on the housing. For example, the shape of the hook matches the shape of an auricle, and the earphone 10 may be independently worn on the ear 100 of the user through the hook. In some embodiments, the sound production component 11 may be a housing structure having a shape suitable for the ear 100, for example, circular, elliptical, polygonal (which is regular or irregular), U-shaped, V-shaped, semicircular, etc., so that the sound production component 11 may be directly hung on the ear 100 of the user. In some embodiments, the housing may also include a fixed structure. The fixed structure may include an ear hook, an elastic band, etc., so that the earphone 10 may be better worn on the user's body to prevent falling during using.

Referring to FIG. 1 and FIG. 2, in some embodiments, when the user wears the earphone 10, the sound production component 11 may be at least partially located on an upper side, a lower side, or a front side (e.g., a region J at a front side of a tragus shown in FIG. 1) of the ear 100 of the user, or inside the auricle (e.g., a region M2 shown in FIG. 1). Different wearing positions of the sound production component 11 (11A, 11B, and 11C) may be exemplarily described. In some embodiments, a sound production component 11A may be located on the side of the ear 100 of the user toward a facial region of the human body along the sagittal-axis direction, i.e., the sound production component 11A may be located at a position (e.g., a region J shown in FIG. 1) of the ear 100 toward the facial region of the human body. Further, a loudspeaker may be provided inside the housing of the sound production component 11A, and at least one sound outlet (not shown in FIG. 2) may be provided on the housing of the sound production component 11A. The sound outlet may be located on a side wall of the housing toward or close to the external ear canal 101 of the user.

In some embodiments, the loudspeaker may include a diaphragm. A cavity inside the housing may be at least divided into a front cavity and a rear cavity. The sound outlet may be acoustically coupled with the front cavity. The diaphragm may drive the air in the front cavity to vibrate to generate an air-conducted sound. The air-conducted sound generated in the front cavity may be transmitted to the outside through the sound outlet. In some embodiments, the housing may further include one or more pressure relief holes located on a side wall of the housing adjacent to or opposite to a side wall where the sound outlet is located. The pressure relief hole may be acoustically coupled with the rear cavity. The vibration of the diaphragm may also drive the air in the rear cavity to vibrate to produce an air-conducted sound. The air-conducted sound generated in the rear cavity may be transmitted to the outside through the pressure relief hole. Exemplarily, in some embodiments, the loudspeaker in the sound production component 11A may output sounds with a phase difference (e.g., opposite phases) through the sound outlet and the pressure relief hole. The sound outlet may be located on the side wall of the housing of the sound production component 11A facing the external ear canal 101 of the user. The pressure relief hole may be located on a side of the housing of the sound production component 11 away from the external ear canal 101 of the user. In this case, the housing may act as a baffle, increasing a path difference between a sound path from the sound outlet to the external ear canal 101 and a sound path from the pressure relief hole to the external ear canal 101, thereby increasing a sound intensity at the external ear canal 101 while reducing a volume of far-field sound leakage.

Figure 10:
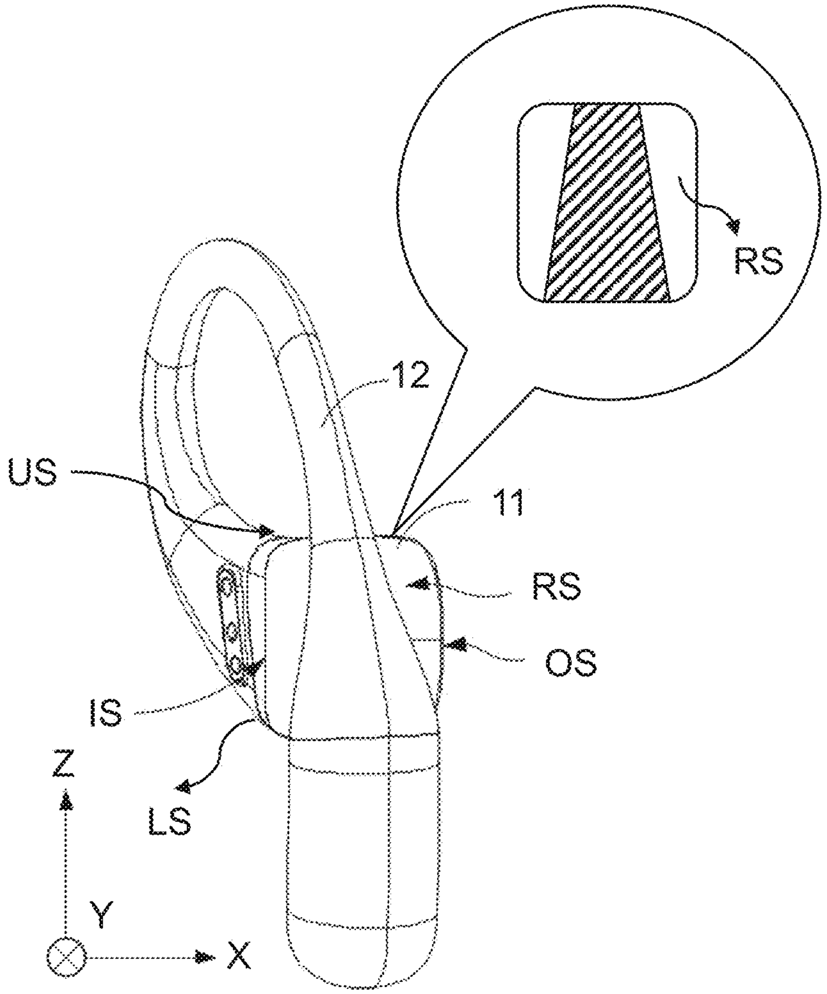
FIG. 10 is a structural diagram illustrating another exemplary structure of the earphone shown in FIG. 3.

In some embodiments, the sound production component 11 may have a long-axis direction Y and a short-axis direction Z that are orthogonal to each other and perpendicular to a thickness direction X. The long-axis direction Y may be defined as a direction (e.g., when a projection shape is a rectangle or an approximate rectangle, the long-axis direction may be a direction of a length of the rectangle or the approximate rectangle) having a maximum extension dimension in a shape of a two-dimensional projection plane (e.g., a projection of the sound production component 11 on a plane where an outer side surface OS of the sound production component 11 is located, or a projection of the sound production component 11 on the sagittal plane) of the sound production component 11, and the short-axis direction Z may be defined as a direction (e.g., when a projection shape is a rectangle or an approximate rectangle, the short-axis direction is a direction of a width of the rectangle or approximate rectangle) that is perpendicular to the long-axis direction Y in the shape of the projection of the sound production component 11 on the sagittal plane. The thickness direction X may be defined as a direction perpendicular to the two-dimensional projection plane, for example, which is consistent with a direction of the coronal axis, both pointing to the left and right directions of the human body. As shown in FIG. 10, the thickness direction X may also be defined as a direction in which the housing is toward or away from the ear 100 in the wearing state. In some embodiments, when the sound production component 11 is in an inclined state in the wearing state, the long-axis direction Y and the short-axis direction Z may be still parallel or approximately parallel to the sagittal plane, and the long-axis direction Y may have an angle with the sagittal-axis direction, i.e., the long-axis direction Y may also be inclined accordingly, and the short-axis direction Z may have a certain angle with the vertical-axis direction, i.e., the short-axis direction Z may also be inclined accordingly, as the wearing state of the sound production component 11B shown in FIG. 2. In some embodiments, the entire or partial structure of the sound production component 11B may extend into the cavum concha 102, in other words, the projection of the housing of the sound production component 11B on the sagittal plane has an overlapped portion with the projection of the cavum concha 102 on the sagittal plane. Specific details about the sound production component 11B may be found elsewhere in the present disclosure, such as FIG. 3 and the corresponding description. In some embodiments, in the wearing state, the sound production component 11 may also be in a horizontal state or an approximately horizontal state, as shown by the sound production component 11C in FIG. 2. The long-axis direction Y may be consistent with or approximately consistent with the sagittal-axis, both pointing to the anterior-posterior direction of the human body, and the short-axis direction Z may be consistent with or approximately consistent with the vertical-axis, both pointing to the up-down direction of the human body. It should be noted that in the wearing state, the sound production component 11C being in an approximately horizontal state may mean that the included angle between the long-axis direction Y of the sound production component 11C and the sagittal-axis falls within a specific range (e.g., not greater than 20°). Specific details about the sound production component 11C may be found elsewhere in the present disclosure, such as FIG. 21 and the corresponding description. Furthermore, the wearing position of the sound production component 11 is not limited to the sound production component 11A, the sound production component 11B, and the sound production component 11C as shown in FIG. 2. For example, the whole or part of the sound production component 11 may be located on the front side of the helix foot 109 (e.g., the region J enclosed by the dotted line in FIG. 1). As another example, the whole or part of the sound production component 11 may be in contact with an upper portion of the external ear canal 101 (e.g., positions where one or more parts of the ear 100, such as the helix foot 109, the cymba concha 103, the triangular fossa 104, the antihelix 105, the scapha 106, or the helix 107, etc., are located). As yet another example, the whole or part of the sound production component 11 of the acoustic device may be located within cavities (e.g., the region $M_1$ enclosed by the dashed line in FIG. 1 containing at least the cymba concha 103 and the triangular fossa 104 and the region $M_2$ containing at least the cavum concha 102) formed by one or more parts (e.g., the cavum concha 102, the cymba concha 103, the triangular fossa 104, etc.) of the ear 100.

In order to improve the stability of the earphone 10 in the wearing state, the earphone 10 may adopt any one or a combination of the following configurations. First, at least part of the ear hook 12 may be configured as a profiling structure that fits at least one of the rear side of the ear and the head, to increase a contact area between the ear hook 12 and the ear 100 and/or the head, thereby increasing the resistance of the acoustic device 10 falling off from the ear 100. Second, at least part of the ear hook 12 may be configured as an elastic structure, so that the ear hook 12 may have a certain amount of deformation in the wearing state, to increase the positive pressure of the ear hook 12 on the ear 100 and/or the head, thereby increasing the resistance of the earphone 10 falling off from the ear 100. Third, at least part of the ear hook 12 may be configured to abut against the head in the wearing state, to form a counteracting force that presses against the ear 100 and makes the sound production component 11 press against the front side of the ear, thereby increasing the resistance of the earphone 10 falling off from the ear 100. Fourth, the sound production component 11 and the ear hook 12 may be configured to clamp the antihelix region, the cavum concha region, etc., from the front side and the rear side of the ear 100 in the wearing state, thereby increasing the resistance of the earphone 10 falling off from the ear 100. Fifth, the sound production component 11 or an auxiliary structure connected thereto may be configured to at least partially extend into cavities such as the cavum concha 102, the cymba concha 103, the triangular fossa 104, and the scapha 106, thereby increasing the resistance of the earphone 10 falling off from the ear 100.

Figure 3:
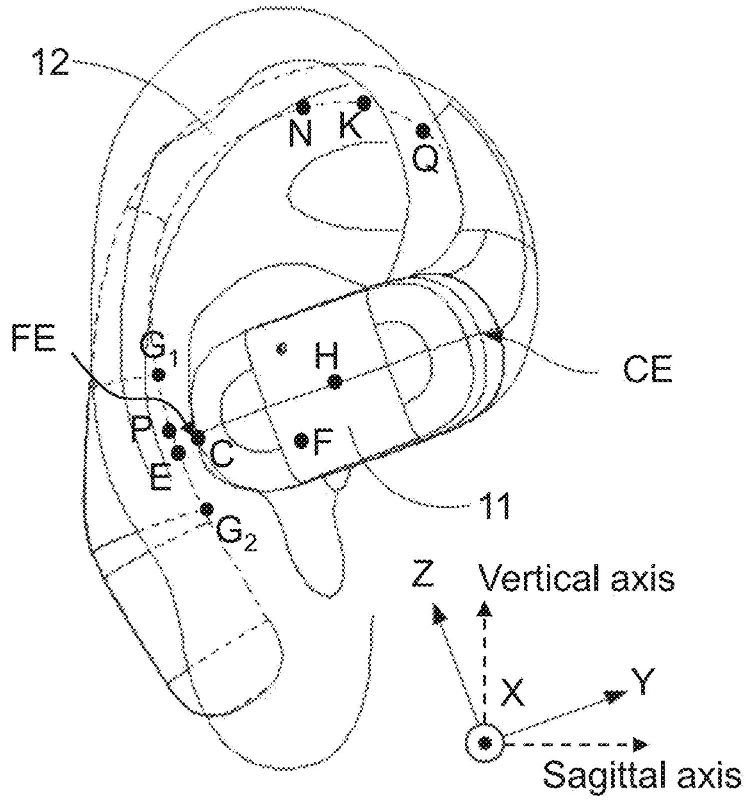
FIG. 3 is a schematic diagram illustrating an exemplary wearing state of an earphone according to some embodiments of the present disclosure.

Merely by way of example, referring to FIG. 3, the free end FE of the sound production component 11 may extend into the cavum concha 102 in the wearing state. The sound production component 11 and the ear hook 12 may be arranged to clamp an ear region mentioned above from a front side and a rear side of the ear region corresponding to the cavum concha 102, thereby increasing the falling resistance of the earphone 10 from the ear 100, and further improving the reliability of the earphone 10 in the wearing state. For example, the free end FE is pressed in the cavum concha 102 in the thickness direction X. As another example, the free end FE may abut against the cavum concha 102 in the long-axis direction Y and the short-axis direction Z.

The following takes the earphone 10 shown in FIG. 3 as an example to describe the earphone 10 in detail. It should be known that, without violating a corresponding acoustic principle, the structure and corresponding parameters of the earphone 10 in FIG. 3 may also be applicable to earphones of other structures mentioned above.

By extending at least part of the sound production component 11 into the cavum concha 102, a listening volume of sound at a listening position (e.g., at the ear canal opening) may be increased especially for mid-low frequency sounds, while still maintaining the good effect of far-field sound leakage cancellation. Merely by way of example, when the entire or partial structure of the sound production component 11 extends into the cavum concha 102, the sound production component 11 and the cavum concha 102 form a structure similar to a cavity (hereinafter referred to as a cavity-like structure). In the embodiments of the present disclosure, the cavity-like structure may be understood as a semi-enclosed structure enclosed by the side wall of the sound production component 11 and the cavum concha 102. The semi-closed structure may ensure that an inner environment is not completely closed and isolated from an outer environment, but has a leaking structure (e.g., an opening, a gap, a pipeline, etc.) acoustically communicating with the outer environment. When the user wears the earphone 10, one or more sound outlets may be provided on a side of the housing of the sound production component 11 proximate to or toward the user's ear canal, and one or more pressure relief holes may be provided on other side walls (e.g., the sidewall that is away from or back away from the user's ear canal) of the housing of the sound production component 11. The one or more sound outlets may be acoustically coupled to a front cavity of the earphone 10, and the one or more pressure relief holes may be acoustically coupled to a rear cavity of the earphone 10. Taking the sound production component 11 including one sound outlet and one pressure relief hole as an example, a sound outputted from the sound outlet and a sound outputted from the pressure relief hole may be approximately regarded as two sound sources. Phases of the sounds of the two sound sources are opposite or approximately opposite. The sound production component 11 and the inner wall corresponding to the cavum concha 102 may form a cavity-like structure. A sound source corresponding to the sound outlet is located in the cavity-like structure, and a sound source corresponding to the pressure relief hole is located outside the cavity-like structure to form an acoustic model shown in FIG. 4.

Figure 4:
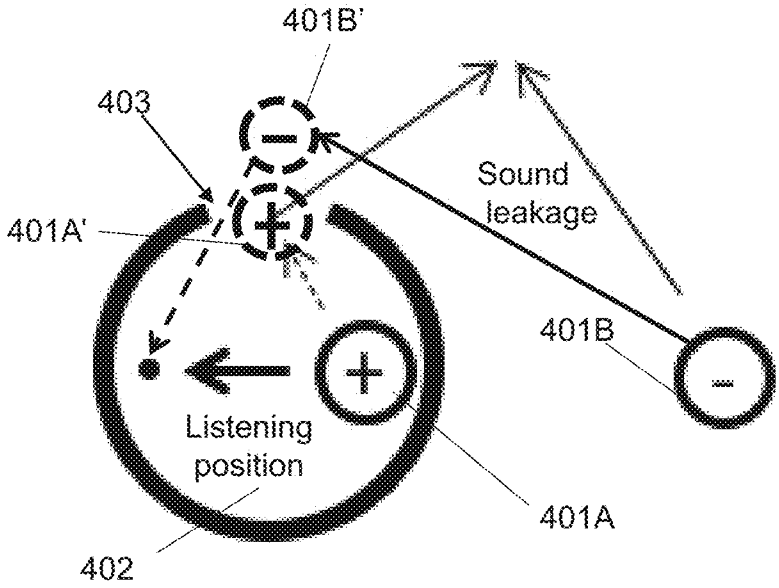
FIG. 4 is a distribution schematic diagram illustrating a cavity structure arranged around one of two sound sources according to some embodiments of the present disclosure.

FIG. 4 is a distribution schematic diagram illustrating a cavity structure arranged around one of two sound sources according to some embodiments of the present disclosure. As shown in. 4, the cavity-like structure 402 may include a listening position and at least one sound source 401A. The "include" here may indicate that at least one of the listening position or the sound source 401A is located inside the cavity-like structure 402, or it may indicate that at least one of the listening position or the sound source 401A is located at an inner edge of the cavity-like structure 402. The listening position may be equivalent to the ear canal opening, an acoustic reference point in the ear such as an ear reference point (ERP) or an eardrum reference point (DRP), etc., or an entrance structure guiding to a listener, etc. Since the sound source 401A is enclosed by the cavity-like structure 402, most of the sound radiated from the sound source 401A reaches the listening position through direct or reflected paths. In contrast, without the cavity-like structure 402, most of the sound radiated by sound source 401A does not reach the listening position. Therefore, the arrangement of the cavity-like structure 402 significantly increases a volume of the sound reaching the listening position. At the same time, only a small part of the anti-phase sound radiated from the anti-phase sound source 401B outside the cavity-like structure 402 enters the cavity-like structure 402 through a leaking structure 403 of the cavity-like structure 402. This is equivalent to generating a secondary sound source 401B' at the leaking structure 403. An intensity of the secondary sound source 401B' is significantly lower than an intensity of the sound source 401B and also significantly lower than an intensity of the sound source 401A. The sound produced by the secondary sound source 401B' weakly interferes with the sound source 401A inside the cavity, significantly increasing the listening volume at the listening position. Regarding the leakage sounds, the sound source 401A radiates sound to the outside world through the leaking structure 403 of the cavity-like structure 402, which is equivalent to generating a secondary sound source 401A' at the leaking structure 403. Since nearly all sounds radiated by the sound source 401A exit through the leaking structure 403, and the scale of the cavity-like structure 402 is significantly smaller than a spatial scale for evaluating the leakage sounds (differing by at least one order of magnitude), it may be considered that an intensity of the secondary sound source 401A' is equivalent to the intensity of the sound source 401A. For the external space, the secondary sound source 401A' and the sound source 401B may form a dual-point sound source, so that sounds produced by them cancel each other out, thereby reducing sound leakage.

In specific application scenarios, an outer wall surface of the sound production component 11 is typically a planar or curved plane, while a contour of the user's cavum concha 102 is an uneven structure. By partially or entirely extending the sound production component 11 into the cavum concha 102, the sound production component 11 and the contour of the cavum concha 102 may form a cavity-like structure that communicates with the outside world. Furthermore, by placing the sound outlet at a position on the edge of the sound production component 11 facing the user's ear canal opening and close to the cavum concha 102, and placing the one or more pressure relief holes at a position on the sound production component 11 back away from or further away from the ear canal opening, the acoustic model as shown in FIG. 4 is formed, so as to increase the listening volume at the ear canal opening when wearing the earphone 10 and reduce the far-field sound leakage.

Figure 5:
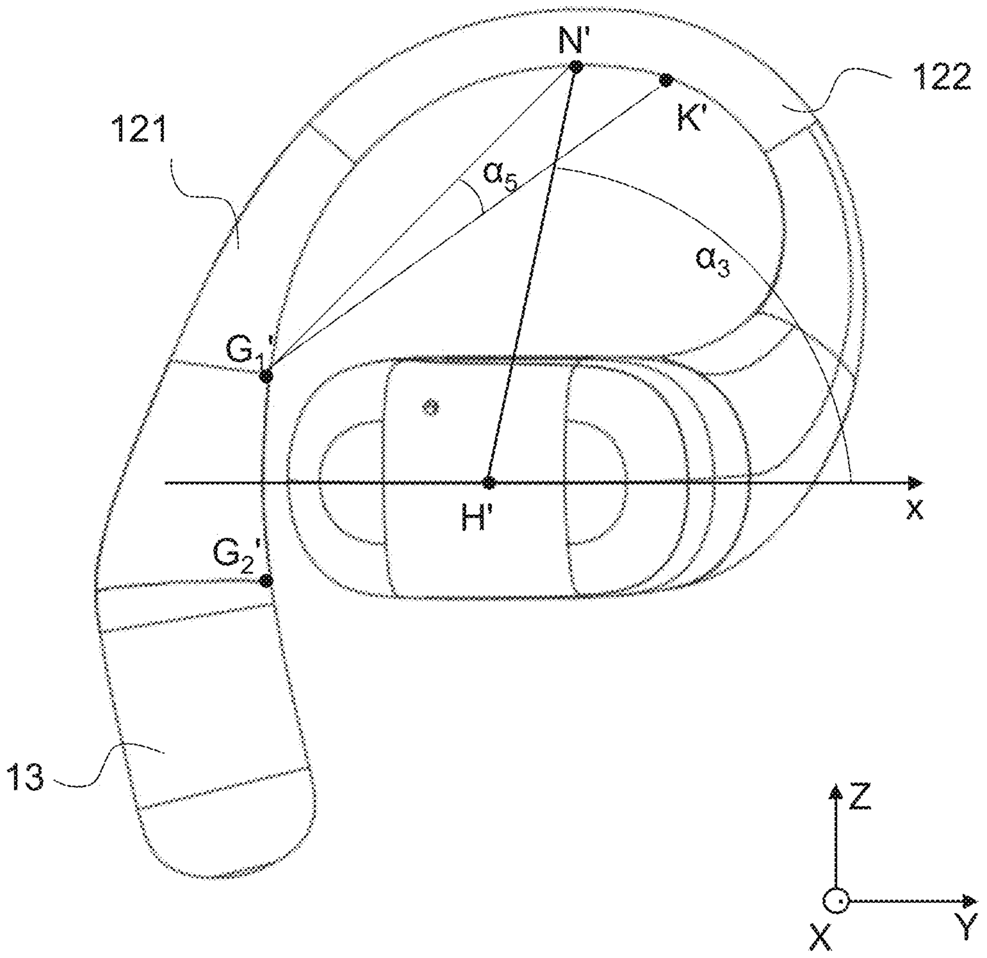
FIG. 5 is a schematic diagram illustrating an exemplary projection of an earphone shown in FIG. 3 on a user's sagittal plane according to some embodiments of the present disclosure.

FIG. 5 is a schematic diagram illustrating an exemplary projection of an earphone shown in FIG. 3 on a user's sagittal plane according to some embodiments of the present disclosure. Referring to FIG. 5, in some embodiments, in a wearing state, a first portion 121 of the ear hook 12 is hung between an auricle and a head of a user, and a second portion 122 extends to a side of the auricle away from the head and connects to the sound production component 11, so that the sound production component 11 may be placed near an ear canal but not blocking an ear canal opening.

In some embodiments, the first portion 121 of the ear hook 12 may include a battery compartment 13. A battery connected to the sound production component 11 may be arranged in the battery compartment 13. In some embodiments, the battery compartment 13 may be located at an end of the first portion 121 away from the sound production component 11, and a projection contour of an end of the ear hook 12 away from the sound production component 11 may be a projection contour of a free end of the battery compartment 13 on the user's sagittal plane. In some embodiments, when the user wears the earphone 10, the sound production component 11 and the battery compartment 13 may be located respectively on a front side and a rear side of the auricle.

It should be noted that in the wearing state, the free end FE of the sound production component 11 may not only be inserted into the cavum concha, but also be projected orthogonally onto the antihelix, and may also be projected orthogonally onto the left side or the right side of the head and be located at a front side of the ear along the sagittal-axis of the human body. In other words, the ear hook 12 may support the sound production component 11 to be worn to wearing positions such as the cavum concha, the antihelix, the front side of the ear, etc.

In some embodiments, by designing a shape and a dimension of the ear hook 12, the compatibility of the ear hook 12 with an ear of the user may be improved, and the stability and adjustability of the earphone 10 may be improved. Additionally, the ear hook 12 may be adjusted to place the sound production component 11 at a specific position on the ear of the user, thereby improving the listening effect of the earphone 10.

In order to understand and describe the shape of the earphone 10 in a non-wearing state or in a wearing state, the earphone 10 may be projected onto a specific plane, and the earphone 10 may be described by parameters related to a projection shape on the plane. Merely by way of example, in the wearing state, the earphone 10 may be projected on the sagittal plane of the human body to form a corresponding projection shape. In the non-wearing state, with reference to a relative positional relationship between the sagittal plane of the human body and the earphone 10, a first plane similar to this may be selected, so that a projection shape formed by the earphone 10 projected on the first plane is close to a projection shape of the earphone 10 on the sagittal plane of the human body. The first plane may be determined in the following manner: the ear hook 12 may be placed on a flat support plane (such as a horizontal desktop, a ground plane, etc.), and when the ear hook 12 is in contact with the support plane and placed stably, the support plane is the first plane corresponds to the earphone 10. Certainly, in order to maintain the uniformity of the specific plane corresponding to the wearing state and the non-wearing state, the first plane may also be the sagittal plane of the human body. In some embodiments, the first plane also refers to a plane formed by a bisection line that bisects or approximately bisects the ear hook 12 along a direction in which the ear hook 12 extends its length.

Figure 6:
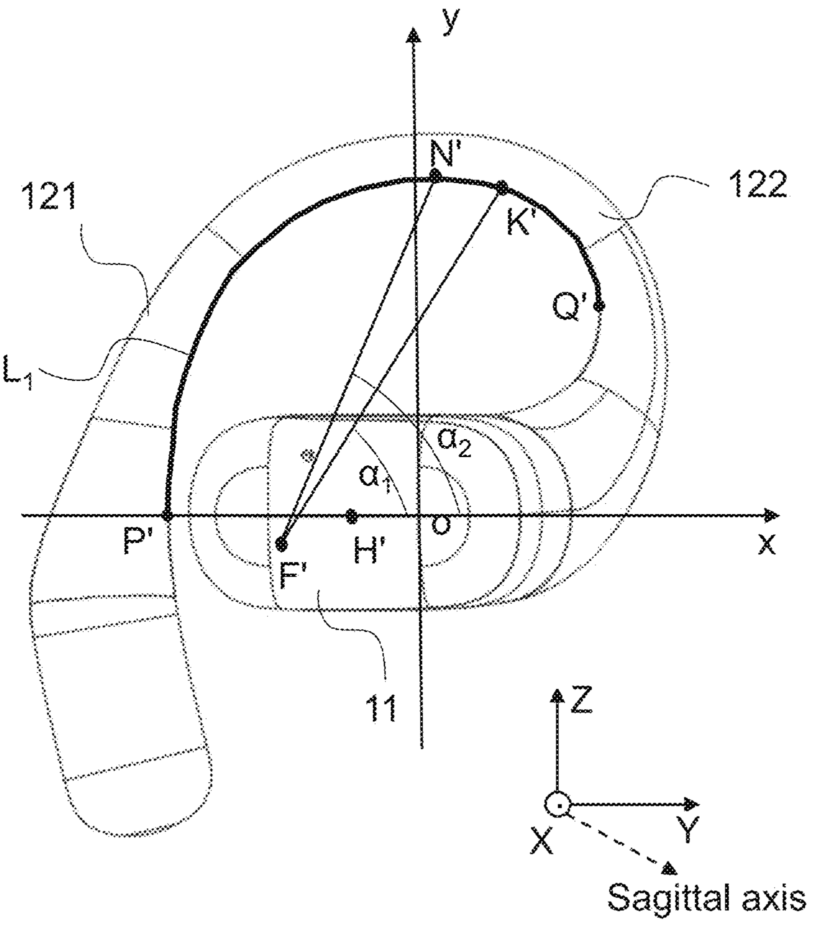
FIG. 6 is a schematic diagram illustrating an exemplary first curve of a projection of an earphone shown in FIG. 3 on the user's sagittal plane according to some embodiments of the present disclosure.

FIG. 6 is a schematic diagram illustrating an exemplary first curve of a projection of an earphone shown in FIG. 3 on the user's sagittal plane according to some embodiments of the present disclosure. In some embodiments, as shown in FIG. 6, a first curve L1 in a projection of the ear hook 12 on the user's sagittal plane may be used as a reference curve of the ear hook 12. In some embodiments, since the earphone 10 is in the wearing state, a region where the ear hook 12 is in contact with an ear of a user is mainly an inner contour of the ear hook 12, so that the first curve L1 may be a reference curve corresponding to an inner contour of the projection of the ear hook 12 on the user's sagittal plane. In some embodiments, the inner side surface IS and/or the outer side surface OS of the sound production component 11 may be parallel to the user's sagittal plane, and the long-axis direction Y of the sound production component 11 may be the long-axis direction Y of a projection of the sound production component 11 on the user's sagittal plane. The short-axis direction Z of the sound production component 11 may be the short-axis direction Z of the projection of the sound production component 11 on the user's sagittal plane. In some embodiments, in the long-axis direction Y of the projection of the sound production component 11, a curve corresponds to the inner contour of the projection of the ear hook 12 on the user's sagittal plane has a leftmost end (point P') and a rightmost end (point Q'). An actual corresponding position of the point P' on the ear hook 12 is the point P, and the actual corresponding position of the point Q' on the ear hook 12 is the point Q, as shown in FIG. 3. By designing features (such as an extremum point, etc.) of the first curve L1, a shape and a dimension of the ear hook 12 may be determined, thereby improving the compatibility between the ear hook 12 and the ear of the user and improving the stability and adjustability of the earphone 10. On the other hand, the ear hook 12 may be adjusted to place the sound production component 11 on a specific position of the ear of the user, so as to improve the listening effect of the earphone 10.

As shown in FIG. 6, in some embodiments, to establish a first rectangular coordinate system xoy, the long-axis direction Y of the projection of the sound production component 11 on the sagittal plane may be designated as an x-axis, a direction perpendicular to the x-axis is a y-axis, and an intersection of the x-axis and the y-axis may be designated as an origin o. The first curve L1 may be regarded as a curve in the first rectangular coordinate system xoy.

In some embodiments, the y-axis direction may be referred to as a first direction, that is, the first direction is perpendicular to the long-axis direction Y of the projection of the sound production component 11 on the user's sagittal plane, and faces a direction of a top of a head of the user. In some embodiments, in the first rectangular coordinate system xoy, the first curve L1 has an extremum point N' in the first direction. A positional relationship among the extremum point N', the ear hook 12, and other position points on the sound production component 11 may be set to adjust a wearing condition (e.g., a mechanical parameter when wearing and a position of the sound production component 11 relative to the ear when wearing) of the earphone 10. As shown in FIG. 3, FIG. 5, and FIG. 6, in some embodiments, the extremum point N' is located on a rear side of an upper vertex K (which is represented by a projection point K' of the upper vertex K on the user's sagittal plane) on the ear hook 12. That is, on the projection of the ear hook 12 on the user's sagittal plane, compared with the projection point K' of the upper vertex K, the position of the extremum point N' is closer to the back of the head of the user.

In some embodiments, as shown in FIG. 3, the upper vertex K of the ear hook 12 may be the highest point of the inner contour of the ear hook 12 along a vertical-axis of the user in the wearing state. In some embodiments, when the user wears the earphone 10, the ear 100 may support the earphone 10 mainly through the upper vertex K of the ear hook 12. In some embodiments, as shown in FIG. 3, FIG. 5, and FIG. 6, the upper vertex K of the ear hook 12 may be a position where the inner contour of the ear hook 12 with the largest bending degree in the wearing state. In some embodiments, as shown in FIG. 3, FIG. 5, and FIG. 6, in the wearing state, the upper vertex K of the ear hook 12 may be a point on the inner contour of the ear hook 12 which is farthest from an end of the ear hook 12 (i.e., an end of the first portion 121, a free end of the battery compartment 13, and an end of the ear hook 12 that is not in contact with the sound production component 11). In some embodiments, a position of the upper vertex K of the ear hook 12 may simultaneously satisfy one or more of the three positions mentioned above.

In some embodiments, as shown in FIG. 3, a corresponding point of the extremum point N' on the ear hook 12 is point N (also referred to as an ear hook extremum point N). In some embodiments, an included angle between an ear hook plane of the ear hook 12 (e.g., a plane S1 shown in FIG. 13) and the user's sagittal plane may be considered comprehensively to determine the corresponding point N of the extremum point N' on the ear hook 12.

As shown in FIG. 3, in the wearing state, the sound production component 11 needs to be inserted into the cavum concha. A distance between the ear hook extremum point N and the upper vertex K in the long-axis direction Y of the sound production component 11 may affect the degree to which the sound production component 11 inserts into the cavum concha and a facing direction of the sound production component 11 in the cavum concha, thereby affecting a cavity-like structure formed by inserting the sound production component 11 into the cavum concha.

When the distance between the ear hook extremum point N and the upper vertex K in the long-axis direction Y of the sound production component 11 is too large, the compatibility between the first portion 121 of the ear hook 12 and the ear 100 may deteriorate and the stability of wearing the earphone 10 may be decreased, or it may cause the facing direction (i.e., the long-axis direction Y) of the sound production component 11 in the cavum concha 102 too close to the vertical-axis, and a gap between the upper side surface US of the sound production component 11 and the cavum concha is too large, that is, an opening of the cavity-like structure is too large, thus the contained sound source (i.e., the sound outlet on the inner side surface IS) directly emits more sound components to the environment, and a sound reaching a listening position is relatively low, at the same time, a sound from an external sound source entering the cavity-like structure may increase, causing the near-field sound cancellation, which leads to a poor listening effect.

When the distance between the ear hook extremum point N and the upper vertex K in the long-axis direction Y of the sound production component 11 is too small, an included angle between the facing direction (e.g., the long-axis direction Y) of the sound production component 11 in the cavum concha and the vertical-axis may be too large, and the gap between the upper side surface US of the sound production component 11 and the cavum concha is too small or a count of gaps is too few, causing the opening of the cavity-like structure to be too small or too few, which may lead to a poor sound leakage reduction effect. In addition, when the distance mentioned above is too small, the upper side surface US of the sound production component 11 may abut against an inner wall of the cavum concha, and may even excessively press the cavum concha of the user, making the user feel uncomfortable and affecting the wearing comfort of the earphone 10.

As shown in FIG. 3 and FIG. 6, in some embodiments, on the projection of the ear hook 12 on the user's sagittal plane, along the long-axis direction Y of the sound production component 11, a distance between the extremum point N' and a projection point K' of the upper vertex K may be within a range of 6 mm-15 mm. In some embodiments, since the x-axis is parallel to the long-axis direction Y of the sound production component 11, the distance between the extremum point N' and the projection point K' of the upper vertex K along the long-axis direction Y of the projection of the sound production component 11 may be a distance between an abscissa of the extremum point N' and an abscissa of the projection point K' of the upper vertex K. In some embodiments, in order to obtain a better listening effect, along the long-axis direction Y of the projection of the sound production component 11, a distance between the extremum point N' and the projection point K' of the upper vertex K on the ear hook 12 on the user's sagittal plane may be within a range of 7 mm-12 mm. In some embodiments, in order to further improve the sound leakage reduction effect, along the long-axis direction Y of the projection of the sound production component 11, the distance between the extremum point N' and the projection point K' of the upper vertex K on the ear hook 12 on the user's sagittal plane may be within a range of 8 mm-11 mm.

It should be noted that a method for measuring a relevant distance and angle of the projection of the earphone 10 on the user's sagittal plane may include: taking a picture parallel to the projection plane (the user's sagittal plane); measuring the relevant distance and angle on the picture, and then converting according to a scale of the picture to obtain actual data of the relevant distance and angle on the projection.

In some embodiments, in addition to reflecting the distance between the ear hook extremum point N and the upper vertex K through the distance of the projection points mentioned above, an actual measurement may also be carried out on the ear hook 12. In some embodiments, the distance between the ear hook extremum point N and the upper vertex K may be within a range of 6 mm-12 mm. In some embodiments, in order to further improve the sound leakage reduction effect, on the ear hook 12, the distance between the ear hook extremum point N and the upper vertex K may be within a range of 7 mm-11 mm. In some embodiments, in order to make the cavity-like structure formed by the sound production component 11 and the cavum concha have a more suitable volume and opening size/count, on the ear hook 12, the distance between the ear hook extremum point N and the upper vertex K may be within a range of 8 mm-11 mm.

Figure 7:
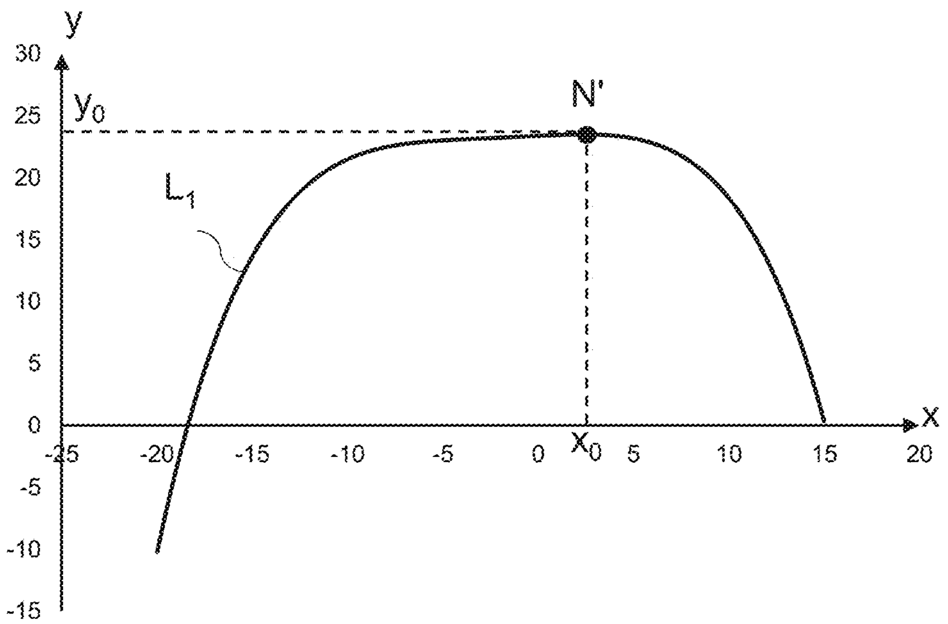
FIG. 7 is a schematic diagram illustrating an exemplary fitting function curve of a first curve according to some embodiments of the present disclosure.

FIG. 7 is a schematic diagram illustrating an exemplary fitting function curve of a first curve according to some embodiments of the present disclosure. As shown in FIG. 6 and FIG. 7, in some embodiments, the extremum point N' of the first curve L1 may be determined by curve fitting. It should be noted that if a position of an origin of an xoy coordinate system changes (e.g., positions of the x-axis and/or the y-axis change), a fitting function equation of the first curve L1 may also change correspondingly. Merely by way of example, the x-axis of the xoy coordinate system is arranged in the position of the long-axis of the projection of the sound production component 11 (the long-axis is a connection line connecting two endpoints with the largest extension size in the shape of the projection of the sound production component 11), and the y-axis is arranged 13 mm behind the projection point K' of the upper vertex K. Thus, by fitting the first curve L1 in this xoy coordinate system using a univariate quartic polynomial function, an exemplary fitting function equation for the first curve L1 can be obtained in the xoy coordinate system:

$$y=-0.0003059*x^{\wedge}4-0.002301*x^{\wedge}3-0.004005*x^{\wedge}2+0.07309*x+23.39. \quad \text{(Equation 1)}$$

In some embodiments, in order to enable an image of the fitting function equation to include the first curve L1, a value of an independent variable x of the fitting function equation may be relatively large, so that two end points (point P and point Q) of the first curve L1 are included, and the fitting function equation may completely reflect the features of the first curve L1. In some embodiments, the range of the value of the independent variable x of the fitting function equation (i.e., the equation 1) is [−20, 15], i.e., $-20 \le x \le 15$. Further, in order to reduce a part of an image of the fitting function equation (i.e., the equation 1) that does not correspond to the first curve L1 to enable the fitting function equation to reflect the features of the first curve L1 accurately, the range of the value of the independent variable x of the fitting function equation (i.e., the equation 1) is [−18, 12], i.e., $-18 \le x \le 12$.

By calculating an independent variable x0 corresponding to a first derivative y'=0 of equation 1, an abscissa of the extremum point N' of the first curve L1 in the xoy coordinate system may be determined (a method for determining the extremum point may be found in related descriptions hereinafter), and then the coordinates of the extremum point N' in the xoy coordinate system are determined by substituting the independent variable x0 into the equation 1. In equation 1 mentioned above, the coordinates of the extremum point N' are (2.3544, 23.5005).

It should be noted that a function equation (e.g., equation 1) of the first curve L1 obtained by polynomial fitting is an approximate expression of the first curve L1. When a count of sampling points for fitting the function equation is large (e.g., greater than 10) and evenly distributed, a curve represented by the function equation may be considered as the first curve L1. The function equation fitted in the present disclosure is only an example, mainly used to describe the features (including an extremum point, an inflection point, a first derivative, a second derivative, etc.) of the first curve L1. The specific function equation (e.g., equation 1) of the first curve L1 is related to the selection of the origin o of the coordinate system xoy. The function equation is different when the origin o is different. However, in the case of a horizontal axis (x-axis) and a vertical-axis (y-axis) of the coordinate system remaining unchanged, relative positions of the features of the first curve L1 such as the extremum point and the inflection point on the first curve L1 are certain, and properties of the first derivative and the second derivative of the first curve L1 are also certain, which do not vary with a position of the origin o of the coordinate system xoy. The present disclosure is non-limiting to the selection of the origin o of the coordinate system xoy for fitting the first curve L1 and the equation of the first curve L1. For example, in order to determine a position relationship between the extremum point and the upper vertex, the y-axis of the coordinate system xoy may be set to pass through the projection point K' of the upper vertex K, and the equation of the first curve L1 may change accordingly.

In some embodiments, the first derivative y' and the second derivative y" of the function equation y of the first curve L1 may be further determined. By calculating the abscissa x0 corresponding to the first derivative y'=0, and then determining whether a value of the second derivative y" corresponding to x0 is positive or negative, whether the extremum point N' is a maximum point or a minimum point may be determined. If a value of the second derivative y" corresponding to x0 is greater than 0, a corresponding coordinate point (x0, y0) is a minimum point; if the value of the second derivative y" corresponding to x0 is less than 0, then the corresponding coordinate point (x0, y0) is a maximum point. In some embodiments, the extremum point N' of the first curve L1 is a maximum point.

In some embodiments, the extremum point N' of the first curve L1 may also be determined in other ways. For example, the extremum point N' of the first curve L1 may be determined by determining a function value y and a function value y0 corresponding to different values in intervals near the left and right sides of x0, by determining a positivity and negativity difference of the values y' of the first derivative corresponding to the different values in intervals near the left and right sides of x0, etc., which are not limited in the present disclosure.

In some embodiments, instead of determining the extremum point N' of the first curve L1 by fitting the function equation of the first curve L1, the extremum point N' of the first curve L1 may be determined in other ways. For example, on a projection of the earphone 10 on the user's sagittal plane (the projection may be obtained by taking a picture directly facing the user's sagittal plane), a scale perpendicular to the long-axis direction Y is taken along the long-axis direction Y to move from point P' to point Q' of the first curve L1, and during the movement, when an intersection point between the first curve L1 and the scale has a maximum value on the scale, the intersection point is the extremum point N' of the first curve L1.

Figure 8:
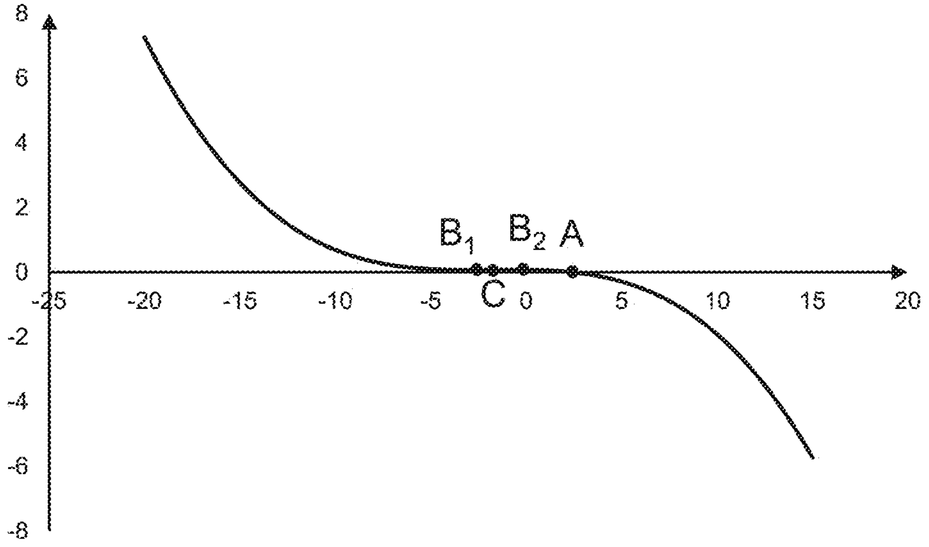
FIG. 8 is a schematic diagram illustrating an exemplary first derivative curve of a fitting curve according to some embodiments of the present disclosure.

FIG. 8 is a schematic diagram illustrating an exemplary first derivative curve of a fitting curve according to some embodiments of the present disclosure. As shown in FIG. 8, in some embodiments, the first curve L1 has a first derivative:

$$y'=-0.0012236*x^{\wedge}3-0.006903*x^{\wedge}2-0.00801*x+0.07309. \quad \text{(Equation 2)}$$

In some embodiments, the first derivative of the first curve L1 is continuous.

In some embodiments, the first derivative of the first curve L1 (i.e., equation 2) has a zero point (point A), i.e., equation y'=0 has one solution, which corresponds to an abscissa of point A. In some embodiments, according to equation 2, it may be determined that the coordinates of point A are (2.3544, 0). The abscissa of point A is substituted into equation 1 of the first curve L1, it may be known that a point of the first curve L1 corresponding to the abscissa of point A is a point having the maximum value of the first curve L1 in the xoy coordinate system, and the point is also the maximum point of the first curve L1 so that the point may be recorded as the extremum point N' of the first curve L1.

In some embodiments, in the first rectangular coordinate system xoy, the first derivative of the first curve L1 has one or more inflection points. In some embodiments, in the first rectangular coordinate system xoy, a count of the one or more inflection points of the first derivative of the first curve L1 is one, i.e., point C. As shown in FIG. 8, on the left side of point C, an image curve of the first derivative is a concave function; on the right side of point C, the image curve of the first derivative is a convex function. The point C is a change point of concavity and convexity of the image curve of the first derivative and is an inflection point of the first derivative.

In some embodiments, as shown in FIG. 8, in the first rectangular coordinate system xoy, parts on both sides of the inflection point of the first derivative of the first curve L1 respectively have extremum points (i.e., point B1 and point B2). Curves of the first derivative of the first curve L1 on the left side and the right side near point B1 are located above point B1, that is, in regions on the left side and right side near point B1, a function value of the first derivative corresponding to point B1 is the smallest, and point B1 is a minimum point of the first derivative. Curves of the first derivative of the first curve L1 on the left side and the right side near point B2 are located below point B2, that is, in regions on the left side and the right side near point B2, the function value of the first derivative corresponding to point B2 is the largest, and point B2 is a maximum point of the first derivative.

In some embodiments, the extremum point of the first derivative of the first curve L1 may also be determined according to a second derivative and a third derivative of the first curve L1, detailed descriptions of which may refer to a method for determining the extremum point of the first curve L1, which are not repeated here.

In some embodiments, according to equation 2, the coordinates of point B1 may be determined as (−3.0442, 0.0680), and the coordinates of point B2 may be determined as (−0.7168, 0.0757).

Figure 9:
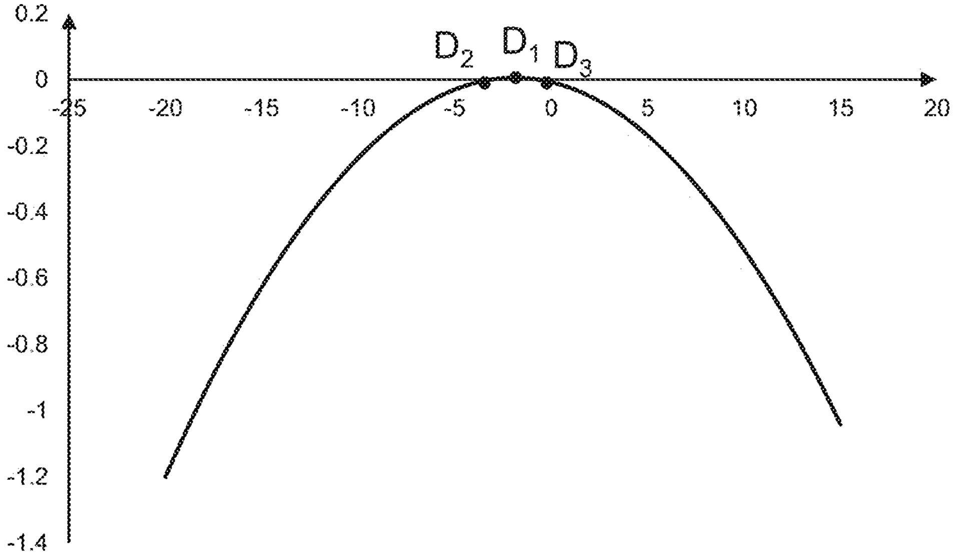
FIG. 9 is a schematic diagram illustrating an exemplary second derivative curve of a fitting curve according to some embodiments of the present disclosure.

FIG. 9 is a schematic diagram illustrating an exemplary second derivative curve of a fitting curve according to some embodiments of the present disclosure. As shown in FIG. 9, in some embodiments, the first curve L1 has a second derivative:

$$y''=-0.0036708*x^2-0.013806*x-0.00801. \quad \text{(Equation 3)}$$

In some embodiments, the second derivative of the first curve L1 is continuous.

In some embodiments, in the first rectangular coordinate system xoy, the second derivative of the first curve L1 has a maximum point, i.e., point D1. As shown in FIG. 9, curves of the second derivative of a fitting curve L2 on the left side and the right side near point D1 are all located below point D1, that is, in regions on the left side and the right side near point D1, a function value of the second derivative corresponding to point D1 is the largest, and point D1 is the maximum point of the second derivative.

In some embodiments, the second derivative of the first curve L1 has two zero points (i.e., point D2 and point D3), and an abscissa of point D2 corresponds to an abscissa of the extremum point B1 of the first derivative, that is, x=−0.30442. An abscissa of point D3 corresponds to an abscissa of the extremum point B2 of the first derivative, that is, x=−0.7168.

In some embodiments, as shown in FIG. 3, the sound production component 11 and the ear hook 12 may jointly clamp the ear 100 from the front and rear sides of the ear 100 (e.g., the cavum concha 102), and the formed clamping force may be mainly manifested as a compressive stress, thereby improving the stability and comfort of the earphone 10 in the wearing state.

In some embodiments, the ear hook 12 of the earphone 10 is a variable cross-section structure, and a cross-section of the ear hook 12 at a corresponding point N of the extremum point N' of the first curve L1 on the ear hook has the smallest area. The variable cross-section structure refers that the ear hook 12 has positions or regions with different cross-section shapes or sizes along its extending direction. By setting the ear hook 12 as the variable cross-section structure, cross-sections of different positions of the ear hook 12 may be set separately to meet the fitting requirements of different positions on the ear 100 of the user.

In some embodiments, due to a limited space between the user's ear and head, a cross-section of the ear hook 12 corresponds to an arc section (e.g., an arc within 5 mm from the ear hook extremum point N) near the ear hook extremum point N may be set smaller than cross-sections of other parts, so that the ear hook 12 overall presents a shape that is thinner in the middle and thicker on both sides, thereby causing the ear hook 12 to be better accommodated in the space between the user's ear and head, which enhances the wearing comfort of the earphone 10.

In some embodiments, a cross-section at the corresponding point N of the extremum point N' on the ear hook may be set to the smallest, and when the earphone 10 changes from a non-wearing state to a wearing state, between the sound production component 11 and an end portion (e.g., the battery compartment) of the ear hook 12 away from the sound production component 11 may be stretched, at which time the extremum point N' of the ear hook 12 generates a large strain at the corresponding point N on the ear hook so that that point forms a clamping fulcrum when worn. It should be noted that the position at which the area of the cross-section is the smallest being set at the corresponding point N of the extremum point N' on the ear hook may not have to be completely accurate. Within the range allowed by the engineering error, the position may be set at a distance of 3 mm from the corresponding point N of the extremum point N' on the ear hook.

The clamping fulcrum mentioned here may be understood as a fulcrum on the ear hook 12 that contacts the auricle and provides support for the earphone when the earphone is worn. Considering that there exists a continuous region on the ear hook 12 that contacts and provides support to a side of the auricle towards the head, for ease of understanding, in some embodiments, the corresponding point N of the extremum point N' on the ear hook 12 located in this region may be regarded as the clamping fulcrum.

In some embodiments, the direction of the clamping force may be a direction of a line connecting two clamping points (or a central point of a clamping surface) of the earphone clamped on both sides of the auricle. When the shape and the dimension of the sound production component 11 are constant, the direction of the clamping force may be closely related to an orientation of the sound production component 11 in the cavum concha 102 and a depth of the sound production component 11 extending into the cavum concha 102. In addition, in order to make the earphone more stable to wear, the direction of the clamping force should be kept the same as or substantially the same as a direction of a pressure exerted by the sound production component 11 on the cavum concha 102 and a direction of a pressure exerted by the ear hook clamping point E on the back of the ear to avoid the tendency of relative movement between the sound production component 11 and the ear hook 12. Therefore, the direction of the clamping force may also affect the wearing stability of the earphone. Since regions of the back of the ear 100 opposite to the cavum concha 102 are limited, and the direction of the pressure of the ear hook 12 on the ear 100 in these regions is usually parallel or roughly parallel to the sagittal plane of the user, an angle between the direction of the clamping force and the sagittal plane of the user may keep in a certain range. In other words, the direction of the clamping force may be parallel or substantially parallel to the sagittal plane of the user. If the aforementioned angle deviates too much from 0°, a gap between the inner side surface IS of the sound production component 11 and the cavum concha 102 may be too large, that is., an opening of the cavity-like structure may be excessively large, thus the contained sound source (i.e., the sound outlet located at the inner side surface IS) radiates more sound components directly into the environment, and the sound that reaches the listening position is smaller, at the same time, the sound from the outside sound source entering the cavity-like structure may increase, resulting in the cancellation of the near-field sound, which in turn leads to a smaller listening index; or the position of the sound production component 11 in the cavum concha 102 may deviate toward the side of the ear 100 toward the head, the inner side surface IS on the sound production component 11 may be attached to the upper edge of the cavum concha 102, and the gap between the inner side surface IS of the sound production component 11 and the cavum concha 102 may be too small (or the count of the gaps may be too small), or even the internal environment may be completely sealed and isolated from the external environment, resulting in a poor sound leakage reduction effect. In addition, if the aforementioned angle deviates too much from 0°, the wearing stability of the earphone 10 may be poor, and shaking may easily occur. The listening index takes a reciprocal 1/α of a sound leakage index α as an evaluation effect of each configuration. The listening index means the size of the listening volume when the sound leakage is the same. From an application, the listening index should be as large as possible. If the gap is too small (e.g., the opening of the cavity-like structure is too small), the sound leakage reduction effect may be poor. If too few gaps are formed, a count of the opening of the cavity-like structure may be small. Compared with the cavity structure with fewer openings, the cavity structure with more openings may better improve a resonant frequency of the air-conducted sound in the cavity structure, so that the whole device may have a better listening index in a high-frequency range (e.g., sound with a frequency close to 10000 Hz) than the cavity structure with fewer openings. Moreover, the high-frequency range is a frequency range that the human ear is more sensitive to, so the demand for leakage reduction is greater. Therefore, if too few gaps are formed, the sound leakage reduction effect in the high-frequency range cannot be improved. It should be noted that the direction of the clamping force may be determined by affixing a force sensor (e.g., a strain gauge) or a force sensor array on the side of the auricle toward the head and the side of the auricle away from the head, and reading a force distribution at a clamped position. For example, if there is a point where the force may be measured on the side of the auricle toward the head and the side of the auricle away from the head, it can be considered that the direction of the clamping force may be the direction of the line connecting the two points.

In some embodiments, in order to meet wearing requirements, an angle between the direction of the clamping force and the sagittal plane of the user may be in a range of −30° to 30°. In some embodiments, in order to improve the listening index, the angle between the direction of the clamping force and the sagittal plane of the user may be in a range of −20° to 20°. In some embodiments, in order to further improve the sound leakage reduction effect, the angle between the direction of the clamping force and the sagittal plane of the user may be in a range of −10° to 10°. In some embodiments, in order to further increase the wearing stability of the earphone 10, the angle between the direction of the clamping force and the sagittal plane of the user may be in a range of −8° to 8°. In some embodiments, the direction of the clamping force may be adjusted by designing a curve configuration of the ear hook 12, and/or designing the shape and the dimension of the sound production component 11, and/or designing the position of the clamping region center C.

In some embodiments, as shown in FIG. 3, in the wearing state, viewed along the direction of the coronal axis of the human body, a connection end CE may be closer to the top of the head than the free end FE, so that the free end FE may extend into the cavum concha 102. Accordingly, an angle between the long-axis direction Y and the sagittal-axis direction of the human body may keep in a certain range. When the shape and the dimension of the sound production component 11 are constant, if the aforementioned angle is too small, the upper side surface US of the sound production component 11 may be attached to the upper edge of the cavum concha 102, and the gap between the upper side surface US and the cavum concha 102 may be too large (or the count of the gaps may be too small), resulting in a poor sound leakage reduction effect, and a long distance between the sound outlet of the sound production component 11 and the external auditory canal 101. When the shape and the dimension of the sound production component 11 are constant, if the aforementioned angle is too large, the gap between the upper side surface US of the sound production component 11 and the cavum concha 102 may be too large, i.e., the opening of the formed cavity-like structure may be too large, resulting in a smaller listening index.

In In some embodiments, in order to make the earphone have a better listening index when the earphone is worn, the angle between the long-axis direction Y and the sagittal-axis direction of the human body may be in a range of 15° to 60°. In some embodiments, in order to further improve the sound leakage reduction effect, the angle between the long-axis direction Y and the sagittal-axis direction of the human body may be in a range of 20° to 50°. In some embodiments, in order to have a proper distance between the sound outlet and the external auditory canal 101, the angle between the long-axis direction Y and the sagittal-axis direction of the human body may be in a range of 23° to 46°.

In order to further measure the clamping force provided by the ear hook 12 in the wearing state, a degree of difficulty of deformation of the ear hook 12 based on the clamping fulcrum may be defined as a clamping coefficient based on the clamping fulcrum in the present disclosure. In some embodiments, a value of the clamping coefficient of the ear hook 12 based on the clamping fulcrum may be kept in a certain range. If the above-mentioned clamping coefficient is too large, the clamping force may be too large during wearing, the user's ear 100 may feel a strong pressure, and a wearing position may be difficult to adjust after wearing. Besides, the upper side surface US of the sound production component 11 may be attached to the upper edge of the cavum concha 102, and the gap between the sound production component 11 and the cavum concha 102 may be too small (or the count of the gaps may be too small), resulting in a poor sound leakage reduction effect. If the aforementioned clamping coefficient is too small, the wearing of the ear hook 12 may not be stable enough, the sound production component 11 may be easily separated from the auricle, and the gap between the sound production component 11 and the cavum concha 102 may be too large, i.e., the opening of the formed cavity-like structure may be too large, resulting in a smaller listening index.

In some embodiments, in order to meet the wearing requirements, the value of the clamping coefficient of the ear hook 12 based on the clamping fulcrum may be in a range of 10 N/m to 30 N/m. In some embodiments, in order to increase the adjustability after wearing, the value of the clamping coefficient of the ear hook 12 based on the clamping fulcrum may be in a range of 11 N/m to 26 N/m. In some embodiments, in order to increase the stability after wearing, the value of the clamping coefficient of the ear hook 12 based on the clamping fulcrum may be in a range of 15 N/m to 25 N/m. In some embodiments, in order to make the earphone have a better listening index when the earphone is worn, the value of the clamping coefficient of the ear hook 12 based on the clamping fulcrum may be in a range of 17 N/m to 24 N/m. In some embodiments, in order to further improve the sound leakage reduction effect, the value of the clamping coefficient of the ear hook 12 based on the clamping fulcrum may be in a range of 18 N/m to 23 N/m. The clamping coefficient of the ear hook 12 based on the clamping fulcrum may reflect a degree of difficulty in stretching the sound production component 11 away from the ear hook 12. In some embodiments, the clamping coefficient of the ear hook 12 based on the clamping fulcrum may be expressed as, in the wearing state, a relationship between a distance between the sound production component 11 and the ear hook 12 and a force generated by the ear hook 12 that drives the sound production component 11 to close to the first portion of the ear hook. It should be noted that the distance between the sound production component 11 and the ear hook 12 may be a change in the distance between the sound production component 11 and the ear hook 12 in the long-axis direction Y of the sound production component from the non-wearing state to the wearing state; the value range of the clamping coefficient of the ear hook 12 based on the clamping fulcrum may be determined by an exemplary process below, the ear hook 12 may be equivalent to a spring, and a specific relationship between a stretching distance of the spring and the clamping force is shown in formula (1):

$$F=kx, \tag{1}$$

where F represents the clamping force, k represents the clamping coefficient, and x represents the stretching distance.

Based on the above formula (1), the clamping coefficient may be determined by the following process: clamping forces corresponding to different stretching distances are measured by a tension meter, and at least one set of clamping forces and stretching distances are determined. At least one intermediate clamping coefficient may be determined by substituting at least one set of clamping forces and corresponding stretching distances into formula (1). An average value of the at least one intermediate clamping coefficient is then calculated and used as the clamping coefficient. Alternatively, the clamping force may be determined by measuring a clamping force for stretching the distance in a normal wearing state by the tension meter. The clamping coefficient may be determined by substituting the clamping force and the stretching distance into the formula (1).

In some embodiments, in the wearing state, the ear hook 12 may generate the clamping force for driving the sound production component 11 to be close to the first portion of the ear hook, and the clamping force may keep in a certain range. It should be noted that the clamping force refers to a clamping force corresponding to a preset stretching distance measured by the tension meter, and the preset distance may be a distance under the standard wearing condition; the clamping force may also be determined by attaching the force sensor (e.g., the strain gauge) or the force sensor array to both the side of the auricle toward the head and the side of the auricle away from the head, and reading a value of the force of the clamped position of the auricle. For example, if forces are measurable at two points corresponding to the same position on the side of the auricle toward the head and the side of the auricle away from the head, the force (e.g., any of the two forces) may be measured as the clamping force. If the aforementioned clamping force is too small, the ear hook 12 and the sound production component 11 may not be effectively clamped on the front and rear sides of the ear 100 in the wearing state, resulting in poor wearing stability. When the sound production component 11 cannot effectively clamp the cavum concha 102, the gap between the sound production component 11 and the cavum concha 102 may be too large, i.e., the opening of the formed cavity-like structure may be too large, resulting in a smaller listening index. If the aforementioned clamping force is too large, the earphone 10 may exert a strong pressure on the user's ear 100 in the wearing state, making the earphone 10 difficult to adjust the wearing position after wearing. Moreover, if the aforementioned clamping force is too large, the pressure of the sound production component 11 on the cavum concha 102 may be too large, which may increase the tendency of the sound production component 11 to rotate around the clamping fulcrum, the clamping region of the sound production component 11 may slide toward the position of the clamping fulcrum, and then the sound production component 11 may not be located in an expected position in the cavum concha 102, i.e., the side wall of the sound production component 11 may be attached to the upper edge of the cavum concha 102, the gap between the side wall of the sound production component 11 and the cavum concha 102 may be too small (or the count of the gaps may be too small), resulting in poor sound leakage reduction effect.

In some embodiments, in order to meet the wearing requirements, the value of the clamping force generated by the ear hook 12 to drive the sound production component 11 to be close to the first portion of the ear hook may be in a range of 0.03 N to 1 N. In some embodiments, in order to increase the adjustability after wearing, the value of the clamping force generated by the ear hook 12 to drive the sound production component 11 to be close to the first portion of the ear hook may be in a range of 0.05 N to 0.8 N. In some embodiments, in order to increase the stability after wearing, the value of the clamping force generated by the ear hook 12 to drive the sound production component 11 to be close to the first portion of the ear hook may be in a range of 0.2 N to 0.75 N. In some embodiments, in order to make the earphone have a better listening index in the wearing state, the value of the clamping force generated by the ear hook 12 to drive the sound production component 11 to be close to the first portion of the ear hook may be in a range of 0.3 N to 0.7 N. In some embodiments, in order to further improve the sound leakage reduction effect, the value of the clamping force generated by the ear hook 12 to drive the sound production component 11 to be close to the first portion of the ear hook may be in a range of 0.35 N to 0.6 N.

In some embodiments, a distance between the extremum point N' and the projection point K' of the upper vertex K of the ear hook on the user's sagittal plane may affect the clamping force of the sound production component 11 and the ear hook 12 on the auricle. Specifically, since the clamping fulcrum is located at the corresponding point N of the extremum point N' on the ear hook and the upper vertex K of the ear hook is the highest point of the inner contour of the ear hook along the vertical-axis of the user in the wearing state, the distance between the extremum point N' and the projection point K' of the upper vertex K of the ear hook on the user's sagittal plane may affect a position of the extremum point N' relative to the cavum concha 102 of the user. When the earphone 10 is clamped to the cavum concha 102 of the user, the position of the extremum point N' may affect the force arm of a "clamping force lever," and furthermore, the force arm of the "clamping force lever" may affect the clamping force. That is, the smaller the distance between the extremum point N' and the projection point K' of the upper vertex K of the ear hook on the user's sagittal plane, the higher the position of the extremum point N' is relative to the ear (or cavum concha 102) of the user, and the larger the force arm of the "clamping force lever," the smaller the clamping force. The larger the distance between the extremum point N' and the projection point K' of the upper vertex K of the ear hook on the user's sagittal plane, and the lower the extremum point N' is relative to the ear (or cavum concha 102) of the user, the smaller the force arm of the "clamping force lever," the greater the clamping force. The "clamping force lever" refers to a lever with the extremum point N' as a fulcrum point (fixed point) and clamping on both sides of the ear of the user (e.g., a front side and a rear side of the cavum concha 102). In some embodiments, in order to improve the wearing comfort and stability of the earphone 10, the distance between the extremum point N' and the projection point K' of the upper vertex K of the ear hook on the user's sagittal plane may be within a range of 6 mm-15 mm. Correspondingly, the value of the clamping force generated by the ear hook 12 to drive the sound production component 11 to be close to the first portion of the ear hook may be within a range of 0.03 N-1 N.

FIG. 10 is a structural diagram illustrating another exemplary structure of the earphone shown in FIG. 3. Referring to FIG. 3 and FIG. 4, in some embodiments, the sound production component 11 may include a transducer and a housing accommodating the transducer. The housing may include an inner side surface IS toward the ear 100 and an outer side surface OS back to the ear 100 along the thickness direction X in the wearing state. The housing may also include a connection surface connecting the inner side surface IS and the outer side surface OS. It should be noted that in the wearing state, when viewed along a direction of the coronal axis (i.e., the thickness direction X), the sound production component 11 may be provided in a shape of a circle, an oval, a rounded square, a rounded rectangle, etc. When the sound production component 11 is provided in the shape of a circle, an ellipse, etc., the above-mentioned connection surface refers to an arc-shaped side surface of the sound production component 11; and when the sound production component 11 is provided in the shape of a rounded square, a rounded rectangle, etc., the above-mentioned connection surface may include a lower side surface LS, an upper side surface US, and a rear side surface RS as mentioned later. Therefore, for ease of description, this embodiment is exemplarily illustrated with the sound production component 11 set in a rounded rectangle. The length of the sound production component 11 in the long-axis direction Y may be greater than the width of the sound production component 11 in the short-axis direction Z. As shown in FIG. 10, the sound production component 11 may have the upper side surface US back to the external auditory canal 101 and the lower side surface LS toward the external auditory canal 101 along the short-axis direction Z in the wearing state, and also have the rear side surface RS connecting the upper side surface US and the lower side surface LS. The rear side surface RS may be located at an end of the long-axis direction Y toward the back of the head in the wearing state, and at least partially located in the cavum concha 102.

Further, the housing may at least partially extend into the user's cavum concha 102. A portion of the housing at least partially extending into the user's cavum concha 102 may include at least one clamping region in contact with the side wall of the user's cavum concha 102. The clamping region may be arranged at the free end FE of the sound production component 11. In some embodiments, the orthographic projection of the ear hook 12 on a reference plane (e.g., an XZ plane in FIG. 10) perpendicular to the long-axis direction Y may partially overlap with the orthographic projection of the free end FE on the same reference plane (as shown in a shaded portion on the rear side surface RS in the figure), thereby forming a projection overlapped region. The clamping region may be defined as a region on the rear side surface RS that forms the projection overlapped region on the reference plane. The projection overlapped region formed by the orthographic projection of the ear hook 12 on the aforementioned reference plane and the orthographic projection of the free end FE on the same reference plane may be located between the inner side surface IS and the outer side surface OS in the thickness direction X. In this way, not only the sound production component 11 and the ear hook 12 may jointly clamp the ear 100 from the front and rear sides of the ear 100, but also the formed clamping force may be mainly expressed as a compressive stress, thereby improving the stability and comfort of the acoustic device 10 in the wearing state. It can be understood that when the sound production component 11 is provided in the shape of a circle, an ellipse, etc., the clamping region may be defined as a region on a connection surface (a curved side of the sound production component 11) corresponding to the projection overlapped region. The clamping region may be a region of the sound production component 11 configured to clamp the cavum concha 102. However, different users may have individual differences, resulting in different shapes, dimensions, etc., of ears. In the actual wearing state, the clamping region may not necessarily clamp the cavum concha 102, but for most users and the aforementioned standard ear model 100, the clamping region clamps the user's cavum concha 102 in the wearing state.

In some embodiments, the clamping region and/or an inner side of the clamping region may be provided with a flexible material. The specific descriptions regarding the flexible material may be found elsewhere in the present disclosure (e.g., FIG. 20 and corresponding descriptions thereof).

Figure 11:
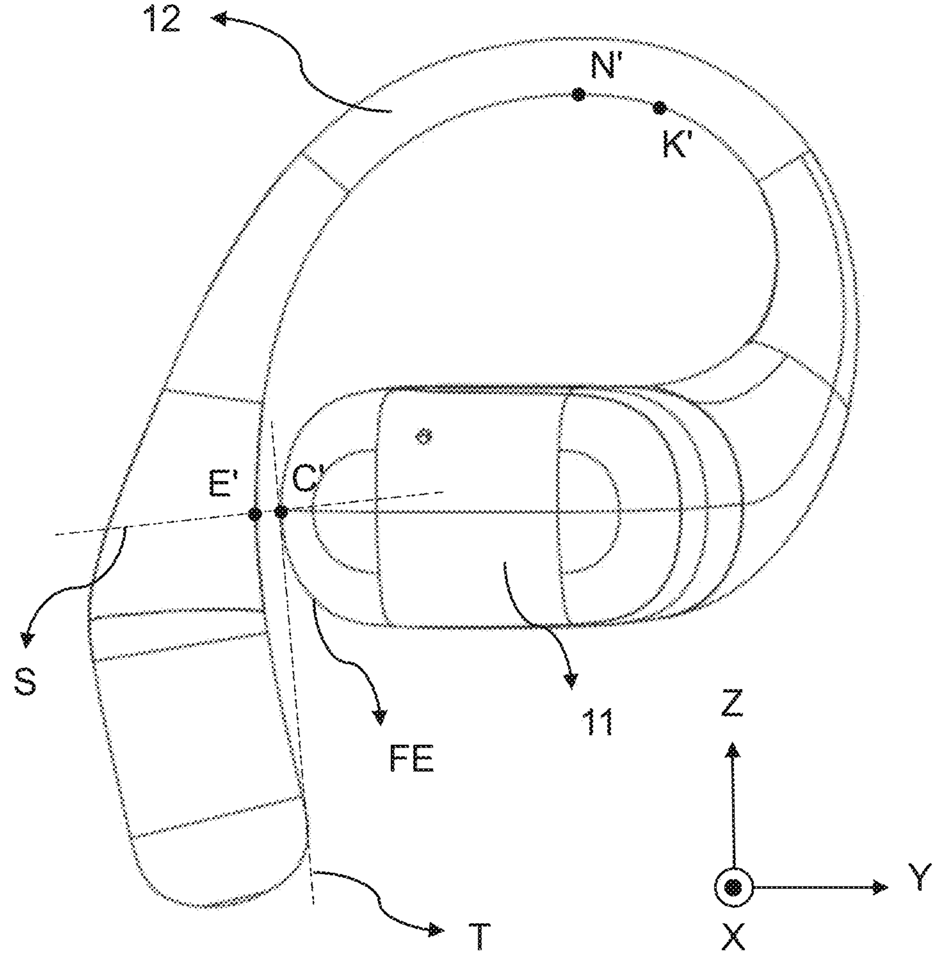
FIG. 11 is a schematic diagram illustrating a projection point of a clamping region center of the earphone shown in FIG. 3 on a user's sagittal plane and a projection point of an ear hook clamping point on the user's sagittal plane.

The clamping region center C refers to a point capable of representing the clamping region and is configured to describe the position of the clamping region relative to other structures. In some embodiments, the clamping region center C may be configured to represent a position where the clamping region exerts the greatest force on the ear 100 in a standard wearing condition. The standard wearing condition may be a condition in which the earphone is correctly worn on the aforementioned standard ear model according to a wearing specification. In some embodiments, when the sound production component 11 is provided in the shape of a circle, an oval, a rounded square, a rounded rectangle, etc., an intersection point between the long-axis of the sound production component and the clamping region may be defined as the clamping region center C. It should be noted that the long-axis of the sound production component may be a central axis of the sound production component 11 along the aforementioned long-axis direction Y. The clamping region center C may be determined as follows: an intersection point between an orthographic projection of the sound production component 11 on a reference plane (e.g., an XZ plane in FIG. 11) perpendicular to the long-axis direction Y and an orthographic projection of the central axis on the same reference plane may be determined, and the clamping region center C may be defined as a point on the sound production component 11 that forms the intersection point on the reference plane. In other embodiments, when the long-axis of the sound production component 11 is difficult to determine (e.g., the sound production component 11 is provided in an irregular shape), as shown in FIG. 11, the clamping region center C may be defined as an intersection point between a tangent plane of the free end FE and the end of the ear hook 12 away from the sound production component 11 (e.g., the battery compartment) and the free end FE. The clamping region center C may be determined as follows: a tangent line T of an orthographic projection of the sound production component 11 on a reference plane (e.g., a YZ plane in FIG. 11) and an orthographic projection of the end of the ear hook 12 (e.g., the battery compartment) on the same reference plane may be determined, an intersection point between the tangent line T on the reference plane and the orthographic projection of the free end FE may be determined, and the clamping region center C may be defined as a point of the free end FE that forms the intersection point on the reference plane.

In some embodiments, after the shape and size of the sound production component 11 are determined, by designing, in the wearing state, a distance between the projection point C' of the clamping region center C on the user's sagittal plane and the extremum point N', or a distance between the projection point C' of the clamping region center C on the user's sagittal plane and the projection point K' of the upper vertex K on the user's sagittal plane may simultaneously change a covering position of the sound production component 11 in the cavum concha 102 in the wearing state, and the clamping position of the sound production component 11 for clamping the cavum concha 102 (or even the tragus near the cavum concha 102), which may not only affect the stability and comfort of the user in wearing the earphone but also affect the listening effect of the earphone. That is, in the wearing state, the distance between the projection point C' of the clamping region center C on the user's sagittal plane and the extremum point N' or the distance between the projection point C' of the clamping region center C on the user's sagittal plane and the projection point K' of the upper vertex K on the user's sagittal plane needs to be kept within a certain range. When the shape and the dimension of the sound production component 11 are constant, if the aforementioned distance is too large, the position of the sound production component 11 in the cavum concha 102 may be lower, and a gap between the upper side surface US of the sound production component 11 and the cavum concha 102 may be too large, thereby causing the listening index relatively small. When the shape and the dimension of the sound production component 11 are constant, if the aforementioned distance is too small, the upper side surface US of the sound production component 11 may be attached to the upper edge of the cavum concha 102, and the gap between the upper side surface US and the cavum concha 102 may be too small (or a count of gaps may be two small), even making the internal environment completely sealed and isolated from the external environment, and failing to form the cavity-like structure, thereby leading to a poor sound leakage reduction effect.

In some embodiments, in order to make the earphone have a better listening index, in the wearing state, the distance between the projection point C' of the clamping region center C on the user's sagittal plane and the extremum point N' may be within a range of 20 mm-40 mm. In some embodiments, in order to further improve the sound leakage reduction effect, in the wearing state, the distance between the projection point C' of the clamping region center C on the user's sagittal plane and the extremum point N' may be within a range of 23 mm-35 mm. In some embodiments, in order to make the cavity-like structure formed by the sound production component 11 and the cavum concha 102 have a more suitable volume and size/count of the opening, in the wearing state, the distance between the projection point C' of the clamping region center C on the user's sagittal plane and the extremum point N' may be within a range of 25 mm-32 mm.

In some embodiments, in order to make the earphone have a better listening index, in a wearing state, the distance between the projection point C' of the clamping region center C on the user's sagittal plane and the projection point K' of the upper vertex K on the user's sagittal plane may be within a range of 25 mm-40 mm. In some embodiments, in order to further improve the sound leakage reduction effect, in the wearing state, the distance between the projection point C' of the clamping region center C on the user's sagittal plane and the projection point K' of the upper vertex K on the user's sagittal plane may be within a range of 30 mm-38 mm. In some embodiments, in order to make the cavity-like structure formed by the sound production component 11 and the cavum concha 102 have a more suitable volume and size/count of the opening, the distance between the projection point C' of the clamping region center C on the user's sagittal plane and the projection point K' of the upper vertex K on the user's sagittal plane may be within a range of 32 mm-36 mm.

In some embodiments, when the shape and dimension of the sound production component 11 are determined, by designing, in the non-wearing state, a distance between the clamping region center C and the corresponding point N of the extremum point N' on the ear hook 12, or a distance between the clamping region center C and the upper vertex K may simultaneously change the covering position of the sound production component 11 in the cavum concha 102 in the wearing state and the clamping position of the sound production component 11 clamping the cavum concha 102 (or even the tragus near the cavum concha 102), which may not only affect the stability and comfort of the user in wearing the earphone, but also affect the listening effect of the earphone. That is, in the non-wearing state, the distance between the clamping region center C and the corresponding point N of the extremum point N' on the ear hook 12, or the distance between the clamping region center C and the upper vertex K, needs to be kept within a certain range. It should be noted that the measurement of the distances of different points on the earphone 10 in three-dimensional space may be carried out in a suitable manner according to an actual situation. For example, for the earphone 10 in a non-wearing state, a distance between two points to be measured on the ear hook 12 may be measured directly with a ruler after determining the positions of the two points to be measured on the ear hook 12. For the earphone 10 in a wearing state, first, a relative position of various parts of the earphone 10 may be fixed, and then the earphone 10 may be removed from the ear (or an ear model used for wearing may be removed) to simulate a morphology of the earphone 10 in the wearing state, and at the same time, to facilitate the subsequent use of the ruler to directly measure distances between different points on the ear hook 12. In some embodiments, considering that the distances between different points on the ear hook 12 in the three-dimensional space are close to distances between projection points of these points on the sagittal plane or the first plane (e.g., the difference between the two is no more than 10%), the distances between the projection points of these points on the sagittal plane or the first plane may also be considered as their distances in the three-dimensional space. Accordingly, for the earphone 10, a photograph parallel to the projection plane (the sagittal plane or the first plane) may be taken, relevant distances may be measured on the photograph, and then converted according to a scale of the photograph to obtain the relevant distances on the projection plane. When the shape and the dimension of the sound production component 11 are constant, if the aforementioned distance (i.e., in the non-wearing state, the distance between the clamping region center C and the corresponding point N of the extremum point N' on the ear hook 12, or the distance between the clamping region center C and the upper vertex K) is too large, the position of the sound production component 11 in the cavum concha 102 may be lower, and a gap between the upper side surface US of the sound production component 11 and the cavum concha 102 may be too large, which in turn leads to a smaller listening index. When the shape and the dimension of the sound production component 11 are constant, if the aforementioned distance is too small, the upper side surface US of the sound production component 11 may be attached to the upper edge of the cavum concha 102, and the gap between the upper side surface US and the cavum concha 102 may be too small (or a count of gaps may be two small), even making the internal environment completely sealed and isolated from the external environment, thereby failing to form the cavity-like structure and leading to a poor sound leakage reduction effect.

In some embodiments, in order to make the earphone have a better listening index, in the non-wearing state, the distance between the clamping region center C and the corresponding point N of the extremum point N' on the ear hook 12 may be within a range of 20 mm-35 mm. In some embodiments, in order to further improve the sound leakage reduction effect, the distance between the clamping region center C and the corresponding point N of the extremum point N' on the ear hook 12 may be within a range of 22 mm-30 mm. In some embodiments, in order to make the cavity-like structure formed by the sound production component 11 and the cavum concha 102 have a more suitable volume and size/count of the opening, in the non-wearing state, the distance between the clamping region center C and the corresponding point N of the extremum point N' on the ear hook 12 may be within a range of 26 mm-29 mm.

In some embodiments, in order to make the earphone have a better listening index, in the wearing state, the distance between the clamping region center C and the upper vertex K may be within a range of 25 mm-40 mm. In some embodiments, in order to further improve the sound leakage reduction effect, in the non-wearing state, the distance between the clamping region center C and the upper vertex K may be within a range of 27 mm-35 mm. In some embodiments, in order to make the cavity-like structure formed by the sound production component 11 and the cavum concha 102 have a more suitable volume and size/count of the opening, in the non-wearing state, the distance between the clamping region center C and the upper vertex K may be within a range of 30 mm-33 mm.

In some embodiments, when the shape and dimension of the sound production component 11 are determined, in the wearing state, a difference between the distance between the projection point C' of the clamping region center C on the user's sagittal plane and the extremum point N' and the distance between the projection point C' of the clamping region center C on the user's sagittal plane and the projection point K' of the upper vertex K on the user's sagittal plane may reflect a positional relationship between the extremum point N' and the projection point K' of the upper vertex K of the ear hook on the user's sagittal plane (e.g., a distance between the extremum point N' and the projection point K' of the upper vertex K of the ear hook on the user's sagittal plane). Since the upper vertex K of the ear hook is the highest point of the inner contour of the ear hook along the vertical-axis of the user in the wearing state, the positional relationship between the extremum point N' and the projection point K' of the upper vertex K of the ear hook on the user's sagittal plane may reflect a positional relationship of the extremum point N' relative to the ear of the user when the user wears the earphone. In the non-wearing state, a difference between the distance between the clamping region center C and the corresponding point N of the extremum point N' on the ear hook 12 and the distance between the clamping region center C and the upper vertex K may also reflect a positional relationship between the corresponding point N of the extremum point N' on the ear hook 12 and the upper vertex K of the ear hook 12 (e.g., a distance between the corresponding point N of the extremum point N' on the ear hook 12 and the upper vertex K of the ear hook). The positional relationship between the corresponding point N of the extremum point N' on the ear hook 12 and the upper vertex K of the ear hook 12 may also reflect a positional relationship of the corresponding point N of the extremum point N' on the ear hook 12 relative to the ear of the user when wearing the earphone. The greater the aforementioned difference (i.e., in the wearing state, the difference between the distance between the projection point C' of the clamping region center C on the user's sagittal plane and the extremum point N' and the distance between the projection point C' of the clamping region center C on the user's sagittal plane and the projection point K' of the upper vertex K on the user's sagittal plane, or, in the non-wearable state, the difference between the distance between the clamping region center C and the corresponding point N of the extremum point N' on the ear hook 12 and the distance between the clamping region center C and the upper vertex K), the greater the distance between the extremum point N' and the projection point K' of the upper vertex K of the ear hook on the user's sagittal plane, or the greater the distance between the corresponding point N of the extremum point N' on the ear hook 12 and the upper vertex K of the ear hook, when the user wears the earphone, the lower the position of the extremum point N' relative to the ear, the smaller the force arm of the "clamping force lever," and the larger the clamping force. The smaller the aforementioned difference, the smaller the distance between the extremum point N' and the projection point K' of the upper vertex K of the ear hook on the user's sagittal plane, or the smaller the distance between the corresponding point N of the extremum point N' on the ear hook 12 and the upper vertex K of the ear hook, when the user wears the earphone, the higher the position of the extremum point N' relative to the ear, the greater the force arm of the "clamping force lever," and the smaller the clamping force.

In some embodiments, in the wearing state, the difference between the distance between the projection point C' of the clamping region center C on the user's sagittal plane and the extremum point N' and the distance between the projection point C' of the clamping region center C on the user's sagittal plane and the projection point K' of the upper vertex K on the user's sagittal plane, or, in the non-wearing state, the difference between the distance between the clamping region center C and the corresponding point N of the extremum point N' on the ear hook 12 and the distance between the clamping region center C and the upper vertex K, needs to be kept within a certain range. If the aforementioned difference is too small, the clamping force may be too small in the wearing state, and the ear hook 12 and the sound production component 11 may not be effectively clamped on the front and rear sides of the ear 100, resulting in poorer wearing stability. Meanwhile, when the sound production component 11 is unable to form an effective clamping on the cavum concha 102, the gap between the sound production component 11 and the cavum concha 102 may be too large, i.e., the opening of the cavity-like structure is too large, resulting in a smaller listening index. If the aforementioned difference is too large, the clamping force may be too large in the wearing state, which may lead to a strong sense of pressure on the ear 100 of the user by the earphone 10 in the wearing state, and it may be not easy to adjust the wearing position after wearing. Moreover, the aforementioned difference being too large may lead to an excessive pressure on the cavum concha 102 of the sound production component 11 and lead to an increase in the tendency of the sound production component 11 to rotate around the clamping fulcrum, as a result, the clamping region of the sound production component 11 may slide toward the position of the clamping fulcrum, so that the sound production component 11 may not be in an expected position in the cavum concha 102. At this time, the side wall of the sound production component 11 may be in contact with the upper edge of the cavum concha 102, causing the gap between the side wall of the sound production component 11 and the cavum concha 102 to be too small or a count of gaps being too few, thereby resulting in a poor sound leakage reduction effect.

In some embodiments, in order to satisfy the wearing requirement, in the wearing state, a difference between the distance between the projection point C' of the clamping region center C on the user's sagittal plane and the extremum point N' and the distance between the projection point C' of the clamping region center C on the user's sagittal plane and the projection point K' of the upper vertex K on the user's sagittal plane may be within a range of 2 mm-6 mm. In some embodiments, in order to increase the adjustability after wearing and to further improve the sound leakage reduction effect, in the wearing state, the difference between the distance between the projection point C' of the clamping region center C on the user's sagittal plane and the extremum point N' and the distance between the projection point C' of the clamping region center C on the user's sagittal plane and the projection point K' of the upper vertex K on the user's sagittal plane may be within a range of 2.2 mm-5 mm. In some embodiments, in order to increase the stability after wearing and to make the earphone have a better listening index in the wearing state, the difference between the distance between the projection point C' of the clamping region center C on the user's sagittal plane and the extremum point N' and the distance between the projection point C' of the clamping region center C on the user's sagittal plane and the projection point K' of the upper vertex K on the user's sagittal plane may be within a range of 3 mm-4.8 mm.

In some embodiments, in order to satisfy the wearing requirement, in the non-wearing state, the difference between the distance between the clamping region center C and the corresponding point N of the extremum point N' on the ear hook 12 and the distance between the clamping region center C and the upper vertex K may be within a range of 2 mm-6 mm. In some embodiments, in order to increase the adjustability after wearing and to further improve the sound leakage reduction effect, in the non-wearing state, the difference between the distance between the clamping region center C and the corresponding point N of the extremum point N' on the ear hook 12 and the distance between the clamping region center C and the upper vertex K may be within a range of 2.2 mm-5.2 mm. In some embodiments, in order to increase the stability after wearing, and to make the earphone have a better listening index in the wearing state, in the non-wearing state, the difference between the distance between the clamping region center C and the corresponding point N of the extremum point N' on the ear hook 12 and the distance between the clamping region center C and the upper vertex K may be within a range of 2.8 mm-5 mm.

The ear hook clamping point E may be a point on the ear hook 12 that is closest to the clamping region center C, which may be used to measure the situation of the ear hook 12 clamping on the ear 100 in the wearing state. By setting the position of the ear hook clamping point E, the clamping force of the ear hook 12 on the ear 100 may be changed. In some embodiments, when the sound production component 11 is set in a regular shape such as a circle, an oval, a rounded square, a rounded rectangle, etc., an intersection point of the long-axis of the sound production component with the first portion of the ear hook may be defined as the ear hook clamping point E. The ear hook clamping point E may be determined as follows: a point of the first portion of the ear hook corresponding to an intersection point between an orthographic projection of the first portion of the ear hook on the reference plane (e.g., the XZ plane in FIG. 11) perpendicular to the long-axis direction Y and the orthographic projection of the central axis of the sound production component 11 on the same reference plane may be defined as the ear hook clamping point E. In some embodiments, when the long-axis of the sound production component 11 is difficult to determine (e.g., the sound production component 11 is provided in an irregular shape), as shown in FIG. 11, the ear hook clamping point E may be defined as an intersection point between a tangent plane passing through the clamping region center C and perpendicular to the tangent plane of the free end FE and the end of the ear hook 12 away from the sound production component 11 (e.g., the battery compartment) and a portion of the ear hook 12 close to the free end FE. The ear hook clamping point E may be determined as follows: a straight line S passing through the orthographic projection of the clamping region center C on the reference plane of the clamping region center C on the reference plane (e.g., the YZ plane in FIG. 11) perpendicular to the thickness direction X and perpendicular to the tangent line T may be determined, an intersection point of the straight line S and a portion of the orthographic projection of the ear hook 12 on the reference plane close to the orthographic projection of the free end FE on the reference plane may be also determined, and the ear hook clamping point E may be defined as a point of the ear hook 12 that forms the intersection point on the reference plane.

In some embodiments, in the wearing state, a distance between a projection point E' of the ear hook clamping point E on the user's sagittal plane and the extremum point N', or a distance between the projection point E' of the ear hook clamping point E on the user's sagittal plane and the projection point K' of the upper vertex K on the user's sagittal plane needs to be kept in a certain range. If the aforementioned distance is too large, it may cause the ear hook 12 between the ear hook clamping point E and the corresponding point N of the extremum point N' on the ear hook 12, or between the ear hook clamping point E and the upper vertex K to be difficult to clamp on the rear side of the cavum concha 102 (e.g., a clamping position is downward relative to the cavum concha 102), and cause an end portion of the ear hook 12 (e.g., the battery compartment) away from the sound production component 11 not fit well with the ear 100. If the aforementioned distance is too small, it may also cause the ear hook 12 between the ear hook clamping point E and the corresponding point N of the extremum point N' on the ear hook 12, or between the ear hook clamping point E and the upper vertex K to be difficult to clamp on the rear side of the cavum concha 102 (e.g., a clamping position is upward relative to the cavum concha 102), and cause the end portion of the ear hook 12 that is away from the sound production component 11 to form a squeeze on the ear 100, which is less comfortable.

In some embodiments, in order to satisfy the wearing requirement, the distance between the projection point E' of the ear hook clamping point E on the user's sagittal plane and the extremum point N' may be within a range of 25 mm-45 mm. In some embodiments, in order to make the end portion of the ear hook 12 that is away from the sound production component 11 fit better to the ear 100, in the wearing state, the distance between the projection point E' of the ear hook clamping point E on the user's sagittal plane and the extremum point N' may be within a range of 26 mm-40 mm. In some embodiments, for better comfort, in the wearing state, the distance between the projection point E' of the ear hook clamping point E on the user's sagittal plane and the extremum point N' may be within a range of 27 mm-36 mm.

In some embodiments, in order to satisfy the wearing requirement, the distance between the projection point E' of the ear hook clamping point E on the user's sagittal plane and the projection point K' of the upper vertex K on the user's sagittal plane may be within a range of 28 mm-48 mm. In some embodiments, in order to make the end portion of the ear hook 12 that is away from the sound production component 11 fit the ear 100 better, in the wearing state, the distance between the projection point E' of the ear hook clamping point E on the user's sagittal plane and the projection point K' of the upper vertex K on the user's sagittal plane may be within a range of 30 mm-42 mm. In some embodiments, for better comfort, in the wearing state, the distance between the projection point E' of the ear hook clamping point E on the user's sagittal plane and the projection point K' of the upper vertex K on the user's sagittal plane may be within a range of 35 mm-40 mm.

In some embodiments, in the non-wearing state, a distance between the ear hook clamping point E and the corresponding point N of the extremum point N' on the ear hook, or a distance between the ear hook clamping point E and the upper vertex K needs to be kept within a certain range. If the aforementioned distance is too small, it may cause, in the wearing state, the ear hook 12 between the ear hook clamping point E and the corresponding point N of the extremum point N' on the ear hook 12, or between the ear hook clamping point E and the upper vertex K to be difficult to clamp on the rear side of the cavum concha 102 (e.g., the clamping position is upward relative to the cavum concha 102), and cause the end portion of the ear hook 12 that is away from the sound production component 11 to form a squeeze on the ear 100, which is less comfortable. If the aforementioned distance is too large, it may cause, in the wearing state, the ear hook 12 between the ear hook clamping point E and the corresponding point N of the extremum point N' on the ear hook 12, or between the ear hook clamping point E and the upper vertex K to be difficult to clamp on the rear side of the cavum concha 102 (e.g., the clamping position is downward relative to the cavum concha 102), and cause an end portion of the ear hook 12 (e.g., the battery compartment) away from the sound production component 11 not fit well with the ear 100.

In some embodiments, in order to satisfy the wearing requirement, in the non-wearing state, a distance between the ear hook clamping point E and the corresponding point N of the extremum point N' on the ear hook may be within a range of 25 mm-45 mm. In some embodiments, in order to make the end portion away from the sound production component 11 of the ear hook 12 fit better with the ear 100, the distance between the ear hook clamping point E and the corresponding point N of the extremum point N' on the ear hook may be within a range of 30 mm-43 mm. In some embodiments, in order to improve comfort, in the non-wearing state, the distance between the ear hook clamping point E and the corresponding point N of the extremum point N' on the ear hook may be within a range of 32 mm-38 mm.

In some embodiments, in order to satisfy the wearing requirement, in a non-wearing state, the distance between the ear hook clamping point E and the upper vertex K may be within a range of 25 mm-45 mm. In some embodiments, in order to make the end of the ear hook 12 away from the sound production component 11 of the ear hook 12 fit better with the ear 100, in the non-wearing state, the distance between the ear hook clamping point E and the upper vertex K may be within a range of 29 mm-43 mm. In some embodiments, in order to improve comfort, in the non-wearing state, the distance between the ear hook clamping point E and the upper vertex K may be within a range of 32 mm-37 mm.

In some embodiments, when the shape and dimension of the sound production component 11 are determined, in the wearing state, a difference between a distance from the projection point E' of the ear hook clamping point E on the user's sagittal plane to the extremum point N' and a distance from the projection point E' of the ear hook clamping point E on the user's sagittal plane to the projection point K' of the upper vertex K of the ear hook on the user's sagittal plane may reflect the positional relationship of the extremum point N' relative to the projection point K' of the upper vertex K of the ear hook on the user's sagittal plane (e.g., the distance between the extremum point N' and the projection point K' of the upper vertex K of the ear hook on the user's sagittal plane). In the wearing state, since the upper vertex K of the ear hook is the highest point of the inner contour of the ear hook along the vertical-axis of the user, the positional relationship of the extremum point N' relative to the projection point K' of the upper vertex K of the ear hook on the user's sagittal plane may reflect the relationship of the extremum point N' relative to the ear of the user when the user wears the earphone. In the non-wearing state, a difference between a distance from the ear hook clamping point E to the corresponding point N of the extremum point N' on the ear hook and a distance from the ear hook clamping point E to the upper vertex K may also reflect the positional relationship between the corresponding point N of the extremum point N' on the ear hook 12 and the upper vertex K of the ear hook 12 (e.g., the distance between the corresponding point N of the extremum point N' on the ear hook 12 and the upper vertex K of the ear hook), and the positional relationship between the corresponding point N of the extremum point N' on the ear hook 12 and the upper vertex K of the ear hook 12 may similarly reflect the positional relationship of the corresponding point N of the extremum point N' on the ear hook 12 relatives to the ear of the user when the user wears the earphone. The greater the aforementioned difference (i.e., in the wearing state, the difference between the distance from the projection point E' of the ear hook clamping point E on the user's sagittal plane to the extremum point N' and the distance from the projection point E' of the ear hook clamping point E on the user's sagittal plane to the projection point K' of the upper vertex K of the ear hook on the user's sagittal plane, or, in the non-wearing state, the difference between the distance from the ear hook clamping point E to the corresponding point N of the extremum point N' on the ear hook and the distance from the ear hook clamping point E to the upper vertex K), the greater the distance between the extremum point N' and the projection point K' of the upper vertex K of the ear hook on the user's sagittal plane, or the greater the distance between the corresponding point N of the extremum point N' on the ear hook 12 and the upper vertex K of the ear hook, when the user wears the earphone, the lower the position of the extremum point N' relative to the ear, the smaller the force arm of the "clamping force lever," and the greater the clamping force. The smaller the aforementioned difference, the smaller the distance between the extremum point N' and the projection point K' of the upper vertex K of the ear hook on the user's sagittal plane, or the smaller the distance between the corresponding point N of the extremum point N' on the ear hook 12 and the upper vertex K of the ear hook, the higher the position of the extremum point N' relative to the ear when the user wears the earphone, the greater the force arm of the "clamping force lever," and the smaller the clamping force.

In some embodiments, in the wearing state, the difference between the distance from the projection point E' of the ear hook clamping point E on the user's sagittal plane to the extremum point N' and the distance from the projection point E' of the ear hook clamping point E on the user's sagittal plane to the projection point K' of the upper vertex K of the ear hook on the user's sagittal plane, or, in the non-wearing state, the difference between the distance from the ear hook clamping point E to the corresponding point N of the extremum point N' on the ear hook and the distance from the ear hook clamping point E to the upper vertex K needs to be kept within a certain range. If the aforementioned difference is too small, the clamping force may be too small in the wearing state, and the ear hook 12 and the sound production component 11 may not be effectively clamped on the front and rear sides of the ear 100, resulting in poorer wearing stability. When the sound production component 11 is unable to form an effective clamping on the cavum concha 102, the gap between the sound production component 11 and the cavum concha 102 may be too large, i.e., the opening of the cavity-like structure is too large, resulting in a smaller listening index. If the aforementioned difference is too large, the clamping force may be too large in the wearing state, which may lead to a strong sense of pressure on the ear 100 of the user by the earphone 10 in the wearing state, and it may not be easy to adjust the wearing position after wearing. Moreover, the aforementioned difference being too large may lead to an excessive pressure on the cavum concha 102 of the sound production component 11 and lead to an increase in the tendency of the sound production component 11 to rotate around the clamping fulcrum, as a result, the clamping region of the sound production component 11 may slide toward the position of the clamping fulcrum, so that the sound production component 11 may not be in an expected position in the cavum concha 102. At this time, the side wall of the sound production component 11 may be in contact with the upper edge of the cavum concha 102, causing the gap between the side wall of the sound production component 11 and the cavum concha 102 to be too small or a count of gaps being too few, thereby resulting in a poor sound leakage reduction effect.

In some embodiments, in order to satisfy the wearing requirement, the difference between the distance from the projection point E' of the ear hook clamping point E on the user's sagittal plane to the extremum point N' and the distance from the projection point E' of the ear hook clamping point E on the user's sagittal plane to the projection point K' of the upper vertex K of the ear hook on the user's sagittal plane may be within a range of 1 mm-5 mm. In some embodiments, in order to increase the adjustability after wearing, and to further enhance the sound leakage reduction effect, the difference between the distance from the projection point E' of the ear hook clamping point E on the user's sagittal plane to the extremum point N' and the distance from the projection point E' of the ear hook clamping point E on the user's sagittal plane to the projection point K' of the upper vertex K of the ear hook on the user's sagittal plane may be within a range of 1.5 mm-4 mm. In some embodiments, in order to increase the stability after wearing and to make the earphones have a better listening index in the wearing state, the difference between the distance from the projection point E' of the ear hook clamping point E on the user's sagittal plane to the extremum point N' and the distance from the projection point E' of the ear hook clamping point E on the user's sagittal plane to the projection point K' of the upper vertex K of the ear hook on the user's sagittal plane may be within a range of 2.5 mm-3.5 mm.

In some embodiments, in order to satisfy the wearing requirement, in the non-wearing state, the difference between the distance from the ear hook clamping point E to the corresponding point N of the extremum point N' on the ear hook and the distance from the ear hook clamping point E to the upper vertex K may be within a range of 0.01 mm-0.1 mm. In some embodiments, in order to increase the adjustability after wearing and to further improve the sound leakage reduction effect, in the non-wearing state, the difference between the distance from the ear hook clamping point E to the corresponding point N of the extremum point N' on the ear hook and the distance from the ear hook clamping point E to the upper vertex K may be within a range of 0.01 mm-0.06 mm. In some embodiments, in order to increase the wearing stability, and to enable the earphones to have a better listening index in the wearing state, in the non-wearing state, the difference between the distance from the ear hook clamping point E to the corresponding point N of the extremum point N' on the ear hook and the distance from the ear hook clamping point E to the upper vertex K may in a range of 0.02 mm to 0.05 mm.

In some embodiments, in the non-wearing state, a minimum distance between the sound production component 11 and the first portion of the ear hook may be kept in a certain range. It should be noted that the minimum distance between the sound production component 11 and the first portion of the ear hook refers to a minimum distance between a region of the sound production component 11 clamped on both sides of the user's auricle (i.e., the clamping region) and a region of the first portion of the ear hook (i.e., a region near the ear hook clamping point E). In some embodiments, for ease of description, the minimum distance between the sound production component 11 and the first portion of the ear hook may be understood as a distance between the clamping region center C and the ear hook clamping point E. If the minimum distance is too large, the ear hook 12 may not be effectively clamped on both sides of the ear 100 after wearing (i.e., the wearing stability may be poor), and the gap between the sound production component 11 and the cavum concha 102 may be too large, i.e., the opening of the cavity-like structure may be too large, resulting in a smaller listening index.

In some embodiments, in order to make the earphone have a better listening index in the wearing state, in the non-wearing state, a distance between the clamping region center C and the ear hook clamping point E may not be greater than 3 mm. In some embodiments, in order to increase the stability after wearing, in the non-wearing state, the distance between the clamping region center C and the ear hook clamping point E may not be greater than 2.6 mm. In some embodiments, in order to make the cavity-like structure formed by the sound production component 11 and the cavum concha 102 have a more suitable opening size, in the non-wearing state, the distance between the clamping region center C and the ear hook clamping point E may not be greater than 2.2 mm.

In some embodiments, in the wearing state, the minimum distance between the sound production component 11 and the first portion of the ear hook may remain in a certain range, i.e., a distance between a projection point C' of the clamping region center C on the user's sagittal plane and the projection point E' of the ear hook clamping point E on the user's sagittal plane needs to be kept within a certain range. If the minimum distance is too small, the earphone 10 may exert strong pressure on the user's ear 100 in the wearing state, the wearing position may not be easily adjusted after wearing, the side wall of the sound production component 11 may be attached to the upper edge of the cavum concha 102, the gap between the side wall of the sound production component 11 and the cavum concha 102 may be too small (or the count of the gaps may be too small), resulting in poor sound leakage reduction effect.

In some embodiments, in order to satisfy the wearing requirement, the distance between the projection point C' of the clamping region center C on the user's sagittal plane and the projection point E' of the ear hook clamping point E on the user's sagittal plane may be no less than 2.8 mm. In some embodiments, in order to improve the sound leakage reduction effect, in the wearing state, the distance between the projection point C' of the clamping region center C on the user's sagittal plane and the projection point E' of the ear hook clamping point E on the user's sagittal plane may be no less than 2.5 mm. In some embodiments, in order to further increase the adjustability after wearing, in the wearing state, the distance between the projection point C' of the clamping region center C on the user's sagittal plane and the projection point E' of the ear hook clamping point E on the user's sagittal plane may be no less than 2.8 mm.

In some embodiments, the earphone 10 may include a wearing state and a non-wearing state, and a difference between the minimum distance between the sound production component 11 and the first portion of the ear hook in the wearing state and the minimum distance between the sound production component 11 and the first portion of the ear hook in the non-wearing state may keep in a certain range, i.e., a difference between a distance from the clamping region center C to the ear hook clamping point E in the non-wearing state and a distance from the projection point C' of the clamping region center C on the user's sagittal plane to the projection point E' of the ear hook clamping point E on the user's sagittal plane in the wearing state needs to be kept within a certain range. It should be noted that the difference between the minimum distances in the wearing state and the non-wearing state may correspond to a stretched distance. If the aforementioned difference is too small, according to the formula (1), the clamping force may be too small, the earphone may not be effectively clamped on both sides of the ear 100 after wearing, the gap between the sound production component 11 and the cavum concha 102 may be too large, i.e., the opening of the cavity-like structure is too large, resulting in a smaller listening index.

In some embodiments, in order to make the earphone have a better listening index in the wearing state, the difference between the minimum distance between the sound production component 11 and the first portion of the ear hook in the wearing state and the minimum distance between the sound production component 11 and the first portion of the ear hook in the non-wearing state may be no less than 1 mm. In some embodiments, in order to increase stability after wearing, the difference between the minimum distance between the sound production component 11 and the first portion of the ear hook in the wearing state and the minimum distance between the sound production component 11 and the first portion of the ear hook in the non-wearing state may be no less than 1.3 mm. In some embodiments, in order to make the cavity-like structure formed by the sound production component 11 and the cavum concha 102 have a more suitable opening size, the difference between the minimum distance between the sound production component 11 and the first portion of the ear hook in the wearing state and the minimum distance between the sound production component 11 and the first portion of the ear hook in the non-wearing state may be no less than 1.5 mm.

In some embodiments, when the clamping coefficient is determined, in the non-wearing state, an included angle between a first connection line connecting the clamping region center C and the corresponding point N of the extremum point N' on the ear hook 12 and a second connection line connecting the ear hook clamping point E and the corresponding point N of the extremum point N' on the ear hook 12 needs to be kept within a certain range so that the earphone can provide a suitable clamping force on the ear 100 in the wearing state and the sound production component 11 can be in an expected position in the cavum concha 102. When the clamping coefficient and the shape and the dimension of the sound production component 11 are constant, if the aforementioned angle is too large, the ear hook 12 may not be effectively clamped on both sides of the ear 100 after wearing, the gap between the sound production component 11 and the cavum concha 102 may be too large, i.e., the opening of the cavity-like structure may be too large, resulting in a smaller listening index. When the clamping coefficient and the shape and the dimension of the sound production component 11 are constant, if the aforementioned angle is too small, a difference between the included angle between the connection lines in the wearing state and the included angle between the connection lines in the non-wearing state may be too large, then the clamping force of the ear hook 12 to the ear 100 in the wearing state may be too large, causing the earphone 10 to exert strong pressure on the ear 100 of the user in the wearing state, and making it difficult to adjust the wearing position after wearing. Besides, the side wall of the sound production component 11 may be attached to the upper edge of the cavum concha 102, and the gap between the side wall of the sound production component 11 and the cavum concha 102 may be too small (or the count of gaps may be too small), resulting in a poor sound leakage reduction effect.

In some embodiments, in order to satisfy the wearing requirement, in the non-wearing state, the included angle between the first connection line connecting the clamping region center C and the corresponding point N of the extremum point N' on the ear hook 12 and the second connection line connecting the ear hook clamping point E and the corresponding point N of the extremum point N' on the ear hook 12 may be within a range of 3°-9°. In some embodiments, in order to increase the adjustability after wearing, in the non-wearing state, the included angle between the first connection line connecting the clamping region center C and the corresponding point N of the extremum point N' on the ear hook 12 and the second connection line connecting the ear hook clamping point E and the corresponding point N of the extremum point N' on the ear hook 12 may be within a range of 3.1°-8.4°. In some embodiments, in order to increase the stability after wearing, in the non-wearing state, the included angle between the first connection line connecting the clamping region center C and the corresponding point N of the extremum point N' on the ear hook 12 and the second connection line connecting the ear hook clamping point E and the corresponding point N of the extremum point N' on the ear hook 12 may be within a range of 3.8°-8°. In some embodiments, in order to make the earphone have a better listening index in the wearing state, in the non-wearing state, the included angle between the first connection line connecting the clamping region center C and the corresponding point N of the extremum point N' on the ear hook 12 and the second connection line connecting the ear hook clamping point E and the corresponding point N of the extremum point N' on the ear hook 12 may be within a range of 4.5°-7.9°. In some embodiments, in order to further improve the sound leakage reduction effect, in the non-wearing state, the included angle between the first connection line connecting the clamping region center C and the corresponding point N of the extremum point N' on the ear hook 12 and the second connection line connecting the ear hook clamping point E and the corresponding point N of the extremum point N' on the ear hook 12 may be within a range of 4.6°-7°.

In some embodiments, when the clamping coefficient and the shape and dimension of the earphone 10 are constant, in the wearing state, an included angle between a first connection line connecting the projection point C' of the clamping region center C on the user's sagittal plane and the extremum point N' and a second connection line connecting the projection point E' of the ear hook clamping point E on the user's sagittal plane and the extremum point N' needs to be kept within a certain range, so as to provide a suitable clamping force to the ear 100, and make the sound production component 11 be located at the expected position in the cavum concha 102. When the clamping coefficient, as well as the shape and dimension of the earphone 10, are consistent, if the aforementioned angle is too small, the earphone 10 may exert a strong pressure on the user's ear 100 in the wearing state, the wearing position may not be easily adjusted after wearing, the side wall of the sound production component 11 may be attached to the upper edge of the cavum concha 102, the gap between the side wall of the sound production component 11 and the cavum concha 102 may be too small (or the count of the gaps may be too small), resulting in poor sound leakage reduction effect. When the clamping coefficient as well as the shape and the dimension of the earphone 10 are constant, if the aforementioned angle is too large, the ear hook 12 may not be effectively clamped on both sides of the ear 100 after wearing, and the gap between the sound production component 11 and the cavum concha 102 may be too large, i.e., the opening of the cavity-like structure may be too large, resulting in a smaller listening index.

In some embodiments, in order to satisfy the wearing requirement, in the wearing state, the included angle between the first connection line connecting the projection point C' of the clamping region center C on the user's sagittal plane and the extremum point N' and the second connection line connecting the projection point E' of the ear hook clamping point E on the user's sagittal plane and the extremum point N' may be within a range of 6°-12°. In some embodiments, in order to increase adjustability after wearing, in the wearing state, the included angle between the first connection line connecting the projection point C' of the clamping region center C on the user's sagittal plane and the extremum point N' and the second connection line connecting the projection point E' of the ear hook clamping point E on the user's sagittal plane and the extremum point N' may be within a range of 6.3°-10.8°. In some embodiments, in order to increase stability after wearing, in the wearing state, the included angle between the first connection line connecting the projection point C' of the clamping region center C on the user's sagittal plane and the extremum point N' and the second connection line connecting the projection point E' of the ear hook clamping point E on the user's sagittal plane and the extremum point N' may be within a range of 7°-10.5°. In some embodiments, in order to make the earphone have a better listening index in the wearing state, in the wearing state, the included angle between the first connection line connecting the projection point C' of the clamping region center C on the user's sagittal plane and the extremum point N' and the second connection line connecting the projection point E' of the ear hook clamping point E on the user's sagittal plane and the extremum point N' may be within a range of 7.3°-10°. In some embodiments, in order to further improve the sound leakage reduction effect, in the wearing state, the included angle between the first connection line connecting the projection point C' of the clamping region center C on the user's sagittal plane and the extremum point N' and the second connection line connecting the projection point E' of the ear hook clamping point E on the user's sagittal plane and the extremum point N' may be within a range of 8°-9.8°.

In some embodiments, the earphone 10 may include a wearing state and a non-wearing state, and a difference between the included angle between the connection lines in the wearing state and the included angle between the connection lines in the non-wearing state may keep within a certain range. It should be noted that the included angle between the connection lines in the wearing state may be the included angle between the first connection line connecting the projection point C' of the clamping region center C on the user's sagittal plane and the extremum point N' and the second connection line connecting the projection point E' of the ear hook clamping point E on the user's sagittal plane and the extremum point N' in the wearing state. The included angle between the connection lines in the non-wearing state may be the included angle between the first connection line connecting the projection point C' of the clamping region center C on the user's sagittal plane and the extremum point N' and the second connection line connecting the projection point E' of the ear hook clamping point E on the user's sagittal plane and the extremum point N' in the non-wearing state. When the clamping coefficient is consistent, if the aforementioned difference is too small, the clamping force may be too small, the ear hook may not be effectively clamped on both sides of the ear 100 after wearing, and the gap between the sound production component 11 and the cavum concha 102 may be too large, i.e., the opening of the cavity-like structure may be too large, resulting in a smaller listening index. When the clamping coefficient is consistent, if the aforementioned difference is too large, the clamping force may be too large, the earphone 10 may exert a strong pressure on the user's ear 100 in the wearing state, the wearing position may not be easily adjusted after wearing, the side wall of the sound production component 11 may be attached to the upper edge of the cavum concha 102, the gap between the side wall of the sound production component 11 and the cavum concha 102 may be too small (or the count of the gaps may be too small), resulting in poor sound leakage reduction effect.

In some embodiments, in order to satisfy the wearing requirement, the difference between the included angle between the connection lines in the wearing state and the included angle between the connection lines in the non-wearing state may be within a range of 2°-4°. In some embodiments, in order to increase the adjustability after wearing, the difference between the included angle between the connection lines in the wearing state and the included angle between the connection lines in the non-wearing state may be within a range of 2.1°-3.8°. In some embodiments, in order to increase stability after wearing, the difference between the included angle between the connection lines in the wearing state and the included angle between the connection lines in the non-wearing state may be within a range of 2.3°-3.7°. In some embodiments, in order to make the earphone have a better listening index in the wearing state, the difference between the included angle between the connection lines in the wearing state and the included angle between the connection lines in the non-wearing state may be within a range of 2.5°-3.6°. In some embodiments, in order to further improve the sound leakage reduction effect, the difference between the included angle between the connection lines in the wearing state and the included angle between the connection lines in the non-wearing state may be within a range of 2.6°-3.4°.

Figure 12A:
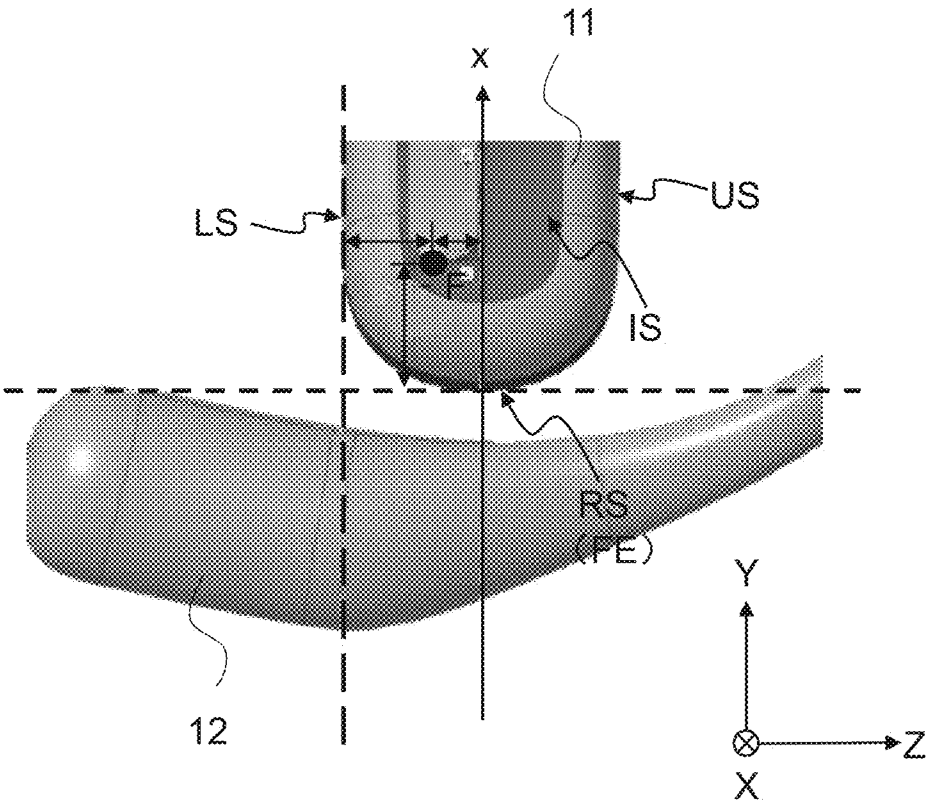
FIG. 12A and FIG. 12B are schematic diagrams illustrating an exemplary position structure of a centroid of an earphone according to some embodiments of the present disclosure.
Figure 12B:
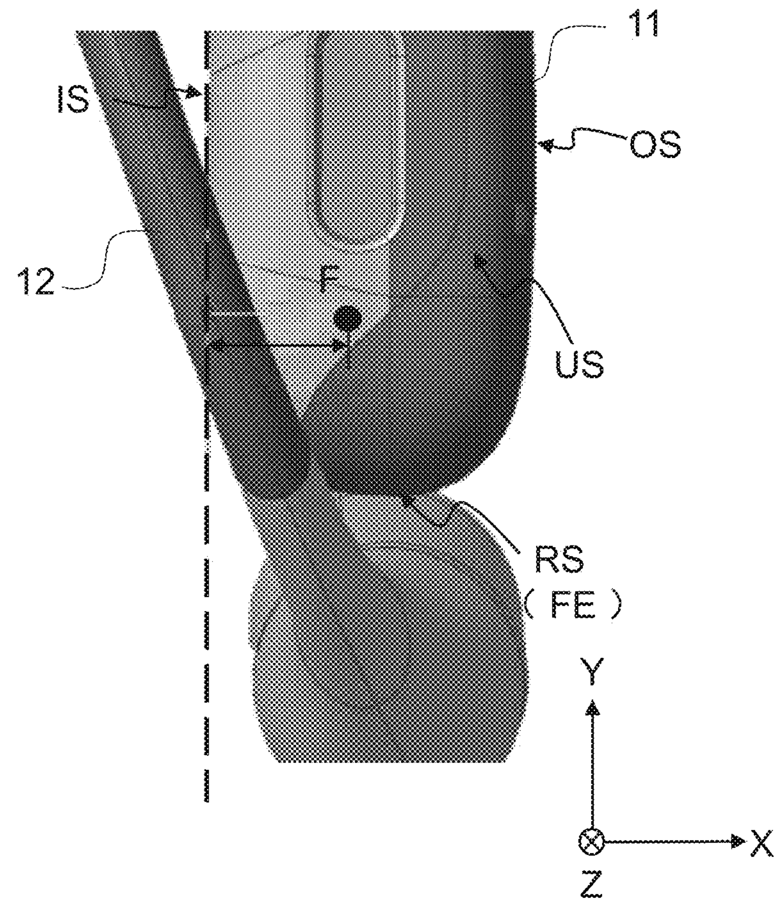

FIG. 12A and FIG. 12B are schematic diagrams illustrating an exemplary position structure of a centroid of an earphone according to some embodiments of the present disclosure. As shown in FIG. 12A and FIG. 12B, in some embodiments, a position of the centroid of the earphone 10 is point F. In some embodiments, affected by the internal structure of the sound production component 11 (e.g., a magnetic circuit, a circuit board, etc.), a mass of the sound production component 11 in the earphone 10 is relatively large. Thus, the position of the centroid F of the earphone 10 is close to a position of a centroid H of the sound production component 11 or is greatly affected by the mass of the sound production component 11, that is, the position of the centroid F of the earphone 10 to a certain extent may represent the position of the sound production component 11. For the convenience of explanation, a specific position of the centroid F of the earphone 10 may be described in detail below through relative positions of the centroid F of the earphone 10 and the sound production component 11.

As shown in FIG. 12A, in some embodiments, on the YZ plane, a distance between the centroid F of the earphone 10 and a lower side surface LS of the sound production component 11 may be within a range of 2 mm-6 mm. In some embodiments, on the YZ plane, the distance between the centroid F of the earphone 10 and the lower side surface LS of the sound production component 11 may be within a range of 3 mm-5 mm. In some embodiments, on the YZ plane, the distance between the centroid F of the earphone 10 and the lower side surface LS of the sound production component 11 may be within a range of 4 mm-4.5 mm.

In some embodiments, on the YZ plane, a distance between the centroid F of the earphone 10 and a long-axis (i.e., the x-axis) of the sound production component 11 may be within a range of 1 mm-3 mm. In some embodiments, on the YZ plane, the distance between the centroid F of the earphone 10 and the long-axis (i.e., the x-axis) of the sound production component 11 may be within a range of 1.5 mm-2.8 mm. In some embodiments, on the YZ plane, the distance between the centroid F of the earphone 10 and the long-axis (i.e., the x-axis) of the sound production component 11 may be within a range of 2 mm-2.5 mm.

In some embodiments, on the YZ plane, a distance between the centroid F of the earphone 10 and a free end FE of the sound production component 11 (i.e., a rear side surface RS) may be within a range of 4 mm-8 mm. In some embodiments, on the YZ plane, the distance between the centroid F of the earphone 10 and the free end FE of the sound production component 11 (i.e., the rear side surface RS) may be within a range of 5 mm-7 mm. In some embodiments, on the YZ plane, the distance between the centroid F of the earphone 10 and the free end FE of the sound production component 11 (i.e., the rear side surface RS) may be within a range of 6 mm-6.8 mm.

As shown in FIG. 12B, in some embodiments, on the XY plane, a distance between the centroid F of the earphone 10 and an inner side surface IS of the sound production component 11 may be within a range of 2 mm-6 mm. In some embodiments, on the YZ plane, the distance between the centroid F of the earphone 10 and the inner side surface IS of the sound production component 11 may be within a range of 3 mm-5 mm. In some embodiments, on the YZ plane, the distance between the centroid F of the earphone 10 and the inner side surface IS of the sound production component 11 may be within a range of 4.5 mm-4.8 mm.

In some embodiments, by designing the position of the centroid F, the upper vertex K, and the ear hook extremum point N of the earphone 10, the wearing stability and adjustability of the earphone 10 may be improved. In some embodiments, since the ear 100 mainly supports the earphone 10 through the upper vertex K of the ear hook 12, when the user wears the earphone 10, it may be regarded as forming a "supporting lever" with the upper vertex K as a support point. In the wearing state, the centroid F of the earphone 10 is located behind the upper vertex K (i.e., a side close to the back of the head of the user), which may prevent the earphone 10 from flipping forward (i.e., a direction away from the back of the head of the user) in the wearing state, thereby improving the wearing stability of the earphone 10. In some embodiments, the ear hook extremum point N may be a position with the smallest cross-section on the ear hook 12, so that the ear hook 12 is more likely to deform at the ear hook extremum point N. Therefore, when the user wears the earphone 10, the first portion 121 of the ear hook 12 and the sound production component 11 may form a structure similar to a "clamping force lever" with the ear hook extremum point N as a fulcrum point, and the structure is clamped on both sides of the ear of the user (e.g., a front side and a rear side of the cavum concha 102). In order to improve the stability of the "supporting lever" and the "clamping force lever," the centroid F and the upper vertex K of the earphone 10 are respectively located on both sides of the ear hook extremum point N. The positions of the centroid F, the upper vertex K, and the ear hook extremum point N may be further described in detail below.

Since the position of the centroid F of the earphone 10 is greatly affected by the position of the sound production component 11, when the overall volume of the ear hook 12 does not change much, the positions of the upper vertex K and the centroid F of the earphone 10 to a certain extent reflect a relative position of the sound production component 11 on the ear when the earphone 10 is worn. Specifically, when a distance between the position of the centroid F of the earphone 10 and the upper vertex K of the ear hook 12 is too large, the position of the sound production component 11 may be closer to the ear canal opening of the user when the user wears the earphone 10. Therefore, a position of the sound production component 11 is lower in the cavum concha, and a gap between the upper side surface US of the sound production component 11 and the cavum concha is too large, causing a weak listening effect. When the distance between the position of the centroid F of the earphone 10 and the upper vertex K of the ear hook 12 is too small, the upper side surface US of the sound production component 11 is attached to the upper edge of the cavum concha, and the gap between the upper side surface US and the cavum concha is too small or a count is too few. Therefore, the sound leakage reduction effect is poor, and the sound outlet on the sound production component 11 is too far away from the external ear canal, which adversely affects the listening effect.

As shown in FIG. 6, in some embodiments, on the projection of the earphone 10 on the user's sagittal plane, in order to obtain a better listening effect, a distance between the projection point K' of the upper vertex K and a projection point F' of the centroid F of the earphone 10 may be within a range of 22 mm-35 mm. In some embodiments, in order to further improve the sound leakage reduction effect, on the projection of the earphone 10 on the user's sagittal plane, the distance between the projection point K' of the upper vertex K and the projection point F' of the centroid F of the earphone 10 may be within a range of 25 mm-30 mm. In some embodiments, in order to make the cavity-like structure formed by the sound production component 11 and the cavum concha have a more suitable volume and size/count of an opening, on the projection of the earphone 10 on the user's sagittal plane, the distance between the projection point K' of the upper vertex K and the projection point F' of the centroid F of the earphone 10 may be within a range of 27 mm-29 mm.

In some embodiments, in order to obtain a better listening effect, on the earphone 10, a distance between the upper vertex K and the centroid F of the earphone 10 may be within a range of 20 mm-38 mm. In some embodiments, in order to further improve the sound leakage reduction effect, on the earphone 10, the distance between the upper vertex K and the centroid F of the earphone 10 may be within a range of 25 mm-32.5 mm. In some embodiments, in order to make the cavity-like structure formed by the sound production component 11 and the cavum concha have a more suitable volume and size/count of the opening, on the earphone 10, the distance between the upper vertex K and the centroid F of the earphone 10 may be within a range of 27 mm-30 mm.

In some embodiments, an included angle $\alpha 1$ between a connection line connecting the centroid F of the earphone 10 and the upper vertex K of the ear hook 12 and the long-axis direction Y of the sound production component 11 may affect the wearing stability of the earphone 10 in the wearing state. When the included angle $\alpha 1$ between the connection line connecting the centroid F of the earphone 10 and the upper vertex K of the ear hook 12 and the long-axis direction Y of the sound production component 11 is too large, the free end FE of the sound production component 11 may be far away from a side wall of the cavum concha of the user, and the clamping of the sound production component 11 on the cavum concha is relatively weak, making the earphone 10 unstable to wear. When the included angle $\alpha 1$ between the connection line connecting the centroid F of the earphone 10 and the upper vertex K of the ear hook 12 and the long-axis direction Y of the sound production component 11 is too small, the free end FE of the sound production component 11 and the cavum concha of the user fits too tight, the wearing comfort of the earphone 10 may be affected, and the adjustability of the earphone 10 may be reduced.

In some embodiments, in order to make the earphone 10 have higher wearing stability and adjustability, on the projection of the earphone 10 on the user's sagittal plane, the included angle $\alpha 1$ between the connection line K'F' connecting the projection point K' of the upper vertex K and the projection point F' of the centroid F of the earphone 10 and the long-axis direction Y (i.e., the x-axis direction) of the projection of the sound production component 11 may be within a range of 35°-60°. As shown in FIG. 6, it should be noted that the included angle $\alpha 1$ between the connection line K'F' connecting the projection point K' of the upper vertex K and the projection point F' of the centroid F of the earphone 10 and the long-axis direction Y (i.e., the x-axis direction) of the projection of the sound production component 11 refers to an angle between the connection line K'F' and the x-axis in a counterclockwise direction on the basis of a positive direction of the x-axis. In some embodiments, in order to further improve the wearing stability of the earphone 10, the included angle $\alpha 1$ between the connection line K'F' connecting the projection point K' of the upper vertex K and the projection point F' of the centroid F of the earphone 10 and the long-axis direction Y (i.e., the x-axis direction) of the projection of the sound production component 11 may be within a range of 40°-55°. In some embodiments, in order to further improve the adjustability of the earphone 10, the included angle $\alpha 1$ between the connection line K'F' connecting the projection point K' of the upper vertex K and the projection point F' of the centroid F of the earphone 10 and the long-axis direction Y (i.e., the x-axis direction) of the projection of the sound production component 11 may be within a range of 45°-50°.

In some embodiments, in addition to reflecting the included angle $\alpha 1$ between the connection line connecting the centroid F of the earphone 10 and the upper vertex K and the long-axis direction Y of the sound production component 11 through positions of the projection points mentioned above, an actual measurement may also be carried out on the ear hook 12. In some embodiments, in order to make the earphone 10 have higher wearing stability and adjustability, the included angle $\alpha 1$ between the connection line connecting the centroid F of the earphone 10 and the upper vertex K of the ear hook 12 and the long-axis direction Y of the sound production component 11 may be within a range of 30°-55°. In some embodiments, in order to further improve the wearing stability of the earphone 10, the included angle $\alpha 1$ between the connection line connecting the centroid F of the earphone 10 and the upper vertex K of the ear hook 12 and the long-axis direction Y of the sound production component 11 may be within a range of 40°-50°. In some embodiments, in order to further improve the adjustability of the earphone 10, the included angle $\alpha 1$ between the connection line connecting the centroid F of the earphone 10 and the upper vertex K of the ear hook 12 and the long-axis direction Y of the sound production component 11 may be within a range of 45°-48°.

As shown in FIG. 3 and FIG. 6, in some embodiments, the projection point of the centroid F of the earphone 10 on the user's sagittal plane is point F'. In some embodiments, when a distance between the centroid F of the earphone 10 and the ear hook extremum point N is too large, a clamping position of the earphone 10 on the ear may be too low, thus a fitting degree between the sound production component 11 and the cavum concha may be poor, which may affect the cavity-like structure and lead to unstable wearing, thereby causing the gap of the cavity-like structure formed by the sound production component 11 and the cavum concha to be too large, resulting in a poor listening effect. When the distance between the centroid F of the earphone 10 and the ear hook extremum point N is too small, it means that the force arms at both ends of the fulcrum point of the "clamping force lever" mentioned above may be too small, and under a condition that a clamping force remains unchanged, the stability of the lever structure may be poor and the earphone 10 may be unstable to wear in the wearing state.

In some embodiments, in order to make the earphone 10 have higher wearing stability and better listening effect in the wearing state, on the projection of the earphone 10 on the user's sagittal plane, a distance between the extremum point N' and the projection point F' of the centroid F of the earphone 10 may be within a range of 20 mm-35 mm. In some embodiments, in order to further improve the wearing stability of the earphone 10, on the projection of the earphone 10 on the user's sagittal plane, the distance between the extremum point N' and the projection point F' of the centroid F of the earphone 10 may be within a range of 25 mm-30 mm. In some embodiments, in order to further improve the listening effect, on the projection of the earphone 10 on the user's sagittal plane, the distance between the extremum point N' and the projection point F' of the centroid F of the earphone 10 may be within a range of 27 mm-28 mm.

In some embodiments, in order to make the earphone 10 have higher wearing stability and better listening effect in the wearing state, on the earphone 10, a distance between the centroid F of the earphone 10 and the ear hook extremum point N may be within a range of 18 mm-40 mm. In some embodiments, in order to further improve the wearing stability, on the earphone 10, the distance between the centroid F of the earphone 10 and the ear hook extremum point N may be within a range of 24 mm-31 mm. In some embodiments, in order to further improve the listening effect, the distance between the centroid F of the earphone 10 and the ear hook extremum point N may be within a range of 26 mm-29 mm.

In some embodiments, as shown in FIG. 6, on the projection of the earphone 10 on the user's sagittal plane, a first included angle $\alpha 2$ between the connection line N'F' connecting the extremum point N' and the projection point F' of the centroid of the earphone 10 and the long-axis direction Y (i.e., the x-axis direction) of the projection of the sound production component 11 may be less than 90° so that the projection point F' of the centroid F of the earphone 10 is located behind the extremum point N' in the long-axis direction Y of the sound production component 11. Since the centroid F of the earphone 10 is mainly affected by the mass of the sound production component 11, the position of the centroid F to a certain extent also reflects the clamping position of the sound production component 11 on the cavum concha, that is, the clamping position of the sound production component 11 on the cavum concha is closer to the back of the head of the user compared with the ear hook extremum point N, so as to further enhance the stability of the "clamping force lever" mentioned above. As shown in FIG. 6, it should be noted that the first included angle $\alpha 2$ between the connection line N'F' connecting the extremum point N' and the projection point F' of the centroid of the earphone 10 and the long-axis direction Y (i.e., the x-axis direction) of the projection of the sound production component 11 refers to an included angle between the connection line N'F' and the x-axis in the counterclockwise direction on the basis of the positive direction of the x-axis.

When the first included angle $\alpha 2$ between the connection line connecting the centroid F of the earphone 10 and the ear hook extremum point N and the long-axis direction Y of the sound production component 11 is too large, the clamping position of the sound production component 11 is lower relative to the cavum concha, and the gap between the upper side surface US and the cavum concha is too large, causing a weak listening effect. When the first included angle $\alpha 2$ between the connection line connecting the centroid F of the earphone 10 and the ear hook extremum point N and the long-axis direction Y of the sound production component 11 is too small, the clamping position of the sound production component 11 is too high relative to the cavum concha, the upper side surface US of the sound production component 11 is attached to an upper edge of the cavum concha, and the gap between the upper side surface US and the cavum concha is too small or a count is too few, causing a poor sound leakage reduction effect. Due to the limited space of the cavum concha of the user, the clamping position of the sound production component 11 is too low or too high relative to the cavum concha, it makes difficult for the earphone 10 to be stably clamped on the ear of the user due to a shape restriction of the cavum concha.

In some embodiments, in order to obtain a better listening effect, the first included angle $\alpha 2$ between the connection line N'F' connecting the extremum point N' and the projection point F' of the centroid F of the earphone 10 and the long-axis direction Y (i.e., the x-axis direction) of the projection of the sound production component 11 may be within a range of 60°-80°. In some embodiments, in order to further improve the sound leakage reduction effect, the first included angle $\alpha 2$ between the connection line N'F' connecting the extremum point N' and the projection point F' of the centroid F of the earphone 10 and the long-axis direction Y (i.e., the x-axis direction) of the projection of the sound production component 11 may be within a range of 60°-75°. In some embodiments, in order to make the cavity-like structure formed by the sound production component 11 and the cavum concha have the more suitable volume and size/count of the opening, and make the clamping position of the sound production component 11 be located at a better position in the cavum concha, the first included angle α2 between the connection line N'F' connecting the extremum point N' and the projection point F' of the centroid F of the earphone 10 and the long-axis direction Y (i.e., the x-axis direction) of the projection of the sound production component 11 may be within a range of 65°-70°.

In some embodiments, in addition to reflecting the first included angle α2 between the connection line connecting the centroid F of the earphone 10 and the ear hook extremum point N and the long-axis direction Y of the sound production component 11 through positions of the projection points mentioned above, an actual measurement may also be carried out on the ear hook 12. In some embodiments, in order to obtain a better listening effect, on the earphone 10, the first included angle α2 between the connection line connecting the centroid F of the earphone 10 and the ear hook extremum point N and the long-axis direction Y of the sound production component 11 may be within a range of 50°-90°. In some embodiments, in order to further improve the sound leakage reduction effect, on the earphone 10, the first included angle α2 between the connection line connecting the centroid F of the earphone 10 and the ear hook extremum point N and the long-axis direction Y of the sound production component 11 may be within a range of 55°-85°. In some embodiments, in order to make the cavity-like structure formed by the sound production component 11 and the cavum concha have the more suitable volume and size/count of the opening, and make the clamping position of the sound production component 11 be located at a better position in the cavum concha, on the earphone 10, the first included angle α2 between the connection line connecting the centroid F of the earphone 10 and the ear hook extremum point N and the long-axis direction Y of the sound production component 11 may be within a range of 60°-75°.

In some embodiments, in addition to setting the position of the centroid F of the earphone 10, a position of the centroid H of the sound production component 11 may also be directly set to improve the wearing stability and listening effect of the earphone 10. As shown in FIG. 3 and FIG. 5, in some embodiments, a projection point of the centroid H of the sound production component 11 on the user's sagittal plane may coincide with a center of the projection of the sound production component 11 on the user's sagittal plane. In some embodiments, on the earphone 10, by changing a distance between the centroid H of the sound production component 11 and the ear hook extremum point N, a covering position of the sound production component 11 in the cavum concha in the wearing state and the clamping position of the sound production component 11 on the cavum concha may be changed, which not only affect the wearing stability and the wearing comfort of the earphone 10 but also affect the listening effect of the earphone 10.

When the shape and dimension of the sound production component 11 are consistent, if the distance between the centroid H of the sound production component 11 and the ear hook extremum point N is too large, the position of the sound production component 11 in the cavum concha may be lower, and the gap between the upper side surface US of the sound production component 11 and the cavum concha is too large, which leads to a poor listening effect. Moreover, if the distance between the centroid H of the sound production component 11 and the ear hook extremum point N is too large, the sound production component 11 (or a connection region between the ear hook 12 and the sound production component 11) may be too squeezed on the tragus, which leads to excessive pressure on the tragus by the sound production component 11 and affects the wearing comfort.

When the shape and dimension of the sound production component 11 are consistent, if the distance between the centroid H of the sound production component 11 and the ear hook extremum point N is too small, the upper side surface US of the sound production component 11 may be attached to an upper edge of the cavum concha, and the gap between the upper side surface US of the sound production component 11 and the cavum concha is too small or a count is too few, so that an inside environment and an outside environment are completely sealed and isolated, and the cavity-like structure cannot be formed. Moreover, if the distance between the centroid H of the sound production component 11 and the ear hook extremum point N is too small, the sound production component 11 (or the connection region between the ear hook 12 and the sound production component) may be too squeezed on an outer contour of the ear, which also affects the wearing comfort.

In some embodiments, the projection point of the centroid H of the sound production component 11 on the user's sagittal plane and the center of the projection of the sound production component 11 on the user's sagittal plane are point H', and point H' is located on the long-axis of the projection of the sound production component 11, that is, point H' lies on the x-axis. In some embodiments, in order to make the earphone 10 have a better listening effect in the wearing state, a distance between the extremum point N' and the projection point H' of the centroid H of the sound production component 11 on the user's sagittal plane may be within a range of 20 mm-30 mm. In some embodiments, in order to further improve the sound leakage reduction effect, the distance between the extremum point N' and the projection point H' of the centroid H of the sound production component 11 on the user's sagittal plane may be within a range of 22 mm-26 mm. In some embodiments, in order to make the cavity-like structure formed by the sound production component 11 and the cavum concha have a more suitable volume and size/count of the opening, and make the clamping position of the sound production component 11 be located at a better position on the cavum concha, the distance between the extremum point N' and the projection point H' of the centroid H of the sound production component 11 on the user's sagittal plane may be within a range of 23 mm-25 mm.

In some embodiments, in addition to reflecting the distance between the centroid H of the sound production component 11 and the ear hook extremum point N through the distance between the projection points mentioned above, an actual measurement may also be carried out on the ear hook 12. In some embodiments, on the earphone 10, in order to make the earphone 10 have a better listening effect in the wearing state, the distance between the centroid H of the sound production component 11 and the ear hook extremum point N may be within a range of 20 mm-30 mm. In some embodiments, in order to further improve the sound leakage reduction effect, on the earphone 10, the distance between the centroid H of the sound production component 11 and the ear hook extremum point N may be within a range of 24 mm-26 mm. In some embodiments, in order to make the cavity-like structure formed by the sound production component 11 and the cavum concha have a more suitable volume and size/count of the opening, and make the clamping position of the sound production component 11 be located at a better position on the cavum concha, on the earphone 10, the distance between the centroid H of the sound production component 11 and the ear hook extremum point N may be within a range of 24 mm-26 mm.

In some embodiments, an included angle α3 between a connection line connecting the centroid H of the sound production component 11 and the ear hook extremum point N and the long-axis direction Y of the sound production component 11 may affect a position of the sound production component 11 inserted into the cavum concha. When the included angle α3 between the connection line connecting the centroid H of the sound production component 11 and the ear hook extremum point N and the long-axis direction Y of the sound production component 11 is too large, the position of the sound production component 11 in the cavum concha is lower, the gap between the upper side surface US of the sound production component 11 and the cavum concha is too large, causing a weak listening effect. When the second included angle α3 between the connection line connecting the centroid H of the sound production component 11 and the ear hook extremum point N and the long-axis direction Y of the sound production component 11 is too small, the upper side surface US of the sound production component 11 is attached to the upper edge of the cavum concha, and the gap between the upper side surface US and the cavum concha is too small or the count is too few, causing a poor sound leakage reduction effect.

In some embodiments, the included angle α3 between the connection line N'H' connecting the extremum point N' and the projection point H' of the centroid H of the sound production component 11 and the long-axis direction Y (i.e., the x-axis direction) of the projection of the sound production component 11 may be less than 90°. Therefore, the projection point H' of the centroid H of the sound production component 11 is located on the rear side of the extremum point N' in the long-axis direction Y of the sound production component 11, i.e., compared with the corresponding point N of the extremum point N' on the ear hook 12, the centroid H of the sound production component 11 is closer to the back of the head of the user, so as to further enhance the stability of the "clamping force lever" mentioned above. As shown in FIG. 5, it should be noted that the included angle α3 between the connection line N'H' connecting the extremum point N' and the projection point H' of the centroid of the sound production component 11 and the long-axis direction Y (i.e., the x-axis direction) of the projection of the sound production component 11 refers to an included angle between the connection line N'H' and the x-axis in the counterclockwise direction on the basis of the positive direction of the x-axis.

In some embodiments, in order to obtain a better listening effect, the second included angle α3 between the connection line N'H' connecting the extremum point N' and the projection point H' of the centroid H of the sound production component 11 and the long-axis direction Y (i.e., the x-axis direction) of the projection of the sound production component 11 may be within a range of 65°-85°. In some embodiments, in order to further improve the sound leakage reduction effect, the second included angle α3 between the connection line N'H' connecting the extremum point N' and the projection point H' of the centroid H of the sound production component 11 and the long-axis direction Y (i.e., the x-axis direction) of the projection of the sound production component 11 may be within a range of 70°-80°. In some embodiments, in order to make the cavity-like structure formed by the sound production component 11 and the cavum concha have a more suitable volume and size/count of the opening, and make the clamping position of the sound production component 11 be located at a better position on the cavum concha, the second included angle α3 between the connection line N'H' connecting the extremum point N' and the projection point H' of the centroid H of the sound production component 11 and the long-axis direction Y (i.e., the x-axis direction) of the projection of the sound production component 11 may be within a range of 75°-79°.

In some embodiments, in addition to reflecting the second included angle α3 between the connection line connecting the centroid H of the sound production component 11 and the ear hook extremum point N and the long-axis direction Y of the sound production component 11 through the positions of the projection points mentioned above, an actual measurement may also be carried out on the ear hook 12. In some embodiments, in order to obtain a better listening effect, on the earphone 10, the second included angle α3 between the connection line connecting the centroid H of the sound production component 11 and the ear hook extremum point N and the long-axis direction Y of the sound production component 11 may be within a range of 70°-85°. In some embodiments, in order to further improve the sound leakage reduction effect, on the earphone 10, the second included angle α3 between the connection line connecting the centroid H of the sound production component 11 and the ear hook extremum point N and the long-axis direction Y of the sound production component 11 may be within a range of 75°-80°. In some embodiments, in order to make the cavity-like structure formed by the sound production component 11 and the cavum concha have a more suitable volume and size/count of the opening, and make the clamping position of the sound production component 11 be located at a better position on the cavum concha, on the earphone 10, the second included angle α3 between the connection line connecting the centroid H of the sound production component 11 and the ear hook extremum point N and the long-axis direction Y of the sound production component 11 may be within a range of 77°-80°.

In some embodiments, on the user's sagittal plane, the first included angle α2 between the connection line N'F' connecting the extremum point N' and the projection point F' of the centroid F of the earphone 10 and the long-axis direction Y (i.e., the x-axis direction) of the projection of the sound production component 11 is smaller than the second included angle α3 between the connection line connecting the extremum point N' and the projection point H' of the centroid H of the sound production component 11 and the long-axis direction Y (i.e., the x-axis direction) of the projection of the sound production component 11. That is, the first included angle α2 between the connection line N'F' and the x-axis is smaller than the second included angle α3 between the connection line N'H' and the x-axis, so that the centroid F of the earphone 10 is located on the rear side of the centroid H of the sound production component 11 in the long-axis direction Y of the sound production component 11, that is, compared with the centroid H of the sound production component 11, the centroid F of the earphone 10 is closer to the back of the head of the user. Through the above arrangements, the ear hook 12 may better clamp the ear of the user when the earphone 10 is in the wearing state, further enhancing the stability of the "clamping force lever" mentioned above.

In some embodiments, an included angle α4 between the connection line connecting the centroid H of the sound production component 11 and the ear hook extremum point N and a plane S1 of the ear hook 12 (which is also referred to as an ear hook plane S1) may affect a degree to which the sound production component 11 is inserted into the cavum concha of the user when the earphone 10 is in the wearing state. If the included angle α4 between the connection line connecting the centroid H of the sound production component 11 and the ear hook extremum point N and the plane of the ear hook 12 is too small, the sound production component 11 may be inserted too deep into the cavum concha, and the position of the sound production component 11 may be too close to the ear canal opening of the user. In this case, the ear canal opening is blocked to a certain extent, and the communication between the ear canal opening and the external environment cannot be realized, thus an original design purpose of the earphone 10 cannot be implemented. If the included angle α4 between the connection line connecting the centroid H of the sound production component 11 and the ear hook extremum point N and the plane of the ear hook 12 is too large, it may affect the sound production component 11 to be inserted into the cavum concha (e.g., causing the gap between the sound production component 11 and the cavum concha to be too large), which further affects the listening effect of the sound production component 11.

Figure 13:
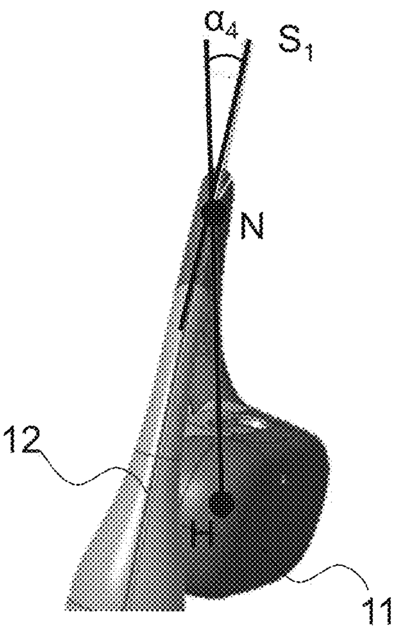
FIG. 13 is a schematic diagram illustrating an exemplary position of a centroid of a sound production component according to some embodiments of the present disclosure.

FIG. 13 is a schematic diagram illustrating an exemplary position of a centroid of a sound production component according to some embodiments of the present disclosure. As shown in FIG. 13, in some embodiments, in order to make the earphone 10 have a better listening effect, an included angle α4 between a connection line HN connecting the ear hook extremum point N and the centroid H of the sound production component 11 and the plane S1 of the ear hook 12 may be within a range of 10°-18°. As shown in FIG. 3, the plane S1 of the ear hook 12 may be determined by the upper vertex K on the ear hook 12, the ear hook extremum point N, point Q on the ear hook 12, and point P on the ear hook 12. In some embodiments, in order to further prevent the sound production component 11 from being too close to the ear canal opening of the user, the included angle α4 between the connection line HN connecting the ear hook extremum point N and the centroid H of the sound production component 11 and the plane S1 of the ear hook 12 may be within a range of 12°-16°. In some embodiments, in order to further improve a listening effect, the included angle α4 between the connection line HN connecting the ear hook extremum point N and the centroid H of the sound production component 11 and the plane S1 of the ear hook 12 may be within a range of 13°-14°.

In some embodiments, an included angle between the inner side surface IS of the sound production component 11 and the plane S1 where the ear hook 12 is located may also affect the sound production component 11 to be inserted into the cavum concha. The included angle between the inner side surface IS of the sound production component 11 and the plane S1 where the ear hook 12 is located refers to a smaller included angle among angles formed by the intersection of two planes. If the included angle mentioned above is too large, the sound production component 11 may be inserted too much into the cavum concha, and a position of the sound production component 11 may be too close to the ear canal opening of the user, which may block the ear canal opening, and the sound production component 11 may cause pressure on the tragus of the user. If the included angle mentioned above is too small, the part of the sound production component 11 inserted into the cavum concha may be too small, and the gap between the sound production component 11 and the cavum concha is too large, thereby affecting the listening effect of the sound production component 11.

Figure 14:
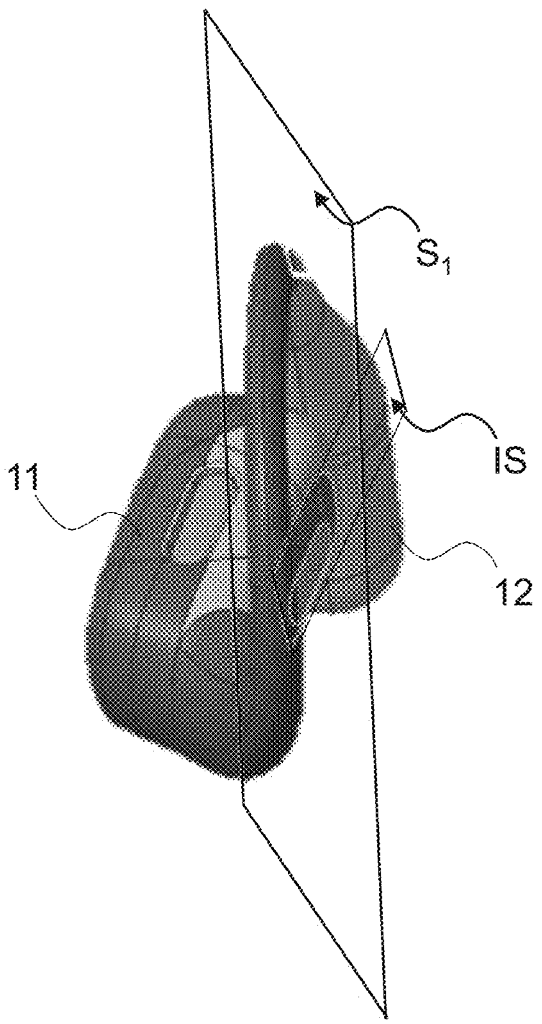
FIG. 14 is a schematic diagram illustrating exemplary positions of an inner side surface of a sound production component and an ear hook plane according to some embodiments of the present disclosure.

FIG. 14 is a schematic diagram illustrating exemplary positions of an inner side surface of a sound production component and an ear hook plane according to some embodiments of the present disclosure. As shown in FIG. 14, in some embodiments, in order to prevent the sound production component 11 from blocking the ear canal opening, an included angle between the inner side surface IS of the sound production component 11 and the plane 51 where the ear hook 12 is located may be within a range of 15°-25°. In some embodiments, in order to further improve a listening effect, the included angle between the inner side surface IS of the sound production component 11 and the plane 51 where the ear hook 12 is located may be within a range of 17°-23°. In some embodiments, in order to make the cavity-like structure formed by the sound production component 11 and the cavum concha have a more suitable volume and size/count of an opening, the included angle between the inner side surface IS of the sound production component 11 and the plane 51 where the ear hook 12 is located may be within a range of 19°-20°.

In some embodiments, by designing a maximum vertical distance between the ear hook 12 and the inner side surface IS of the sound production component 11, an ear of a user may be well accommodated between the ear hook 12 and the sound production component 11 when the earphone 10 is in the wearing state. Therefore, the ear hook 12 may be well adapted to the ear of the user, which improves the wearing comfort and wearing stability of the earphone 10. If the maximum vertical distance between the ear hook 12 and the inner side surface IS of the sound production component 11 is too large, the wearing stability of the earphone 10 may be affected. If the maximum vertical distance between the ear hook 12 and the inner side surface IS of the sound production component 11 is too small, the adjustability of the earphone 10 may be affected.

Figure 15:
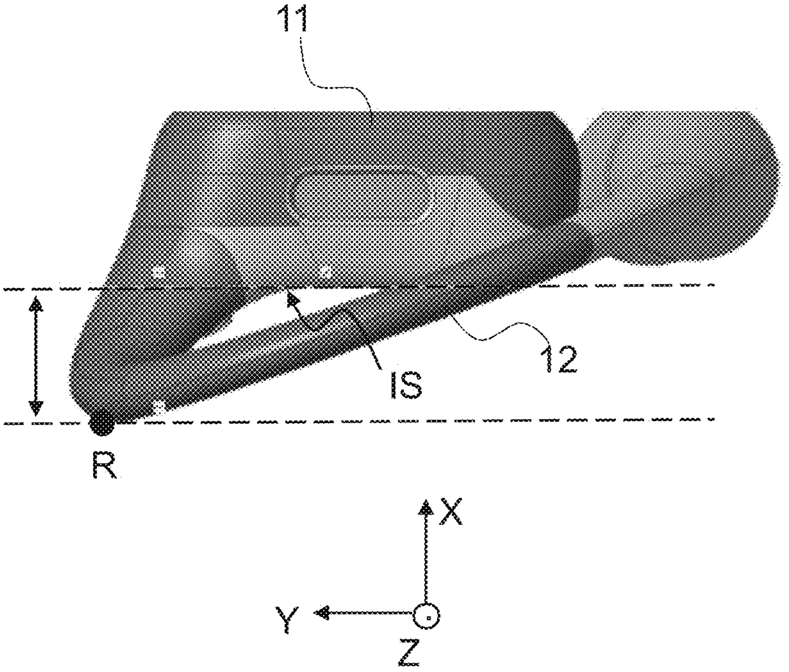
FIG. 15 is a schematic diagram illustrating an exemplary position of a point on an ear hook whose vertical distance is the farthest from an inner side surface of a sound production component according to some embodiments of the present disclosure.

FIG. 15 is a schematic diagram illustrating an exemplary position of a point on an ear hook whose vertical distance is the farthest from an inner side surface of a sound production component according to some embodiments of the present disclosure. As shown in FIG. 15, in some embodiments, on the XY plane, a point on the ear hook 12 which has the farthest vertical distance from the inner side surface IS of the sound production component 11 is point R. In some embodiments, in order to provide the earphone 10 with better wearing stability and adjustability, a vertical distance between point R and the inner side surface IS of the sound production component 11 may be within a range of 6 mm-9 mm, that is, a farthest vertical distance between the ear hook 12 and the inner side surface IS of the sound production component 11 may be within a range of 6 mm-9 mm. In some embodiments, in order to further improve the wearing stability, the vertical distance between point R and the inner side surface IS of the sound production component 11 may be within a range of 7 mm-8 mm. In some embodiments, in order to further improve the adjustability, the vertical distance between point R and the inner side surface IS of the sound production component 11 may be within a range of 7.5 mm-7.9 mm.

As shown in FIG. 3 and FIG. 5, in some embodiments, due to a limited space between the ear of the user and head, in order to facilitate the user to wear the earphone, a cross-section of the ear hook 12 at the ear hook extremum point N is set to be relatively small, and due to a volume limitation of a battery in the battery compartment 13, a cross-section of the battery compartment 13 is set to be relatively large. Therefore, in order to make the shape transition of the ear hook 12 smooth, a section connected to the battery compartment 13 on the ear hook 12 may be set as a transition section (not shown in the figure). In some embodiments, the transition section may be a section with a cross-sectional area larger than 17.99 $mm^2$ in the first portion 121 of the ear hook 12 excluding the battery compartment 13. As shown in FIG. 5, in some embodiments, the transition section may be a section with the largest change rate of the cross-sectional area in the first portion 121 of the ear hook 12. A starting point G1 corresponding to the transition section may be a position with the smallest cross-sectional area in the section, and an ending point G2 corresponding to the transition section may be a position with the largest cross-sectional area in the section. In some embodiments, the transition section may be connected to the battery compartment 13 through the ending point G2. It should be noted that point G1' and point G2' shown in FIG. 5 are projection points of the starting point G1 and the ending point G2 of the transition section on the user's sagittal plane, respectively.

In some embodiments, the transition section (or its cross-section) may be set in a shape that is narrow at the top and wide at the bottom (e.g., a pear shape) along a direction towards the sound production component 11, so as to increase a contact area with the ear of the user. In some embodiments, a projection of the transition section along the long-axis direction Y and a projection of the sound production component 11 along the long-axis direction Y have an overlapping region. The projection along the long-axis direction Y may be an orthographic projection on a reference plane (such as the XZ plane in FIG. 5) perpendicular to the long-axis direction Y. By setting the overlapping region of the transition section and the projection of the sound production component 11 along the long-axis direction Y, when the user wears the earphone, the sound production component 11 and the transition section may jointly clamp the ear of the user (e.g., a front side and a rear side of a cavum concha) to improve the wearing stability of the earphone 10. In some embodiments, the overlapping region between the projection of the transition section along the long-axis direction Y and the projection of the sound production component 11 along the long-axis direction Y accounts for no less than 50% of the projection of the sound production component 11 along the long-axis direction Y. In some embodiments, in order to further improve the wearing stability of the earphone 10, the overlapping region between the projection of the transition section along the long-axis direction Y and the projection of the sound production component 11 along the long-axis direction Y accounts for no less than 70% of the projection of the sound production component 11 along the long-axis direction Y. In some embodiments, in order to further improve the wearing stability of the earphone 10, the overlapping region between the projection of the transition section along the long-axis direction Y and the projection of the sound production component 11 along the long-axis direction Y accounts for no less than 80% of the projection of the sound production component 11 along the long-axis direction Y.

When the user wears the earphone 10, since the transition section is the main contact region with the ear when the ear hook 12 clamps the ear, the length of the transition section may affect the oppression sense (e.g., a pressure) of the ear hook 12 on the ear, and the wearing performance of the earphone 10 may be improved by reasonably setting the length of the transition section. In order to represent the length of the transition section, as shown in FIG. 5, the length of the transition section may be represented by an arc length of an inner curve (i.e., a curve section between point G1' and point G2') of a projection of the transition section on the user's sagittal plane. As shown in FIG. 5, in some embodiments, in order to reduce the pressure of the transition section on the ear of the user, the arc length of the inner curve of the projection of the transition section of the earphone 10 on the user's sagittal plane is within a range of 10 mm-14 mm. In some embodiments, in order to further reduce the dimension of the earphone 10 while reducing the pressure of the transition section on the ear of the user, the arc length of the inner curve of the projection of the transition section of the earphone 10 on the user's sagittal plane is within a range of 11 mm-13 mm.

In some embodiments, by setting a distance between the starting point G1 of the transition section and the upper vertex K or the ear hook extremum point N, a fit position of the transition section at the back of the ear may be adjusted when the earphone 10 is in the wearing state, thereby changing a direction of a clamping force of the ear hook 12 on the ear. In some embodiments, by setting the distance between the starting point G1 of the transition section and the upper vertex K or the ear hook extremum point N, the overlapping region between the projection of the transition section along the long-axis direction Y and the projection of the sound production component 11 along the long-axis direction Y may also be adjusted to improve the wearing stability of the earphone 10.

In some embodiments, in order to make the earphone 10 have better wearing stability, in the wearing state, on the projection of the earphone 10 on the user's sagittal plane, a distance between the starting point G1' of the inner curve of the projection of the transition section of the earphone 10 and the extremum point N' may be within a range of 24 mm-28 mm. In some embodiments, in order to make the overlapping region between the projection of the transition section along the long-axis direction Y and the projection of the sound production component 11 along the long-axis direction Y have an appropriate size, in the wearing state, on the projection of the earphone 10 on the user's sagittal plane, the distance between the starting point G1' of the inner curve of the projection of the transition section of the earphone 10 and the extremum point N' may be within a range of 25 mm-27 mm. In some embodiments, in order to make the clamping force of the ear hook 12 on the ear have an appropriate direction, in the wearing state, on the projection of the earphone 10 on the user's sagittal plane, the distance between the starting point G1' of the inner curve of the projection of the transition section of the earphone 10 and the extremum point N' may be within a range of 26 mm-26.5 mm.

In some embodiments, in order to make the earphone 10 have better wearing stability, in a non-wearing state, on the projection of the earphone 10 on the user's sagittal plane, the distance between the starting point G1' of the inner curve of the projection of the transition section of the earphone 10 and the extremum point N' may be within a range of 22 mm-26 mm. In some embodiments, in order to make the overlapping region between the projection of the transition section along the long-axis direction Y and the projection of the sound production component 11 along the long-axis direction Y have an appropriate size, in the non-wearing state, on the projection of the earphone 10 on the user's sagittal plane, the distance between the starting point G1' of the inner curve of the projection of the transition section of the earphone 10 and the extremum point N' may be within a range of 23 mm-26.5 mm. In some embodiments, in order to make the clamping force of the ear hook 12 on the ear have a suitable direction, in the non-wearing state, on the projection of the earphone 10 on the user's sagittal plane, the distance between the starting point G1' of the inner curve of the projection of the transition section of the earphone 10 and the extremum point N' may be within a range of 24 mm-25 mm.

In some embodiments, in order to make the earphone 10 have better wearing stability, in the wearing state, on the projection of the earphone 10 on the user's sagittal plane, a distance between the starting point G1' of the inner curve of the projection of the transition section of the earphone 10 and the projection point K' of the upper vertex K' may be within a range of 31 mm-35 mm. In some embodiments, in order to make the overlapping region between the projection of the transition section along the long-axis direction Y and the projection of the sound production component 11 along the long-axis direction Y have an appropriate size, in the wearing state, on the projection of the earphone 10 on the user's sagittal plane, the distance between the starting point G1' of the inner curve of the projection of the transition section of the earphone 10 and the projection point K' of the upper vertex K' may be within a range of 32 mm-34 mm. In some embodiments, in order to make the clamping force of the ear hook 12 on the ear have an appropriate direction, in the wearing state, on the projection of the earphone 10 on the user's sagittal plane, the distance between the starting point G1' of the inner curve of the projection of the transition section of the earphone 10 and the projection point K' of the upper vertex K' may be within a range of 32.5 mm-33 mm.

In some embodiments, in order to make the earphone 10 have better wearing stability, in the non-wearing state, on the projection of the earphone 10 on the user's sagittal plane, the distance between the starting point G1' of the inner curve of the projection of the transition section of the earphone 10 and the projection point K' of the upper vertex K' may be within a range of 28 mm-32 mm. In some embodiments, in order to make the overlapping region between the projection of the transition section along the long-axis direction Y and the projection of the sound production component 11 along the long-axis direction Y have an appropriate size, in the non-wearing state, on the projection of the earphone 10 on the user's sagittal plane, the distance between the starting point G1' of the inner curve of the projection of the transition section of the earphone 10 and the projection point K' of the upper vertex K' may be within a range of 29 mm-31 mm. In some embodiments, in order to make the clamping force of the ear hook 12 on the ear have an appropriate direction, in the non-wearing state, on the projection of the earphone 10 on the user's sagittal plane, the distance between the starting point G1' of the inner curve of the projection of the transition section of the earphone 10 and the projection point K' of the upper vertex K' may be within a range of 30 mm-30.8 mm.

In some embodiments, by setting an included angle α5 between a connection line connecting the starting point G1' of the inner curve of the projection of the transition section on the user's sagittal plane and the extremum point N' and a connection line connecting the starting point G1' of the transition section and the projection point K' of the upper vertex K, a fitting degree of a section between the upper vertex K and the transition section of the ear hook 12 with the back of the ear in the wearing state may be adjusted, thereby affecting the wearing stability of the earphone 10. In some embodiments, when a position of the ear hook extremum point N and a position of the upper vertex K of the ear hook are determined, by setting the included angle α5 between the connection line connecting the starting point G1' of the inner curve of the projection of the transition section on the user's sagittal plane and the extremum point N' and the connection line connecting the starting point G1' of the transition section and the projection point K' of the upper vertex K, the overlapping region between the projection of the transition section along the long-axis direction Y and the projection of the sound production component 11 along the long-axis direction Y may also be adjusted, thereby improving the wearing stability of the earphone 10.

In some embodiments, in order to make the earphone 10 have better wearing stability, in the wearing state, on the projection of the earphone 10 on the user's sagittal plane, the included angle α5 between the connection line connecting the starting point G1' of the inner curve of the projection of the transition section and the extremum point N' and the connection line connecting the starting point G1' of the transition section and the projection point K' of the upper vertex K may be within a range of 18°-22°. In some embodiments, in order to further improve the wearing stability of the earphone 10, in the wearing state, on the projection of the earphone 10 on the user's sagittal plane, the included angle α5 between the connection line connecting the starting point G1' of the inner curve of the projection of the transition section and the extremum point N' and the connection line connecting the starting point G1' of the transition section and the projection point K' of the upper vertex K may be within a range of 18.5°-21°. In some embodiments, in order to further improve the wearing stability of the earphone 10, in the wearing state, on the projection of the earphone 10 on the user's sagittal plane, the included angle α5 between the connection line connecting the starting point G1' of the inner curve of the projection of the transition section and the extremum point N' and the connection line connecting the starting point G1' of the transition section and the projection point K' of the upper vertex K may be within a range of 19°-20°.

In some embodiments, in order to make the earphone 10 have better wearing stability, in the non-wearing state, on the projection of the earphone 10 on the user's sagittal plane, the included angle α5 between the connection line connecting the starting point G1' of the inner curve of the projection of the transition section and the extremum point N' and the connection line connecting the starting point G1' of the transition section and the projection point K' of the upper vertex K may be within a range of 20°-24°. In some embodiments, to further improve the wearing stability of the earphone 10, in the non-wearing state, on the projection of the earphone 10 on the user's sagittal plane, the included angle α5 between the connection line connecting the starting point G1' of the inner curve of the projection of the transition section and the extremum point N' and the connection line connecting the starting point G1' of the transition section and the projection point K' of the upper vertex K may be within a range of 20.4°-22°. In some embodiments, to further improve the wearing stability of the earphone 10, in the non-wearing state, on the projection of the earphone 10 on the user's sagittal plane, the included angle α5 between the connection line connecting the starting point G1' of the inner curve of the projection of the transition section and the extremum point N' and the connection line connecting the starting point G1' of the transition section and the projection point K' of the upper vertex K may be within a range of 20.5°-21°.

Figure 16:
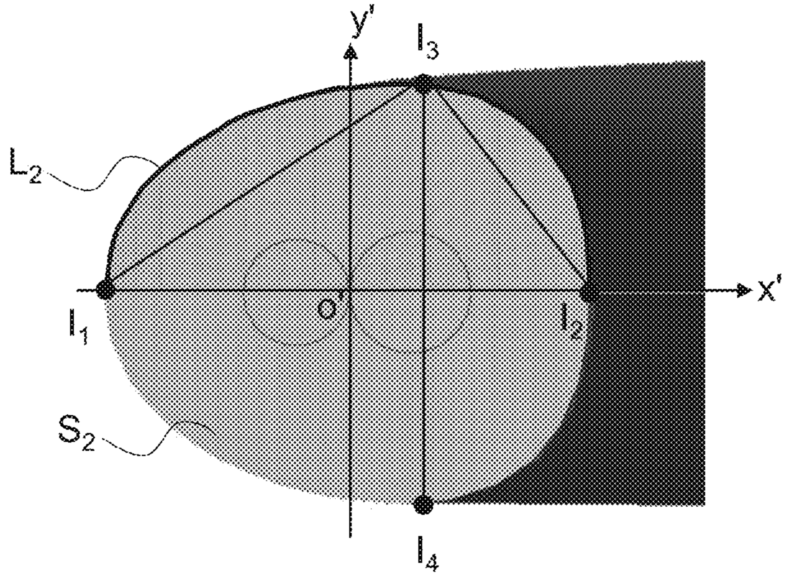
FIG. 16 is a schematic diagram illustrating an exemplary cross-section with the smallest area on an ear hook according to some embodiments of the present disclosure.

FIG. 16 is a schematic diagram illustrating an exemplary cross-section with the smallest area on an ear hook according to some embodiments of the present disclosure. In some embodiments, the cross-section with the smallest area on the ear hook is a cross-section where the ear hook extremum point N is located, and a projection of the cross-section along the long-axis direction Y is an axisymmetric plane S2. It should be understood that an arc section between the ending point G2 corresponding to the transition section and the upper vertex K is different in size from the axisymmetric plane S2, but similar in shape.

As shown in FIG. 16, in some embodiments, the axisymmetric plane S2 of the smallest cross-section of the ear hook along the long-axis direction Y may have a shape with one end narrower and the other end wider (e.g., pear-shaped, egg-shaped, droplet, etc.). The narrower end of the axisymmetric plane S2 has a first end point I1, and the wider end of the axisymmetric plane S2 has a second end point I2. In the wearing state, the second end point I2 is closer to the auricle than the first end point I1, so that a region where the ear hook 12 is in contact with the user's ear is mainly a region corresponding to the wider end, thereby increasing a contact area between the part of the ear hook corresponding to the axisymmetric plane S2 and the user's auricle to enable the ear hook 12 to cooperate with the sound production component 11 to better clamp the ear of the user, thus improving the wearing stability and adjustability of the earphone 10.

In some embodiments, by setting a cross-sectional area of the axisymmetric plane S2, the clamping coefficient of the "clamping force lever" mentioned above may be adjusted, thereby improving the wearing stability and adjustability of the earphone 10. If the cross-sectional area of the axisymmetric plane S2 is too small, the clamping coefficient of the ear hook 12 may be too small, and the clamping force provided by the ear hook 12 to the ear 100 may also be too small, which leads to poor wearing stability. In addition, if the cross-sectional area of the axisymmetric plane S2 is too small, a contact area between the ear hook 12 and the ear of the user may be too small when in the wearing state, causing a strong oppression sense (such as pressure) on the ear of the user by the ear hook 12, which leads to poor wearing comfort of the earphone 10. If the cross-sectional area of the axisymmetric plane S2 is too large, the clamping coefficient of the ear hook 12 may be too large, and the clamping force provided by the ear hook 12 to the ear 100 may also be too large, which leads to poor adjustability after wearing. In addition, if the cross-sectional area of the axisymmetric plane S2 is too large, the ear hook 12 may interfere with or squeeze the ear of the user in the wearing state, which leads to the poor wearing comfort of the earphone 10.

In some embodiments, in order to make the earphone 10 have better wearing stability and adjustability, the cross-sectional area of the axisymmetric plane S2 may be within a range of 5 $mm^2$-9 $mm^2$. In some embodiments, in order to further improve the wearing stability, the cross-sectional area of the axisymmetric plane S2 may be within a range of 6 $mm^2$-8 $mm^2$. In some embodiments, in order to further improve the adjustability, the cross-sectional area of the axisymmetric plane S2 may be within a range of 6.5 $mm^2$-7.5 $mm^2$.

In some embodiments, two points with the largest distance in any direction may be determined on an outer contour of the axisymmetric plane S2, and a long-axis of the axisymmetric plane S2 may be determined through the two points. In some embodiments, a distance between the first end point I1 and the second end point I2 of the axisymmetric plane S2 is the largest. The long-axis of the axisymmetric plane S2 is a connection line I1I2 connecting the first end point I1 and the second end point I2.

In some embodiments, in a direction perpendicular to the long-axis I1I2, the two points (i.e., point I3 and point I4) with the largest distance may be determined on the outer contour of the axisymmetric plane S2. Thus, the connection line I3I4 between point I3 and point I4 is the short-axis of the axisymmetric plane S2, and the connection line I1I2 is perpendicular to the connection line I3I4.

In some embodiments, the lengths of the long-axis I1I2 and the short-axis I3I4 determine the cross-sectional area of the axisymmetric plane S2. If the lengths of the long-axis I1I2 and the short-axis I3I4 are too large, the cross-sectional area of the axisymmetric plane S2 may be too large, causing the clamping coefficient of the ear hook 12 to be excessively large, thus the clamping force provided by the ear hook 12 to the ear 100 is too large, which leads to the poor adjustability after wearing. At the same time, the ear hook 12 may interfere with or squeeze the ear of the user in the wearing state, which leads to the poor wearing comfort of the earphone 10. If the lengths of the long-axis I1I2 and the short-axis I3I4 are too small, the cross-sectional area of the axisymmetric plane S2 may be too small, causing the clamping coefficient of the ear hook 12 to be too small, thus the clamping force provided by the ear hook 12 to the ear 100 is too small, which leads to the poor wearing stability. At the same time, the contact area between the ear hook 12 and the ear of the user is too small in the wearing state, thus the oppression sense (such as the pressure) of the ear hook 12 on the ear of the user is relatively strong, which leads to the poor wearing comfort of the earphone 10.

In some embodiments, in order to make the earphone 10 have better wearing stability and adjustability, the length of the long-axis I1I2 may be within a range of 2 mm-5 mm. In some embodiments, in order to further improve the wearing stability, the length of the long-axis I1I2 may be within a range of 2.5 mm-4 mm. In some embodiments, in order to further improve the adjustability, the length of the long-axis I1I2 may be within a range of 3 mm-4.5 mm.

Furthermore, when the length of the long-axis I1I2 remains unchanged, the length of the short-axis I3I4 also determines the dimension and shape of the wider end of the axisymmetric plane S2, and the ear hook is mainly in contact with the ear of the user at the wider end. Therefore, if the length of the short-axis I3I4 is too small, the contact area between the ear hook and the ear of the user may be too small, thus the ear hook may provide a strong oppression sense (such as pressure) on the ear of the user, and the earphone 10 may not be worn stably. If the length of the short-axis I3I4 is too large, the contact area between the ear hook and the ear of the user may be too large, thus the ear hook may interfere with or squeeze the ear of the user in the wearing state, which may affect the adjustability of the earphone 10.

In some embodiments, in order to make the earphone 10 have better wearing stability and adjustability, the length of the short-axis I3I4 may be within a range of 1.5 mm-4.5 mm. In some embodiments, in order to further improve the wearing stability, the length of the short-axis I3I4 may be within a range of 2 mm-4 mm. In some embodiments, in order to further improve the adjustability, the length of the short-axis 1314 may be within a range of 2.5 mm-3 mm.

As shown in FIG. 16, in some embodiments, to establish a second rectangular coordinate system x'o'y', a direction of the long-axis I1I2 of the axisymmetric plane S2 may be designated as an abscissa axis, i.e., an x'-axis, a direction perpendicular to the long-axis I1I2 (i.e., a direction of the short-axis I3I4) may be designated as a coordinate axis, i.e., a y'-axis, and an intersection of the x'-axis and the y'-axis is designated as an origin o'.

In some embodiments, the long-axis I1I2 of the axisymmetric plane S2 may be a symmetry axis of the axisymmetric plane S2, and outer contour curves of two half-planes on both sides of the long-axis I1I2 of the axisymmetric plane S2 are the same. In some embodiments, an outer contour curve of a half-plane on one side (e.g., an upper side or a lower side) of the long-axis I1I2 (i.e., the symmetry axis) is defined as a second curve L2. In some embodiments, two end points of the second curve L2 (such as the first end point I1 and the second end point I2) may be two end points of the long-axis I1I2 (such as the first end point I1 and the second end point I2), the second curve L2 is the outer contour (e.g., an outer contour on each side of the long-axis I1I2) of the axisymmetric plane S2 between the two end points of the long-axis I1I2. In some embodiments, the second curve L2 has an extremum point in a direction (i.e., a direction of the y'-axis) perpendicular to a symmetry axis (the long-axis I1I2). In some embodiments, since the short-axis I3I4 has the largest length in the direction perpendicular to the symmetry axis I1I2, and the axisymmetric plane S2 is symmetrical about the symmetry axis I1I2, on one side (the upper side or the lower side) of the symmetry axis I1I2, a point on the outer contour of the axisymmetric plane S2 with the largest distance from the symmetry axis I1I2 is an end point of the short-axis I3I4. According to the definition of the extremum point, the second curve L2 corresponding to the outer contour curve of the half-plane located on one side (such as the upper side or the lower side) of the long-axis I1I2 (i.e., the symmetry axis) may be determined, and the extremum point is the end point of the short-axis I3I4 on the side corresponding to the long-axis I1I2. For example, if an outer contour curve of a half-plane located on the upper side of the long-axis I1I2 (i.e., the symmetry axis) is designated as the second curve L2, and an extremum point of which is an end point I3 of the short-axis I3I4 on the upper side of the long-axis I1I2.

In some embodiments, in the wearing state, in the long-axis I1I2 direction, the extremum point (I3 or I4) of the second curve L2 is closer to the second end point I2 than the first end point I1, thus one end of the axisymmetric plane S2 close to the second end point I2 is wider, and one end of the axisymmetric plane S2 close to the first end point I1 is narrower. Since the second end point I2 is closer to the auricle, a region on the ear hook that is in contact with the user is a region corresponding to a wider end close to the second end point I2, thereby increasing the contact area between the ear hook and the user and avoiding the strong oppression sense (e.g., a pressure) of the ear hook on the ear of the user, which improves the wearing stability of the earphone 10.

In some embodiments, in the symmetry axis I1I2 direction, a ratio of a distance between the extremum point (e.g., the extremum point I3) and the first end point I1 to a distance between the extremum point (e.g., the extremum point I3) and the second end point I2 determines a shape and a dimension of the wider end of the axisymmetric plane S2 near the second end point I2, thereby affecting the contact area between the ear hook and the ear of the user. If the ratio of the distance between the extremum point (e.g., the extremum point I3) and the first end point I1 to the distance between the extremum point (e.g., the extremum point I3) and the second end point I2 is too large in the symmetry axis I1I2 direction, and the extremum point I3 is too close to the second end point I2, that is, the short-axis I3I4 is too close to the second end point I2, the dimension of the wider end close to the second end point I2 on the axisymmetric plane S2 may be too large. Thus, the contact area between the ear hook and the ear of the user is too large, and the ear hook may interfere with the ear of the user in the wearing state, which may affect the adjustability of the earphone 10. If the ratio of the distance between the extremum point (e.g., the extremum point I3) and the first end point I1 to the distance between the extremum point (e.g., the extremum point I3) and the second end point I2 is too small in the symmetry axis I1I2 direction, and the extremum point I3 is too far to the second end point I2, that is, the short-axis I3I4 is too far to the second end point I2, a dimension of the wider end close to the second end point I2 on the axisymmetric plane S2 may be too small. Thus, the contact area between the ear hook and the ear of the user is too small, the oppression sense (e.g., the pressure) of the ear hook on the ear of the user is relatively strong, which may cause the earphone 10 not to be worn stably.

Figure 17:
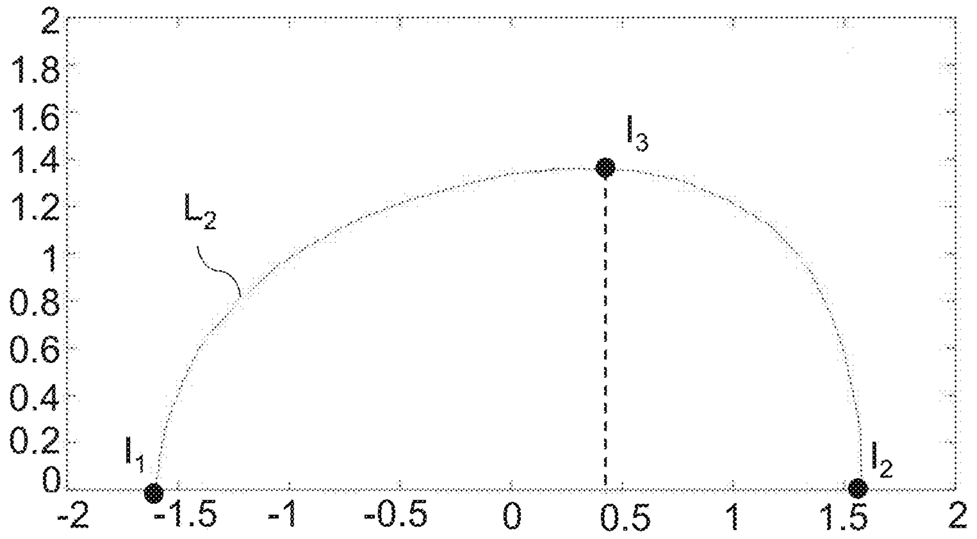
FIG. 17 is a schematic diagram illustrating an exemplary fitting function curve of a second curve according to some embodiments of the present disclosure.

In some embodiments, in order to improve the wearing stability of the earphone 10, in the symmetry axis I1I2 direction (i.e., in the x'-axis direction), a ratio of a distance between an extremum point (e.g., the extremum point I3) of the outer contour curve (i.e., a third curve L3) and the first end point I1 of the outer contour curve to a distance between the extremum point (e.g. extremum point I3) of the outer contour curve and the second end point I2 of the outer contour curve may be within a range of 1.5-2.5. That is, as shown in FIG. 17, in the second rectangular coordinate system x'o'y', a ratio of an absolute value of a difference between an abscissa of point I3 and an abscissa of point I1 to an absolute value of a difference between the abscissa of point I3 and an abscissa of point I2 may be within a range of 1.5-2.5. In some embodiments, in order to further improve the wearing stability, the ratio of the distance between the extremum point (e.g., the extremum point I3) and the first end point I1 to the distance between the extremum point (e.g., the extremum point I3) and the second end point I2 in the symmetry axis direction I1I2 may be within a range of 1.8-2.2. In some embodiments, in order to further improve the adjustability, the ratio of the distance between the extremum point (e.g., the extremum point I3) and the first end point I1 to the distance between the extremum point (e.g., the extremum point I3) and the second end point I2 in the symmetry axis direction I1I2 may be within a range of 1.9-2.1.

In summary, by designing a position of the extremum point (e.g., the extremum point I3) of the outer contour curve (i.e., the second curve L2), a contact area between the ear hook 12 and the auricle of the user may be adjusted when the earphone 10 is in the wearing state, thereby improving the wearing stability and adjustability of the earphone 10.

FIG. 17 is a schematic diagram illustrating an exemplary fitting function curve of a second curve according to some embodiments of the present disclosure. As shown in FIG. 16 and FIG. 17. In some embodiments, an extremum point (e.g., the extremum point I3) of the second curve L2 may be determined by curve fitting. Merely by way of example, the x'-axis of the coordinate system x'o'y' is set at a position of the long-axis I1I2 of the axisymmetric plane S2, the origin o' is set at a midpoint of the long-axis I1I2, and the y'-axis is set at a position passing through the origin o' and perpendicular to the x'-axis.

In the second rectangular coordinate system x'o'y', the second curve L2 is fitted by a quaternary polynomial function to obtain a fitting function equation of the second curve L2:

$$t=-0.3923*s^4-0.1377*s^3+0.0112*s^2+0.2297*s+1.318. \quad \text{(Equation 4)}$$

In some embodiments, it may be determined by equation 4 that the second curve L2 has two zero points, which correspond to the first end point I1 and the second end point I2, respectively. In some embodiments, the coordinates of the first end point I1 are (−1.375, 0), and the coordinates of the second end point I2 are (1.375, 0).

It should be noted that a function equation (e.g., equation 4) of the second curve L2 obtained by polynomial fitting is an approximate expression of the second curve L2. When a count of sampling points for fitting the function equation is large (e.g., greater than 10) and evenly distributed, a curve represented by the function equation may be considered as the second curve L2. The function equation fitted in the present disclosure is only an example, mainly used to describe a feature of the second curve L2 (including an extremum point, an inflection point, a first derivative, a second derivative, etc.), a specific function equation of the second curve L2 (e.g., equation 4) is related to the selection of the origin o' of the coordinate system x'o'y', and the function equation is different when the origin o' is different. However, in the case of the direction of the horizontal axis (x'-axis) and the direction of the vertical-axis (y'-axis) of the coordinate system remaining unchanged, a position of the extremum point of the second curve L2 on the second curve L2 is certain, and properties of the first derivative and the second derivative of the second curve L2 are also certain, which do not change with a position of the origin o' of the coordinate system x'o'y'. The present disclosure is non-limiting to the selection of the origin o' of the coordinate system x'o'y' for fitting the second curve L2 and the function equation of the second curve L2.

In some embodiments, the second curve L2 has one and only one extremum point, and the extremum point is the maximum point I3 and the corresponding coordinates are (0.4599, 1.3951).

In some embodiments, more descriptions regarding determining the extremum point of the second curve L2 may be found in related descriptions regarding the extremum point of the first curve L1, which may not be repeated here.

Figure 18:
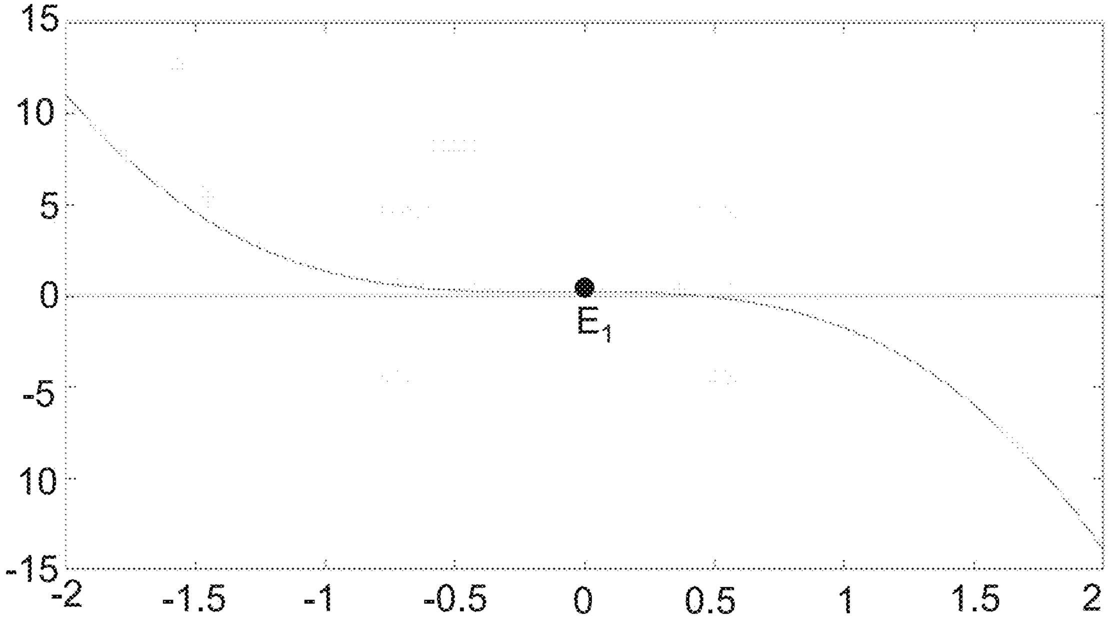
FIG. 18 is a schematic diagram illustrating an exemplary first derivative curve of a fitting curve according to some embodiments of the present disclosure.

FIG. 18 is a schematic diagram illustrating an exemplary first derivative curve of a fitting curve according to some embodiments of the present disclosure. As shown in FIG. 18, in some embodiments, in the second rectangular coordinate system x'o'y', the second curve L2 has a first derivative:

$$t'=-1.5692*s^3-0.4131*s^2+0.0224*s+0.2297. \quad \text{(Equation 5)}$$

In some embodiments, the first derivative of the second curve L2 is continuous.

In some embodiments, in the second rectangular coordinate system x'o'y', the first derivative of the second curve L2 has one or more inflection points. In some embodiments, in the second rectangular coordinate system x'o'y', the first derivative of the second curve L2 has one inflection point, i.e., point E1. As shown in FIG. 18, on the left side of point E1, an image curve of the first derivative is a concave function, and on the right side of point E1, the image curve of the first derivative is a convex function. Point E1 is a change point of the concavity and convexity of the image curve of the first derivative and is the inflection point of the first derivative. More descriptions regarding determining the inflection point may be found in FIGS. 7-9 and related descriptions thereof, which may not be repeated here.

In some embodiments, in the second rectangular coordinate system x'o'y', the first derivative of the second curve L2 has a zero point (0.4559, 0).

In some embodiments, in the second rectangular coordinate system x'o'y', the first derivative of the second curve L2 has two extremum points, and the corresponding abscissas are x1=0.1994, and x2=−0.0239.

Figure 19:
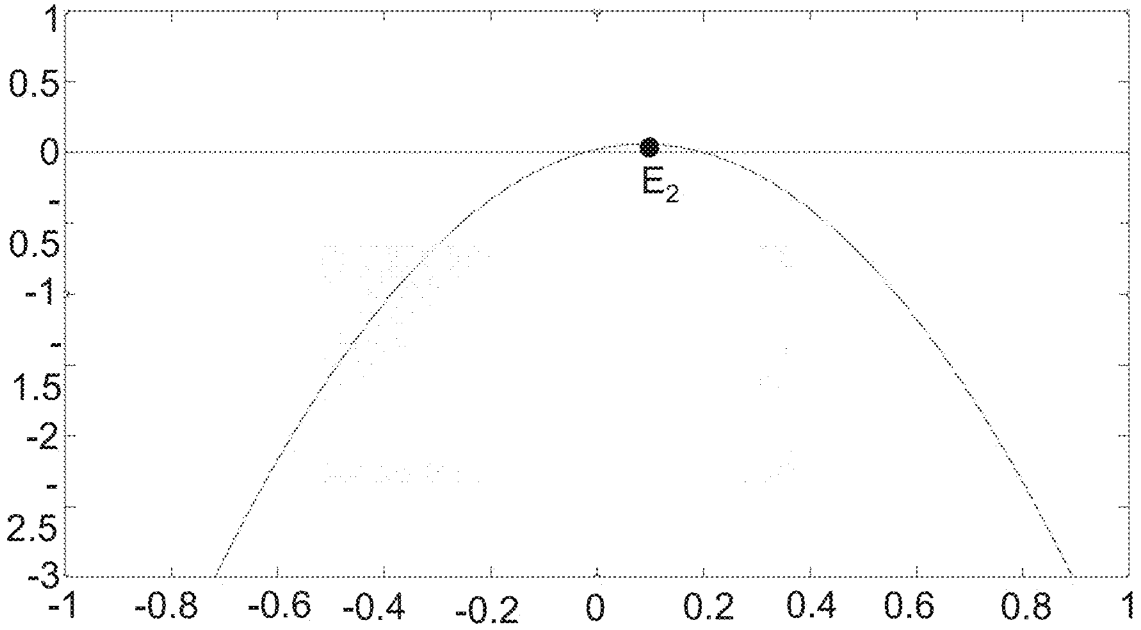
FIG. 19 is a schematic diagram illustrating an exemplary second derivative curve of a fitting curve according to some embodiments of the present disclosure.

FIG. 19 is a schematic diagram illustrating an exemplary second derivative curve of a fitting curve according to some embodiments of the present disclosure. As shown in FIG. 19, in some embodiments, the second curve L2 has a second derivative:

$$t''=-4.7076*s^2-0.8262*s+0.0224. \quad \text{(Equation 6)}$$

In some embodiments, the second derivative of the second curve L2 is continuous.

In some embodiments, in the second rectangular coordinate system x'o'y', the second derivative of a fitting curve L4 of a third curve L3 has a maximum point, i.e., point E2. As shown in FIG. 19, curves of the second derivative of the fitting curve L4 on the left side and the right side near point E2 are all located below point E2, that is, in regions on the left side and the right side near point E2, a function value of the second derivative corresponding to point E2 is the largest, and point E2 is the maximum point of the second derivative.

In some embodiments, the coordinates of the maximum point E2 of the second derivative are (−0.08775, 0.0587). In some embodiments, descriptions regarding determining the coordinates of the maximum point E2 of the second derivative may be found in the related descriptions regarding the maximum point of the fitting curve L2 of the first curve L1, which may not be repeated here.

In some embodiments, by designing the second curve L2 (equation 4), the first derivative of the second curve L2 (equation 5), and the second derivative of the second curve L2 (equation 6), the ear hook 12 may have a cross-section with a preset shape (an outer contour curve with a preset curve feature) at the extremum point N' of the first curve L1, thereby increasing a contact area between the ear hook 12 and the user's ear in the wearing state.

Figure 20:
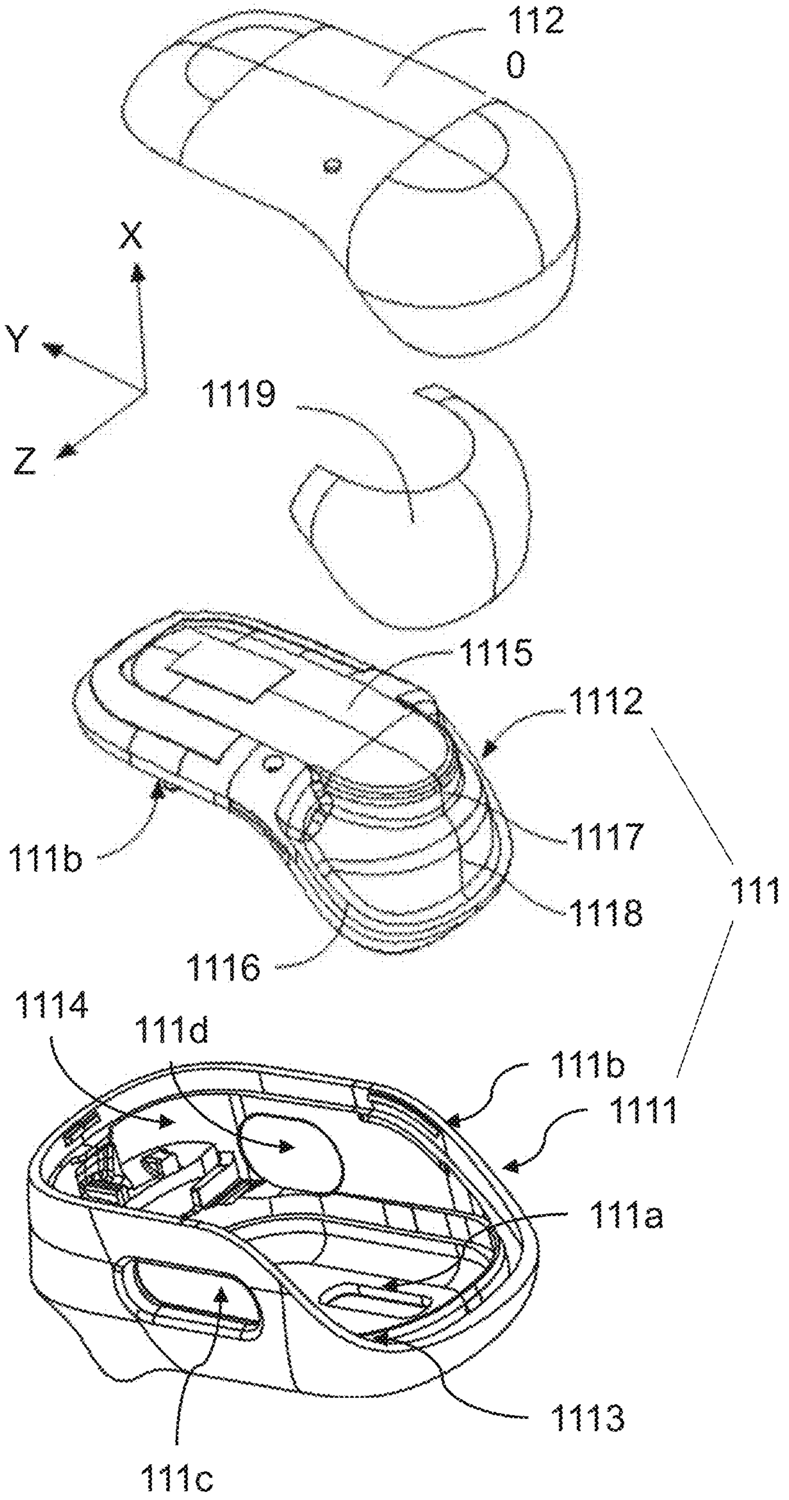
FIG. 20 is an exploded view illustrating an exemplary sound production component according to some embodiments of the present disclosure.

As shown in FIG. 20, in some embodiments, the clamping region of the housing 111 inserted into the user's cavum concha 102 and/or the inner side of the clamping region may be provided with a flexible material. A Shore hardness of the flexible material may keep in a certain range. If the Shore hardness of the flexible material is too large, the comfort of the sound production component 11 in the wearing state may deteriorate. In some embodiments, in order to meet wearing requirements, the Shore hardness of the flexible material may be in a range of 0 HA to 40 HA. In some embodiments, in order to improve comfort, the Shore hardness of the flexible material may be in a range of 0 HA to 20 HA.

The flexible material may be a flexible insert 1119, and the hardness of the flexible insert 1119 may be less than the hardness of the housing 111. The housing 111 may be a plastic part; and the material of the flexible insert 1119 may be silicone, rubber, etc., and the flexible insert 1119 may be formed on the clamping region and/or the inner side of the clamping region by injection molding. Further, the flexible insert 1119 may at least partially cover a region of the housing 111 corresponding to the free end FE, i.e., cover the clamping region and/or the inner side of the clamping region, so that the sound production component 11 may at least partially abut against the cavum concha 102 through the flexible insert 1119. In other words, a portion of the housing 111 extending into the cavum concha 102 and in contact with the cavum concha 102 may be covered by the flexible insert 1119. In this way, when the sound production component 11 abuts against the cavum concha 102, for example, when the sound production component 11 and the ear hook 12 are arranged to jointly clamp the ear from the front and rear sides of an ear region corresponding to the cavum concha 102 of the ear 100, the flexible insert 1119 may act as a buffer between the housing 111 and the ear 100 (e.g., the ear region) to relieve the pressure of the acoustic device 10 on the ear 100, which is conducive to improving the comfort of the acoustic device 10 in the wearing state.

In some embodiments, the flexible insert 1119 may continuously cover at least partial regions of the housing 111 corresponding to the rear side surface RS, the upper side surface US, and the lower side surface LS. For example, a region of the housing 111 corresponding to the rear side surface RS may be covered more than 90% by the flexible insert 1119, and regions of the housing 111 corresponding to the upper side surface US and the lower side surface LS may be respectively covered about 30% by the flexible insert 1119. In this way, the comfort of the acoustic device 10 in the wearing state and the need for structural components such as the transducer arranged in the housing 111 may be considered.

In some embodiments, viewed along the thickness direction X, the flexible insert 1119 may be provided in a U shape.

In some embodiments, a portion of the flexible insert 1119 corresponding to the lower side surface LS may abut against an antitragus. A thickness of a portion of the flexible insert 1119 corresponding to the rear side surface RS may be smaller than a thickness of a portion of the flexible insert 1119 corresponding to the upper side surface US and a thickness of a portion of the flexible insert 1119 corresponding the lower side surface LS, respectively, so that good comfort can also be obtained when the sound production component 11 abuts against an uneven position the cavum concha 102.

FIG. 20 is an exploded view illustrating an exemplary sound production component according to some embodiments of the present disclosure. In some embodiments, the housing 111 may include an inner shell 1111 and an outer shell 1112 snap-fit with each other along the thickness direction X. The inner shell 1111 may be closer to the ear 100 than the outer shell 1112 in the wearing state. A sound outlet 111*a*, a first pressure relief hole 111*c*, and a second pressure relief hole 111*d* may be disposed on the inner shell 1111. A diaphragm of the transducer may be disposed toward the inner shell 1111. A first acoustic cavity may be formed between the transducer and the inner shell 1111. A contact surface 111*b* between the outer shell 1112 and the inner shell 1111 may be inclined to a side where the inner shell 1111 is located in a direction close to the free end FE, so that the flexible insert 1119 may be arranged as much as possible in a region of the outer shell 1112 corresponding to the free end FE. For example: the whole flexible insert 1119 may be arranged in the region of the outer shell 1112 corresponding to the free end FE, so as to simplify the structure of the sound production component 11 and reduce the processing cost.

In some embodiments, a wrapping layer may be provided outside the housing 111, and the Shore hardness of the wrapping layer may be kept in a certain range. If the Shore hardness is too large, the comfort of the sound production component 11 in the wearing state may deteriorate, and when a flexible coating 1120 can integrally cover at least part of an outer surface of the flexible insert 1119, the flexible insert 1119 may not achieve a proper function (e.g., relieve the pressure of the acoustic device 10 on the ear 100, and improve the comfort of the acoustic device 10 in the wearing state). If the Shore hardness is too small, the side wall of the sound production component 11 may be completely attached to the structure of the cavum concha 102, so that the internal environment may be completely sealed and isolated from the external environment, and the cavity-like structure may not be formed, resulting in failing to reduce the far-field sound leakage effect, and failing to shape during the assembly process. In some embodiments, in order to improve the sound leakage reduction effect, the Shore hardness of the wrapping layer may be in a range of 10 HA to 80 HA. In some embodiments, in order to improve the comfort of the sound production component 11 in the wearing state, the Shore hardness of the wrapping layer may be in a range of 15 HA to 70 HA. In some embodiments, in order to make the cavity-like structure formed by the sound production component 11 and the cavum concha 102 have a better opening size, the Shore hardness of the wrapping layer may be in a range of 25 HA to 55 HA. In some embodiments, in order to ensure better shaping during assembly, the Shore hardness of the wrapping layer may be in a range of 30 HA to 50 HA.

The wrapping layer may be the flexible coating 1120, and the hardness of the flexible coating 1120 may be less than that of the housing 111. The housing 111 may be a plastic part; and a material of the flexible coating 1120 may be silicone, rubber, etc., and the flexible coating 1120 may be formed on a preset region of the housing 111 by injection molding, glue connection, or the like. Further, the flexible coating 1120 may integrally cover at least part of the outer surface of the flexible insert 1119 and at least part of the outer surface of the housing 1112 not covered by the flexible insert 1119, which is conducive to enhancing the consistency of the appearance of the sound production component 11. Of course, the flexible coating 1120 may further cover the outer surface of the inner shell 1111. The hardness of the flexible insert 1119 may be smaller than that of the flexible coating 1120, thereby making the flexible insert 1119 be sufficiently soft. In addition, the flexible coating 1120 may also improve the comfort of the acoustic device 10 in the wearing state, and have a certain structural strength to protect the flexible insert 1119. Further, an area of the outer surface of the flexible insert 1119 may be between 126 $mm^2$ and 189 $mm^2$. If the area of the outer surface of the flexible insert 1119 is too small, the comfort of the sound production component 11 in the wearing state may deteriorate; and if the area of the outer surface of the flexible insert 1119 is too large, a volume of the sound production component 11 may be too large, and an area where the flexible insert 1119 does not abut against the cavum concha 102 may be too large, which may deviate from the original intention of the flexible insert 1119. In some embodiments, the thickness of the flexible coating 1120 may be less than the thickness of the housing 1112.

In some embodiments, the inner shell 1111 may include a bottom wall 1113 and a first side wall 1114 connected with the bottom wall 1113, the outer shell 1112 may include a top wall 1115 and a second side wall 1116 connected with the top wall 1115. The second side wall 1116 and the first side wall 1114 may be snap-fit with each other along the parting surface 111*b*, and may support each other. Viewed along the short-axis direction Z, in a reference direction of the connection end CE pointing to the free end FE (e.g., an opposite direction of an arrow in the long-axis direction Y in FIG. 20), a portion of the first side wall 1114 close to the free end FE may gradually approach the bottom wall 1113 in the thickness direction X, and a portion of the second side wall 1116 close to the free end FE may be gradually away from the top wall 1115 in the thickness direction X, so that the parting surface 111*b* may be inclined to a side where the inner shell 1111 is located in a direction close to the free end FE. In this case, the flexible insert 1119 may be at least partially disposed on an outer side of the second side wall 1116. For example, referring to FIG. 20, the flexible insert 1119 may not only be disposed on the outer side of the second side wall 1116, but also partially disposed on the outer side of the top wall 1115.

In some embodiments, the housing 1112 may be provided with an insertion groove at least partially located on the second side wall 1116, and the flexible insert 1119 may be embedded in the insertion groove, so that an outer side of a region of the housing 1112 not covered by the flexible insert 1119 and an outer surface of the flexible insert 1119 may have a continuous transition. A region where the flexible insert 1119 in FIG. 20 is located may simply be regarded as the insertion groove. In this way, it is not only conducive for the flexible insert 1119 to accumulate on the outer shell 1112 during the injection molding process, avoiding the overflow of the flexible insert 1119, but also conductive to improving the appearance quality of the sound production component 11 and preventing the surface of the sound production component 11 from being bumpy.

In some embodiments, the second side wall 1116 may include a first sub-side wall segment 1117 and a second sub-side wall segment 1118 connected with the first sub-side wall segment 1117. The first sub-side wall segment 1117 may be closer to the top wall 1115 than the second sub-side wall segment 1118 in the thickness direction X, and the second sub-side wall segment 1118 may further protrude toward an outer side of the housing 111 than the first sub-side wall segment 1117. In short, the second side wall 1116 may have a stepped structure. With the application of the structure, the flexible insert 1119 may be accumulated on the outer shell 1112 during the injection molding process, avoiding the overflow of the flexible insert 1119, the sound production component 11 may better abut against the cavum concha 102 through the flexible insert 1119, thereby improving the comfort of the acoustic device 10 in the wearing state.

Figure 21:
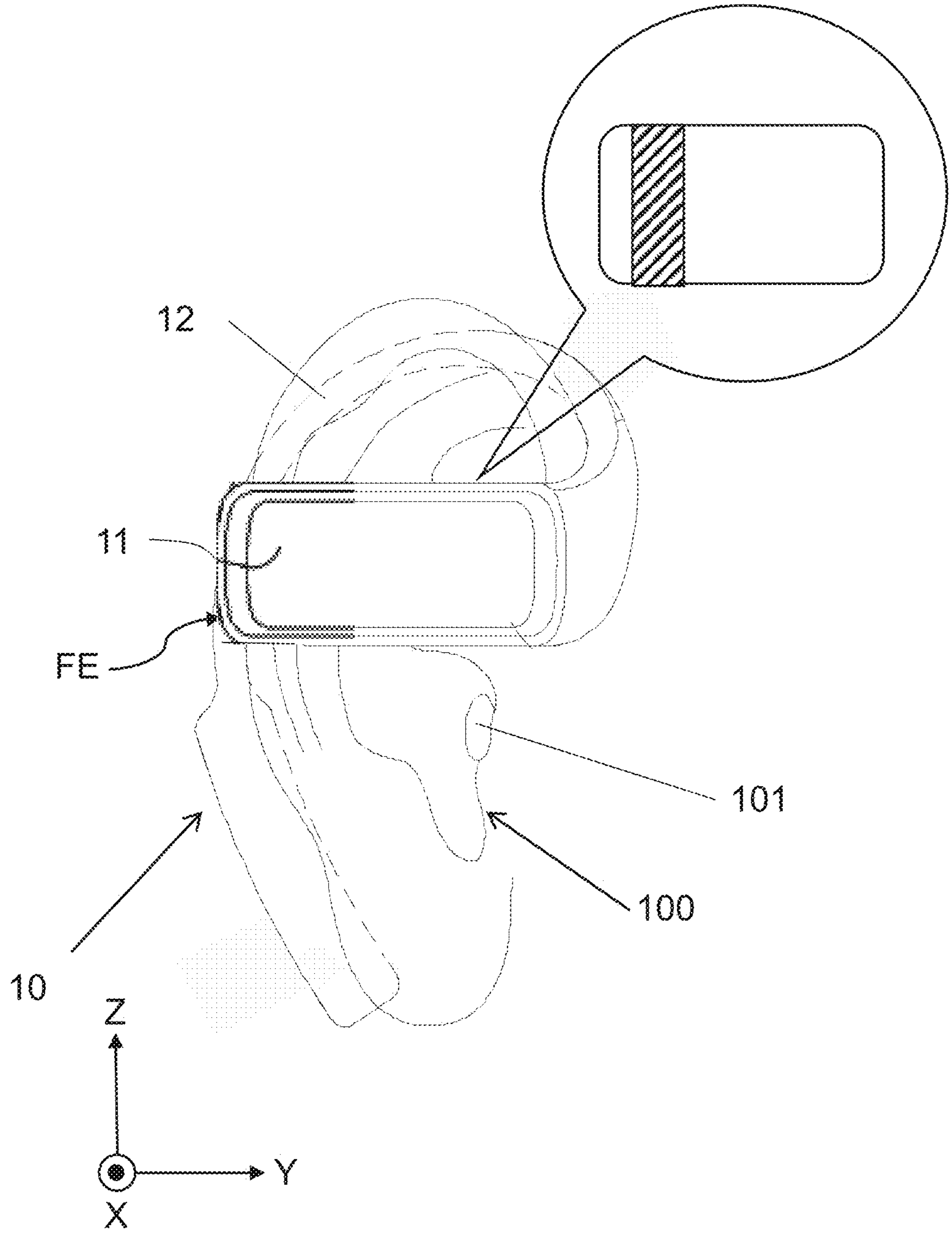
FIG. 21 is a schematic diagram illustrating another exemplary wearing of an earphone according to some embodiments of the present disclosure.

The earphone 10 may be described in detail by taking the earphone 10 shown in FIG. 21 as an example. It should be known that, without violating the corresponding acoustic principles, the structure of the earphone 10 in FIG. 21 and the corresponding parameters thereof may also be applied to the earphones of other configurations mentioned above.

Figure 22:
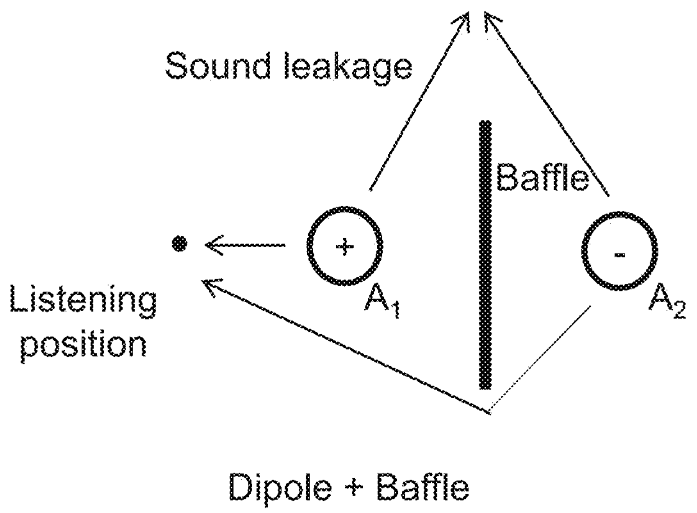
FIG. 22 is a schematic diagram illustrating an exemplary distribution of baffle structures arranged between two sound sources of double sound sources according to some embodiments of the present disclosure.

The output effect of the earphone can be improved by arranging the sound production component 11 at least partially at the antihelix 105 of the user, i.e., a sound intensity at a near-field listening position may be increased, and the volume of the far-field leakage sound may also be reduced. When the user wears the earphone 10, one or more sound outlets may be provided on a side of the housing of the sound production component 11 near or toward the user's ear canal, and one or more pressure relief holes may be provided on another side wall of the housing of the sound production component 11 (e.g., a side wall away from or back to the user's ear canal). The sound outlets may be acoustically coupled with a front cavity of the earphone 10 and the pressure relief holes may be acoustically coupled with a rear cavity of the earphone 10. Taking the sound production component 11 including a sound outlet and a pressure relief hole as an example, sound output by the sound outlet and sound output by the pressure relief hole may be approximately regarded as two sound sources, and sound waves of the two sound sources may be in opposite phases. The sound output by the sound outlet may be directly transmitted to the opening of the user's ear canal without hindrance, while the sound output by the pressure relief hole may bypass the housing of the sound production component 11 or pass through a gap formed between the sound production component 11 and the antihelix 105. In this case, the sound production component 11 and the antihelix 105 may form a structure similar to a baffle (the antihelix 105 may be equivalent to a baffle), wherein a sound source corresponding to the sound outlet may be located on one side of the baffle, and a sound source corresponding to the pressure relief hole may be located on another side of the baffle, thereby forming the acoustic model shown in FIG. 22. As shown in FIG. 22, when the baffle is provided between a point sound source A1 and a point sound source A2, in the near-field, a sound field of the point sound source A2 needs to bypass the baffle to interfere with a sound wave of the point sound source A1 at the listening position, which is equivalent to an increase in a sound path from the point sound source A2 to the listening position. Therefore, assuming that the point sound source A1 and the point sound source A2 have the same amplitude, an amplitude difference between the sound waves of the point sound source A1 and the point sound source A2 at the listening position may increase compared to the case without the baffle, thus reducing a degree of cancellation of the two sounds at the listening position and making the volume at the listening position increase. In the far field, since the sound waves generated by the point sound source A1 and the point sound source A2 may interfere without bypassing the baffle in a large spatial area (similar to the case without the baffle), the sound leakage in the far-field may not increase significantly compared to the case without the baffle. Therefore, the baffle structure around one of the point sound sources A1 and A2 may significantly increase the volume of the near-field listening position without significantly increasing the volume of the far-field sound leakage.

In some embodiments, the sound production component 11 may include a transducer and a housing accommodating the transducer. The housing may be at least partially located at the antihelix 105 of the user, and a side of the housing toward the antihelix 105 of the user may include a clamping region in contact with the antihelix 105 of the user. Since the distance of the sound production component 11 relative to an ear hook plane in the thickness direction X is enlarged after wearing, the sound production component 11 may tend to approach the ear hook plane, thereby forming clamping in the wearing state. In some embodiments, an orthographic projection of the ear hook 12 on a reference plane (e.g., the YZ plane in FIG. 21) perpendicular to the thickness direction X may partially overlap with an orthographic projection of a middle section or a middle front section of the sound production component 11 on the same reference plane (as shown in a shaded portion of the housing toward a side of the antihelix 105 of the user in the figure), thereby forming a projection overlapped region. The projection overlapped region formed by the orthographic projection of the ear hook 12 on the reference plane and the orthographic projection of the free end FE on the same reference plane may be located on a side toward the antihelix 105 of the user. In this way, not only the sound production component 11 and the ear hook 12 may jointly clamp the ear 100 from the side of the ear 100 away from the head to the side of the ear 100 toward the head, but also the formed clamping force may be mainly expressed as compressive stress, which is conducive to improving the stability and the comfort of the acoustic device 10 in the wearing state. It should be noted that the above clamping region refers to a region clamping the anti-helix 105. However, different users may have individual differences, resulting in different shapes, dimensions, etc., of ears. In the actual wearing state, the clamping region may not necessarily hold the antihelix 105.

In some embodiments, the angle between the direction of the clamping force and the sagittal plane of the user may keep in a certain range. For example, the direction of the clamping force may be perpendicular or substantially perpendicular to the sagittal plane of the user. If the angle deviates too much from 90°, the baffle structure may not be formed between the sound outlet and the pressure relief hole (e.g., the side of the housing where the pressure relief hole is located is tilted, and the antihelix 105 may not block the pressure relief hole to the other side of the sound outlet), the volume of the near-field listening position cannot be increased, and the free end FE or the battery compartment may press the ear 100. It should be noted that the direction of the clamping force may be obtained by affixing a patch (i.e., a force sensor) or a patch array on the side of the auricle toward the head and the side of the auricle away from the head, and reading a force distribution at the clamped position. For example, if there is a point where the force can be measured on the side of the auricle toward the head and a point on the side of the auricle away from the head, it can be considered that the direction of the clamping force may be a direction of a line connecting the two points. In some embodiments, in order to meet wearing requirements, the angle between the direction of the clamping force and the sagittal plane of the user may be in a range of 60° to 120°. In some embodiments, in order to increase the volume at the near-field listening position, the angle between the direction of the clamping force and the sagittal plane of the user may be in a range of 80° to 100°. In some embodiments, in order to further make the earphone fit the antihelix 105 better in the wearing state, the angle between the direction of the clamping force and the sagittal plane of the user may be in a range of 70° to 90°.

In some embodiments, in the wearing state, the housing and the first portion of the ear hook may clamp the user's auricle, and the clamping force provided to the user's auricle may keep in a certain range. It should be noted that the clamping force may be measured by a tension meter. For example, the housing of the sound production component 11 in the non-wearing state may be separated from the ear hook 12 by a preset distance according to a wearing mode, and a pulling force in this case may be equal to the clamping force; and the clamping force may also be achieved by fixing the patch to the ear of the wearer. If the clamping force is too small, the baffle structure may not be formed between the sound outlet and the pressure relief hole (e.g., the sound production component 11 may be loose, and the antihelix 105 may not block the pressure relief hole to the other side of the sound outlet, i.e., the height of the baffle in FIG. 22 is reduced), causing that the volume of the near-field listening position may not to be increased, and the wearing stability of the earphone 10 may be poor; and if the clamping force is too large, the earphone may exert strong pressure on the ear 100, making the earphone 10 less adjustable after wearing. In some embodiments, in order to meet the wearing requirements, in the wearing state, the housing and the first portion of the ear hook 12 may clamp the user's auricle, and provide a clamping force of 0.03 N-3 N to the user's auricle. In some embodiments, in order to increase the adjustability after wearing, in the wearing state, the housing and the first portion of the ear hook may clamp the user's auricle, and provide a clamping force of 0.03 N-1 N to the user's auricle. In some embodiments, in order to increase the volume of the near-field listening position, in the wearing state, the housing and the first portion of the ear hook may clamp the user's auricle, and provide a clamping force of 0.4 N-0.9 N to the user's auricle.

Figure 23:
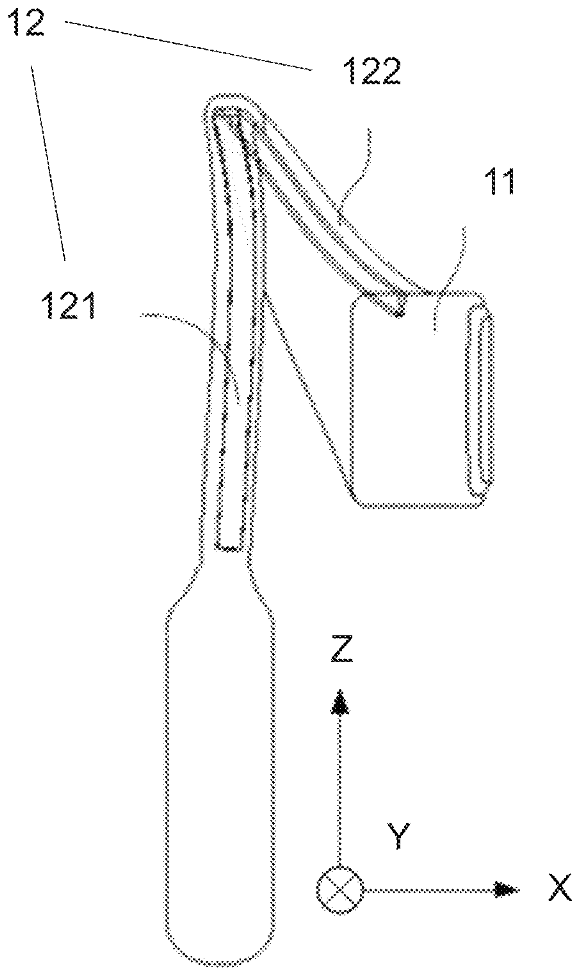
FIG. 23 is a perspective view illustrating a portion of components of an exemplary acoustic device according to some embodiments of the present disclosure.

FIG. 23 is a perspective view illustrating a portion of components of an exemplary acoustic device according to some embodiments of the present disclosure.

In some embodiments, as shown in FIG. 23, the ear hook 12 of the earphone 10 may be composed of a metal wire 121 and a wrapping layer 122. The metal wire 121 may play a role of supporting and clamping, and the wrapping layer 122 may wrap the outer side of the metal wire 121, making the ear hook 12 softer and fit better with the auricle, thereby improving user comfort.

The earphone 10 may be described in detail by taking the earphone 10 shown in FIG. 21 as an example. It should be known that, without violating the corresponding acoustic principles, the structure of the earphone 10 in FIG. 21 and corresponding parameters thereof may also be applied to the earphones of other configurations mentioned above.

In some embodiments, the metal wire 121 may include a spring steel, a titanium alloy, a titanium-nickel alloy, chrome-molybdenum steel, an aluminum alloy, a copper alloy, or the like, or a combination thereof. In some embodiments, parameters such as the count, the shape, the length, the thickness, and the diameter of the metal wire 121 may be set according to actual needs (e.g., the diameter of the acoustic device, strength requirements for the acoustic device, etc.). The shape of the metal wire 121 may include any suitable shape, for example, a cylinder, a cube, a cuboid, a prism, an elliptical cylinder, or the like.

Figure 24:
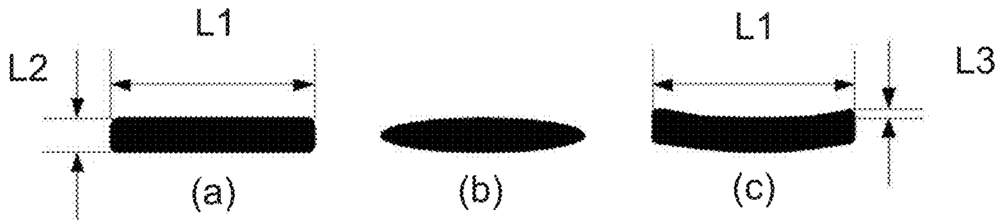
FIG. 24 is a cross-sectional view illustrating an exemplary metal wire according to some embodiments of the present disclosure.

FIG. 24 is a cross-sectional view illustrating an exemplary metal wire according to some embodiments of the present disclosure. As shown in FIG. 24, a metal wire 121 may have a flat structure, so that the metal wire 121 may have different deformability in various directions. In some embodiments, the cross-sectional shape of the metal wire 121 may include a square, a rectangle, a triangle, a polygon, a circle, an ellipse, an irregular shape, or the like. As shown in picture (a) in FIG. 24, the cross-sectional shape of the metal wire 121 may be a rounded rectangle. As shown in picture (b) in FIG. 24, the cross-sectional shape of the metal wire 121 may be an ellipse. In some embodiments, the length of a long side (or a long-axis, L1) and/or a short side (or a short-axis, L2) of the metal wire 121 may be set according to actual needs (e.g., a diameter of an acoustic device including the metal wire 121). In some embodiments, the ratio of the long side to the short side of the metal wire 121 may be in a range of 1.1:1-2:1. In some embodiments, the ratio of the long side to the short side of the metal wire 121 may be 1.5:1.

In some embodiments, the metal wire 121 may form a specific shape by stamping, pre-bending and other processes. Merely by way of example, an initial state of the metal wire 121 of the ear hook 12 of the acoustic device (i.e., a state before being processed) may be curled, straightened, and then stamped to make the metal wire 121 arc-shaped in the short-axis direction (as shown in picture (c) in FIG. 24), so that the metal wire 121 may store a certain amount of internal stress and maintain the flat shape to become a "memory metal wire". When subjected to a small external force, the metal wire 121 may return to the curled shape, so that the ear hook 12 of the acoustic device may fit and wrap around the human ear. In some embodiments, a ratio of an arc height (L3 shown in FIG. 24) of the metal wire 121 to the long side of the metal wire 121 may be in a range of 0.1 to 0.4. In some embodiments, the ratio of the arc height of the metal wire 121 to the long side of the metal wire 121 may be in the range of 0.1 to 0.35. In some embodiments, the ratio of the arc height of the metal wire 121 to the long side of the metal wire 121 may be in the range of 0.15 to 0.3. In some embodiments, the ratio of the arc height of the metal wire 121 to the long side of the metal wire 121 may be in the range of 0.2 to 0.35. In some embodiments, the ratio of the arc height of the metal wire 121 to the long side of the metal wire 121 may be in the range of 0.25 to 0.4. By arranging the metal wire 121, rigidities of the components of the acoustic device along a length direction of the acoustic device may be improved, and the holding effectiveness of the acoustic device (e.g., the ear hook 12) to the ear 100 of the user may be improved. In addition, after processing, the metal wire 121 of the ear hook 12 may be bent in the length direction of the ear hook 12 to have a strong elasticity, thereby further improving the pressing and holding effectiveness of the ear hook 12 to the ear 100 or the head of the user.

In some embodiments, the elastic modulus of the metal wire 121 may be obtained according to GB/T 24191-2009/ISO 12076:2002. In some embodiments, the elastic modulus of the metal wire 121 may keep in a certain range. When the shape and the dimension of the earphones 10 are constant, if the elastic modulus is too large, the ear hook 12 may not easily deform, making it difficult for the user to adjust a wearing angle of the ear hook 12. When the shape and the dimension of the earphone 10 are constant, if the elastic modulus is too small, the ear hook 12 may easily deform, so that the ear hook 12 may not be effectively clamped on both sides of the ear 100 after wearing. In some embodiments, in order to make the ear hook 12 effectively clamped on both sides of the ear 100 after wearing, the elastic modulus of the metal wire 121 may be in a range of 20 GPa to 50 GPa. In some embodiments, in order to make the ear hook 12 easy to adjust, the elastic modulus of the metal wire 121 may be in a range of 25 GPa to 43 GPa. In some embodiments, the elastic modulus of the metal wire 121 may be in a range of 30 GPa to 40 GPa.

In some embodiments, the diameter of the metal wire 121 may remain in a certain range. It should be noted that when the cross-sectional shape of the metal wire 121 is a circle, the diameter of the metal wire 121 may be a length of a diameter of a circular cross-section of the metal wire 121; when the cross-sectional shape of the metal wire 121 is an ellipse, the diameter of the metal wire is a length of a long-axis of an elliptical cross-section of the metal wire 121; and when the cross-sectional shape of the metal wire 121 is a square, a rectangle, a triangle, a polygon, an irregular shape, or the like, the diameter of the metal wire 121 may be defined as the length of the longest line segment among line segments of which two endpoints are located on the cross-section of the metal wire 121 and passing through a center of the cross-section of the metal wire 121.

In some embodiments, the diameter of the metal wire 121 may remain in a certain range. When a material of the metal wire 121 and the shape and the dimension of the earphone 10 are constant, if the aforementioned diameter is too large, the ear hook 12 may be too heavy and exert pressure on the ear 100, a strength of the ear hook 12 may be too large, and the ear hook 12 may not easily deform, making it difficult for the user to adjust the wearing angle of the ear hook 12. When the material of the metal wire 121 and the shape and the dimension of the earphone 10 are constant, if the aforementioned diameter is too small, the strength of the ear hook 12 may be too low, the clamping force may be too weak, and the ear hook 12 may not be effectively clamped on both sides of the ear 100 after wearing. In some embodiments, in order to prevent the ear hook 12 from exerting the pressure on the ear 100 after wearing and to facilitate the adjustment of the wearing angle, the diameter of the metal wire 121 may be in a range of 0.5 mm to 1 mm. In some embodiments, in order to increase the strength of the ear hook 12, the diameter of the metal wire 121 may be in a range of 0.6 mm to 1 mm. In some embodiments, in order to make the ear hook 12 be effectively clamped on both sides of the ear 100 after wearing, the diameter of the metal wire 121 may be in a range of 0.7 mm to 0.9 mm.

In some embodiments, the density of the metal wire 121 may remain in a certain range. If the aforementioned density is too large, the ear hook 12 may be too heavy, which may cause pressure to the ear 100. If the aforementioned density is too small, the strength of the ear hook 12 may be too low, which may make the ear hook 12 easy to damage, and low in service life. In some embodiments, in order to prevent the ear hook 12 from exerting the pressure on the ear 100 after wearing, the density of the metal wire 121 may be in a range of 5 g/cm$^3$ to 7 g/cm$^3$. In some embodiments, in order to increase the strength of the ear hook 12, the density of the metal wire 121 may be in a range of 5.5 g/cm$^3$ to 6.8 g/cm$^3$. In some embodiments, the density of the metal wire 121 may be in a range of 5.8 g/cm$^3$ to 6.5 g/cm$^3$.

In some embodiments, the wrapping layer 122 may be made of a soft material, a hard material, or the like, or a combination thereof. The soft material refers to a material with a hardness (e.g., the Shore hardness) less than a first hardness threshold (e.g., 15 A, 20 A, 30 A, 35 A, 40 A, etc.). For example, the Shore hardness of the soft material may be in a range of 45 A to 85 A, and 30 D to 60D. The hard material refers to a material with a hardness (e.g., the Shore hardness) greater than a second hardness threshold (e.g., 65 D, 70 D, 75 D, 80 D, etc.). The soft material may include Polyurethanes (PU) (e.g., thermoplastic polyurethanes (TPU)), polycarbonate (PC), polyamides (PA), acrylonitrile butadiene styrene (ABS), polystyrene (PS), high impact polystyrene (HIPS), polypropylene (PP), polyethylene terephthalate (PET), polyvinyl chloride (PVC), polyurethanes (PU), polyethylene (PE), phenol formaldehyde (PF), urea-formaldehyde (UF), melamine-formaldehyde (MF), silica gel, or the like, or any combination thereof. The hard material may include polyethersulfone resin (PES), polyvinylidenechloride (PVDC), polymethylmethacrylate (PMMA), poly-ether-ether-ketone (PEEK) or the like, or any combination thereof, or any mixture with glass fibers, carbon fibers or other reinforcing agents. In some embodiments, the wrapping layer 122 may be arranged according to specific conditions. For example, the metal wire 121 may be directly covered with the soft material. As another example, the metal wire 121 may be covered with the hard material first, and then the hard material may be wrapped with the soft material. As another example, in the wearing state, a portion of the ear hook 12 in contact with the user may be made of the soft material, and a remaining portion of the ear hook 12 may be made of the hard material. In some embodiments, different materials may be formed by two-color injection molding, spraying rubber paint, or other processes. The rubber paint may include rubber paint, elastic paint, plastic elastic paint, or the like, or any combination thereof. In this embodiment, the soft material may improve the comfort of the user wearing the ear hook 12, and the hard material may improve the strength of the ear hook 12. By rationally configuring the materials of each part of the ear hook 12, it is possible to improve the strength of the ear hook 12 while improving user comfort.

In some embodiments, the Shore hardness of the wrapping layer 122 may keep in a certain range. If the aforementioned Shore hardness is too large, the comfort of the user wearing the ear hook 12 may be poor. In some embodiments, in order to increase the comfort of the user wearing the ear hook 12, the Shore hardness of the wrapping layer 122 may be in a range of 10 HA to 80 HA. In some embodiments, the Shore hardness of the wrapping layer 122 may be in a range of 15 HA to 70 HA. In some embodiments, the Shore hardness of the wrapping layer 122 may be in a range of 25 HA to 55 HA. In some embodiments, the Shore hardness of the wrapping layer 122 may be in a range of 30 HA to 50 HA.

The basic concept has been described above. Obviously, for those skilled in the art, the above detailed disclosure is only an example, and does not constitute a limitation to the present disclosure. Although not expressly stated here, those skilled in the art may make various modifications, improvements and corrections to the present disclosure. Such modifications, improvements and corrections are suggested in this disclosure, so such modifications, improvements and corrections still belong to the spirit and scope of the exemplary embodiments of the present disclosure.

Meanwhile, the present disclosure uses specific words to describe the embodiments of the present disclosure. For example, "one embodiment," "an embodiment," and/or "some embodiments" refer to a certain feature, structure or characteristic related to at least one embodiment of the present disclosure. Therefore, it should be emphasized and noted that references to "one embodiment" or "an embodiment" or "an alternative embodiment" two or more times in different places in the present disclosure do not necessarily refer to the same embodiment. In addition, certain features, structures or characteristics in one or more embodiments of the present disclosure may be properly combined.

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, counts describing the quantity of components and attributes are used. It should be understood that such counts used in the description of the embodiments use the modifiers "about," "approximately" or "substantially" in some examples. Unless otherwise stated, "about," "approximately" or "substantially" indicates that the stated figure allows for a variation of ±20%. Accordingly, in some embodiments, the numerical parameters used in the disclosure and claims are approximations that can vary depending upon the desired characteristics of individual embodiments. In some embodiments, numerical parameters should consider the specified significant digits and adopt the general digit retention method. Although the numerical ranges and parameters used in some embodiments of the present disclosure to confirm the breadth of the range are approximations, in specific embodiments, such numerical values are set as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. An earphone, comprising:

a sound production component including a transducer and a housing accommodating the transducer; and an ear hook including a first portion and a second portion connected in sequence, wherein in a wearing state, the first portion is hung between an auricle and a head of a user, and the second portion extends towards a side of the auricle away from the head and connects with the sound production component to place the sound production component at a position near an ear canal but not blocking an ear canal opening, wherein an inner contour of a projection of the ear hook on a user's sagittal plane includes a first curve, the first curve has an extremum point in a first direction, and the first direction is perpendicular to a long-axis direction of a projection of the sound production component;

the extremum point is located behind a projection point of an upper vertex of the ear hook on the user's sagittal plane, and the upper vertex of the ear hook is a highest point of an inner contour of the ear hook along a vertical-axis of the user in the wearing state; and the housing and the first portion of the ear hook clamp the auricle of the user and provide a clamping force of 0.03 N-1 N to the auricle of the user.

2. The earphone of claim 1, wherein a distance between the extremum point and the projection point of the upper vertex of the ear hook on the user's sagittal plane is within a range of 6 mm-15 mm.

3. The earphone of claim 1, wherein under the wearing state, an included angle between a direction of the clamping force and the user's sagittal plane is within a range of −30°-30°.

4. The earphone of claim 1, wherein the ear hook includes a clamping fulcrum, the clamping fulcrum is located at a corresponding point of the extremum point on the ear hook, and a value of a clamping coefficient of the ear hook based on the clamping fulcrum is within a range of 10 N/m-30 N/m.

5. The earphone of claim 4, wherein the ear hook has a variable cross-section structure, and an area of a cross-section of the ear hook is the smallest at the corresponding point of the extremum point on the ear hook.

6. The earphone of claim 5, wherein an area of a cross-section of the ear hook with the smallest cross-sectional area is within a range of 5 $mm^2$-9 $mm^2$.

7. The earphone of claim 1, wherein the sound production component includes a clamping region, the clamping region includes a clamping region center, the first portion of the ear hook includes an ear hook clamping point, and the ear hook clamping point is a point on the ear hook closest to the clamping region center.

8. The earphone of claim 7, wherein in the wearing state, a distance between a projection point of the clamping region center on the user's sagittal plane and a projection point of the ear hook clamping point on the user's sagittal plane is not less than 2 mm.

9. The earphone of claim 7, wherein in the wearing state, a distance between a projection point of the clamping region center on the user's sagittal plane and the extremum point is within a range of 20 mm-40 mm.

10. The earphone of claim 9, wherein in the wearing state, a distance between the projection point of the clamping region center on the user's sagittal plane and the projection point of the upper vertex on the user's sagittal plane is within a range of 25 mm-40 mm.

11. The earphone of claim 10, wherein in the wearing state, a difference value between a distance between the projection point of the clamping region center on the user's sagittal plane and the extremum point and the distance between the projection point of the clamping region center on the user's sagittal plane and the projection point of the upper vertex on the user's sagittal plane is within a range of 2 mm-6 mm.

12. The earphone of claim 7, wherein in the wearing state, a distance between a projection point of the ear hook clamping point on the user's sagittal plane and the extremum point is within a range of 25 mm-45 mm.

13. The earphone of claim 12, wherein in the wearing state, a distance between the projection point of the ear hook clamping point on the user's sagittal plane and the projection point of the upper vertex on the user's sagittal plane is within a range of 28 mm-48 mm.

14. The earphone of claim 13, wherein in the wearing state, a difference value between a distance between the projection point of the ear hook clamping point on the user's sagittal plane and the extremum point and the distance between the projection point of the ear hook clamping point on the user's sagittal plane and the projection point of the upper vertex on the user's sagittal plane is within a range of 1 mm-5 mm.

15. The earphone of claim 7 wherein in the wearing state, an included angle between a first connection line from a projection point of the clamping region center on the user's sagittal plane to the extremum point and a second connection line from a projection point of the ear hook clamping point on the user's sagittal plane to the extremum point is within a range of 6°-12°.

16. The earphone of claim 7, wherein in a non-wearing state, a distance between the clamping region center and the ear hook clamping point is more than 3 mm.

17. The earphone of claim 7, wherein in a non-wearing state, a distance between the clamping region center and a corresponding point of the extremum point on the ear hook is within a range of 20 mm-35 mm.

18. The earphone of claim 17, wherein in the non-wearing state, a distance between the clamping region center and the upper vertex is within a range of 25 mm-40 mm.

19. The earphone of claim 7, wherein in a non-wearing state, a distance between the ear hook clamping point and a corresponding point of the extremum point on the ear hook is within a range of 25 mm-45 mm.

20. The earphone of claim 7, wherein in a non-wearing state, an included angle between a first connection line from the clamping region center to a corresponding point of the extremum point on the ear hook and a second connection line from the ear hook clamping point to the corresponding point of the extremum point on the ear hook is in within a range of 3°-9°.

* * * * *